(12) United States Patent
Obama et al.

(10) Patent No.: US 9,989,744 B2
(45) Date of Patent: Jun. 5, 2018

(54) VARIABLE MAGNIFICATION OPTICAL SYSTEM, OPTICAL DEVICE, AND METHOD FOR PRODUCING VARIABLE MAGNIFICATION OPTICAL SYSTEM

(71) Applicant: NIKON CORPORATION, Tokyo (JP)

(72) Inventors: Akihiko Obama, Tokyo (JP); Masashi Yamashita, Tokyo (JP)

(73) Assignee: Nikon Corporation, Tokyo (JP)

( * ) Notice: Subject to any disclaimer, the term of this patent is extended or adjusted under 35 U.S.C. 154(b) by 309 days.

(21) Appl. No.: 14/693,920

(22) Filed: Apr. 23, 2015

(65) Prior Publication Data
US 2015/0253551 A1    Sep. 10, 2015

Related U.S. Application Data

(63) Continuation of application No. PCT/JP2013/078539, filed on Oct. 22, 2013.

(30) Foreign Application Priority Data

Oct. 23, 2012  (JP) ................................. 2012-233961
Oct. 23, 2012  (JP) ................................. 2012-233963

(Continued)

(51) Int. Cl.
| | | |
|---|---|---|
| *G02B 15/20* | (2006.01) | |
| *G02B 15/173* | (2006.01) | |
| *G02B 27/64* | (2006.01) | |

(52) U.S. Cl.
CPC ........... *G02B 15/20* (2013.01); *G02B 15/173* (2013.01); *G02B 27/646* (2013.01)

(58) Field of Classification Search
None
See application file for complete search history.

(56) References Cited

U.S. PATENT DOCUMENTS

| | | |
|---|---|---|
| 5,734,508 A | 3/1998 | Sato |
| 5,930,051 A | 7/1999 | Sato |

(Continued)

FOREIGN PATENT DOCUMENTS

| | | |
|---|---|---|
| JP | 08-094933 A | 4/1996 |
| JP | 08-179214 A | 7/1996 |

(Continued)

OTHER PUBLICATIONS

International Search Report from International Patent Application No. PCT/JP2013/078539, dated Dec. 24, 2013.

(Continued)

*Primary Examiner* — Darryl J Collins
*Assistant Examiner* — Journey Sumlar
(74) *Attorney, Agent, or Firm* — Shapiro, Gabor and Rosenberger, PLLC

(57) ABSTRACT

A variable magnification optical system has, in order from an object side: a first lens group having positive refractive power; a second lens group having negative refractive power; an aperture stop; a third lens group having positive refractive power; and a rear lens group. Upon zooming from a wide-angle end state to a telephoto end state, at least the rear lens group is moved toward the object side, and distances between the lens groups are varied. Upon focusing from an infinitely distant object to a closely distant object, the third lens group is moved along the optical axis. At least a portion of the rear lens group constitutes a vibration reduction lens group having negative refractive power and moveable perpendicular to the optical axis. An optical apparatus and a method of manufacture are also provided.

54 Claims, 24 Drawing Sheets

(30) Foreign Application Priority Data

Oct. 23, 2012 (JP) ................................ 2012-233964
Oct. 23, 2012 (JP) ................................ 2012-233965

(56) References Cited

U.S. PATENT DOCUMENTS

| | | |
|---|---|---|
| 6,249,389 B1 | 6/2001 | Ohtake |
| 6,404,561 B1 | 6/2002 | Isono et al. |
| 6,480,341 B2 | 11/2002 | Ohtake |
| 6,788,464 B2 | 9/2004 | Misaka |
| 7,450,314 B2 | 11/2008 | Satori et al. |
| 7,515,353 B2 | 4/2009 | Kimura |
| 7,529,034 B2 | 5/2009 | Kawakami et al. |
| 7,548,378 B2 | 6/2009 | Kawakami et al. |
| 7,616,386 B2 | 11/2009 | Kimura |
| 7,764,438 B2 | 7/2010 | Kamo et al. |
| 8,018,659 B2 | 9/2011 | Mihara |
| 8,134,783 B2 | 3/2012 | Saito et al. |
| 8,243,170 B2 | 8/2012 | Miyazaki et al. |
| 8,570,663 B2 | 10/2013 | Saito |
| 8,792,047 B2 | 7/2014 | Okubo |
| 8,830,358 B2 | 9/2014 | Eguchi |
| 8,928,992 B2 | 1/2015 | Inomoto |
| 2001/0006432 A1 | 7/2001 | Ohtake |
| 2002/0131173 A1 | 9/2002 | Misaka |
| 2007/0217024 A1 | 9/2007 | Kamo et al. |
| 2007/0229968 A1 | 10/2007 | Satori et al. |
| 2008/0024875 A1 | 1/2008 | Kawakami et al. |
| 2008/0024876 A1 | 1/2008 | Kawakami et al. |
| 2008/0198476 A1 | 8/2008 | Kimura |
| 2009/0109548 A1 | 4/2009 | Kimura |
| 2010/0091171 A1 | 4/2010 | Miyazaki et al. |
| 2010/0171850 A1* | 7/2010 | Tohchi ................ G02B 15/173 348/240.3 |
| 2010/0246025 A1 | 9/2010 | Saito et al. |
| 2011/0043664 A1 | 2/2011 | Mihara |
| 2011/0102905 A1 | 5/2011 | Harada |
| 2011/0149118 A1 | 6/2011 | Misaka |
| 2011/0205636 A1 | 8/2011 | Ito |
| 2011/0216423 A1 | 9/2011 | Eguchi |
| 2012/0026600 A1 | 2/2012 | Matsumura |
| 2012/0050864 A1 | 3/2012 | Eguchi |
| 2012/0062770 A1 | 3/2012 | Eguchi |
| 2012/0327272 A1* | 12/2012 | Bito ..................... G02B 13/18 348/240.1 |
| 2013/0050566 A1 | 2/2013 | Saito |
| 2013/0169856 A1 | 7/2013 | Misaka |
| 2013/0242169 A1 | 9/2013 | Okubo |
| 2013/0271643 A1 | 10/2013 | Inomoto |
| 2013/0278814 A1 | 10/2013 | Yamasaki |
| 2013/0286276 A1 | 10/2013 | Kawamura et al. |
| 2013/0293967 A1* | 11/2013 | Hayakawa ........... G02B 15/173 359/684 |
| 2013/0308043 A1 | 11/2013 | Ito et al. |
| 2014/0313399 A1 | 10/2014 | Okubo |

FOREIGN PATENT DOCUMENTS

| | | |
|---|---|---|
| JP | 10-197794 A | 7/1998 |
| JP | 11-271614 A | 10/1999 |
| JP | 2001-194590 A | 7/2001 |
| JP | 2001-330778 A | 11/2001 |
| JP | 2002-107625 A | 4/2002 |
| JP | 2003-295250 A | 10/2003 |
| JP | 2007-108698 A | 4/2007 |
| JP | 2007-219473 A | 8/2007 |
| JP | 2007-240747 A | 9/2007 |
| JP | 2007-279587 A | 10/2007 |
| JP | 2008-203415 A | 9/2008 |
| JP | 2008-203471 A | 9/2008 |
| JP | 2008-257022 A | 10/2008 |
| JP | 2009-031635 A | 2/2009 |
| JP | 2009-109630 A | 5/2009 |
| JP | 2009-198721 A | 9/2009 |
| JP | 2009-251114 A | 10/2009 |
| JP | 2009-265557 A | 11/2009 |
| JP | 2009-265569 A | 11/2009 |
| JP | 2010-134347 A | 6/2010 |
| JP | 2010-237455 A | 10/2010 |
| JP | 2011-090186 A | 5/2011 |
| JP | 2011-099925 A | 5/2011 |
| JP | 2011-128371 A | 6/2011 |
| JP | 2011-203727 A | 10/2011 |
| JP | 2012-048033 A | 3/2012 |
| JP | 2012-048199 A | 3/2012 |
| JP | 2012-063442 A | 3/2012 |
| JP | 2012-073566 A | 4/2012 |
| JP | 2012-181525 A | 9/2012 |
| JP | 2013-050519 A | 3/2013 |
| JP | 2013-190741 A | 9/2013 |
| JP | 2013-221976 A | 10/2013 |
| JP | 2013-228450 A | 11/2013 |
| JP | 2013-231827 A | 11/2013 |
| JP | 2013-242431 A | 12/2013 |

OTHER PUBLICATIONS

English Translation of IPRP and Written Opinion of the International Searching Authority from International Patent Application No. PCT/JP2013/078539, dated Dec. 24, 2013.

* cited by examiner

VARIABLE MAGNIFICATION OPTICAL SYSTEM, OPTICAL DEVICE, AND METHOD FOR PRODUCING VARIABLE MAGNIFICATION OPTICAL SYSTEM

TECHNICAL FIELD

The present invention relates to a variable magnification optical system, an optical device, and a producing method for the variable magnification optical system.

BACKGROUND ART

There has been proposed a variable magnification optical system suitable for a photographing camera, an electronic still camera, a video camera or the like, for example, in Japanese Patent application Laid-Open No. 2009-251114 and in Japanese Patent application Laid-Open No. 2010-237455.

PRIOR ART DOCUMENT

Patent Document

Patent Document 1: Japanese Patent application Laid-Open Gazette No. 2009-251114
Patent Document 2: Japanese Patent application Laid-Open Gazette No. 2010-237455

SUMMARY OF THE INVENTION

Problems to be Solved by the Invention

However, in the conventional variable magnification optical system as described above, there was a problem that excellent correction of aberrations could not have been realized.

The present invention is made in view of the above-described problem, and has an object to provide a variable magnification optical system capable of realizing excellent optical performance, an optical apparatus, and a method for manufacturing the variable magnification optical system.

Means for Solving the Problem

In order to solve the above-mentioned object, according to a first aspect of the present invention, there is provided a variable magnification optical system comprising, in order from an object side: a first lens group having positive refractive power; a second lens group having negative refractive power; an aperture stop; a third lens group having positive refractive power; and a rear lens group;
upon zooming from a wide-angle end state to a telephoto end state, at least the rear lens group being moved toward the object side; and a distance between the first lens group and the second lens group, a distance between the second lens group and the third lens group, and a distance between the third lens group and the rear lens group being varied;
upon focusing on from an infinite distant object to a close distant object, the third lens group as a whole being moved in the direction of the optical axis;
at least a portion of the rear lens group being moved as a vibration reduction lens group so as to have a component in a direction perpendicular to the optical axis; and
the vibration reduction lens group having negative refractive power.

Further, according to a second aspect of the present invention, there is provided an optical apparatus equipped with the variable magnification optical system according to the first aspect of the present invention.

Further, according to a third aspect of the present invention, there is provided a variable magnification optical system comprising, in order from an object side: a first lens group having positive refractive power; a second lens group having negative refractive power; a third lens group having positive refractive power; and a rear lens group;
upon zooming from a wide-angle end state to a telephoto end state, at least the first lens group and the rear lens group being moved toward the object side; and a distance between the first lens group and the second lens group, a distance between the second lens group and the third lens group, and a distance between the third lens group and the rear lens group being varied;
upon focusing on from an infinite distant object to a close distant object, the third lens group as a whole being moved in the direction of the optical axis;
at least a portion of the rear lens group being moved as a vibration reduction lens group to have a component in a direction perpendicular to the optical axis;
the vibration reduction lens group having negative refractive power; and
the following conditional expression being satisfied:

$$0.20 < (-fVR)/f3 < 1.20$$

where fVR denotes a focal length of the vibration reduction lens group, and f3 denotes a focal length of the third lens group.

Further, according to a fourth aspect of the present invention, there is provided an optical apparatus equipped with the variable magnification optical system according to the third aspect of the present invention.

Further, according to a fifth aspect of the present invention, there is provided a variable magnification optical system comprising, in order from an object side: a first lens group having positive refractive power; a second lens group having negative refractive power; an aperture stop; a third lens group having positive refractive power; and a rear lens group;
the third lens group being composed of a cemented lens constructed by a positive lens cemented with a negative lens;
upon zooming from a wide-angle end state to a telephoto end state, at least the rear lens group being moved toward the object side, and a distance between the first lens group and the second lens group, a distance between the second lens group and the third lens group, and a distance between the third lens group and the rear lens group being varied;
upon focusing on from an infinite distant object to a close distant object, the third lens group as a whole being moved in the direction of the optical axis.

Further, according to a sixth aspect of the present invention, there is provided an optical apparatus equipped with the variable magnification optical system according to the fifth aspect of the present invention.

Further, according to a seventh aspect of the present invention, there is provided a variable magnification optical system comprising, in order from an object side: a first lens group having positive refractive power; a second lens group having negative refractive power; a third lens group having positive refractive power; and a fourth lens group having positive refractive power;
upon zooming from a wide-angle end state to a telephoto end state, a distance between the first lens group and the second lens group, a distance between the second lens group and the third lens group, and a distance between the third lens group and the fourth lens group being varied; and the variable magnification optical system having at least one lens that satisfies the following conditional expressions:

$$1.928 < ndh$$

$$28.60 < vdh$$

where ndh denotes refractive index at d-line (wavelength λ=587.6 nm) of the lens, and vdh denotes Abbe number at d-line (wavelength λ=587.6 nm) of the lens.

Further, according to an eighth aspect of the present invention, there is provided an optical apparatus equipped with the variable magnification optical system according to the seventh aspect of the present invention.

Further, according to a ninth aspect of the present invention, there is provided a method for manufacturing a variable magnification optical system comprising, in order from an object side: a first lens group having positive refractive power; a second lens group having negative refractive power; an aperture stop; a third lens group having positive refractive power; and a rear lens group;

the method comprising the steps of:

constructing such that, upon zooming from a wide-angle end state to a telephoto end state, at least the rear lens group is moved toward an object side, and a distance between the first lens group and the second lens group, a distance between the second lens group and the third lens group, and a distance between the third lens group and the rear lens group are varied;

constructing such that, upon focusing on from an infinite distant object to a close distant object, the third lens group as a whole is moved in the direction of the optical axis;

constructing such that at least a portion of the rear lens group is moved as a vibration reduction lens group so as to have a component in a direction perpendicular to the optical axis; and constructing the vibration reduction lens group to have negative refractive power.

Further, according to a tenth aspect of the present invention, there is provided a method for manufacturing a variable magnification optical system comprising, in order from an object side: a first lens group having positive refractive power; a second lens group having negative refractive power; a third lens group having positive refractive power and a rear lens group;

the method comprising the steps of:

constructing such that, upon zooming from a wide-angle end state to a telephoto end state, at least the first lens group and the rear lens group are moved toward an object side, and a distance between the first lens group and the rear lens group, a distance between the second lens group and the third lens group and a distance between the third lens group and the rear lens group are varied;

constructing such that, upon focusing on from an infinite distant object to a close distant object, the third lens group as a whole is moved in the direction of the optical axis;

constructing such that at least a portion of the rear lens group is moved as a vibration reduction lens group to have a component in a direction perpendicular to the optical axis;

constructing the vibration reduction lens group to have negative refractive power; and constructing the third lens group and the vibration reduction lens group to satisfy the following conditional expression:

$$0.20 < (-fVR)/f3 < 1.20$$

where fVR denotes a focal length of the vibration reduction lens group, and f3 denotes a focal length of the third lens group.

Further, according to an eleventh aspect of the present invention, there is provided a method for manufacturing a variable magnification optical system comprising, in order from an object side: a first lens group having positive refractive power; a second lens group having negative refractive power; an aperture stop; a third lens group having positive refractive power; and a rear lens group having positive refractive power;

the method comprising the steps of:

constructing such that the third lens group is composed of a cemented lens constructed by a positive lens cemented with a negative lens;

constructing such that, upon zooming from a wide-angle end state to a telephoto end state, at least a distance between the first lens group and the second lens group, a distance between the second lens group and the third lens group, and a distance between the third lens group and the rear lens group are varied; and constructing such that, upon focusing on from an infinite distant object to a close distant object, the third lens group as a whole is moved in the direction of the optical axis.

Further, according to a twelfth aspect of the present invention, there is provided a variable magnification optical system comprising, in order from an object side: a first lens group having positive refractive power; a second lens group having negative refractive power; a third lens group having positive refractive power; and a fourth lens group having positive refractive power;

constructing the variable magnification optical system to have at least one lens that satisfies the following conditional expressions:

$$1.928 < ndh$$

$$28.60 < vdh$$

where ndh denotes refractive index at d-line (wavelength λ=587.6 nm) of the lens, and vdh denotes Abbe number at d-line (wavelength λ=587.6 nm) of the lens; and constructing such that, upon zooming from a wide-angle end state to a telephoto end state, a distance between the first lens group and the second lens group, a distance between the second lens group and the third lens group, and a distance between the third lens group and the fourth lens group are varied.

Effect of the Invention

According to the first to the sixth aspects and the ninth to the eleventh aspects of the present invention, there are provided a variable magnification which has high variable magnification ratio, is compact and has excellent optical performance, an optical apparatus, and a method for manufacturing a variable magnification optical system.

According to the seventh, eighth and twelfth fourth aspects of the present invention, there are provided a variable magnification optical system which is compact and has excellent optical performance, an optical apparatus, and a method for manufacturing a variable magnification optical system.

BRIEF DESCRIPTION OF THE DRAWINGS

FIGS. 1A, 1B and 1C are sectional views showing a variable magnification optical system according to a First Example that is common to a first to third embodiments of the present application, in which FIG. 1A shows sectional view in a wide-angle end state, FIG. 1B shows sectional view in an intermediate focal length state, and FIG. 1C shows sectional view in a telephoto end state.

FIGS. 2A, 2B and 2C are graphs showing various aberrations of the variable magnification optical system according to the First Example of the present application upon focusing on an infinite distance object, in which FIG. 2A shows various aberrations in the wide-angle end state, FIG. 2B shows various aberrations in the intermediate focal length state, and FIG. 2C shows various aberrations in the telephoto end state.

FIGS. 3A and 3B are graphs showing meridional transverse aberration of the variable magnification optical system according to the First Example of the present application upon focusing on an infinitely distant object and conducting vibration reduction, in which FIG. 3A shows meridional transverse aberration in the wide-angle end state, and FIG. 3B shows meridional transverse aberration in the telephoto end state.

FIGS. 4A, 4B and 4C are sectional views showing a variable magnification optical system according to a Second Example that is common to the first to third embodiments of the present application, in which FIG. 4A shows sectional view in a wide-angle end state, FIG. 4B shows sectional view in an intermediate focal length state, and FIG. 4C shows sectional view in a telephoto end state.

FIGS. 5A, 5B and 5C are graphs showing various aberrations of the variable magnification optical system according to the Second Example of the present application upon focusing on an infinitely distant object, in which FIG. 5A shows various aberrations in the wide-angle end state, FIG. 5B shows various aberrations in the intermediate focal length state, and FIG. 5C shows various aberrations in the telephoto end state.

FIGS. 6A and 6B are graphs showing meridional transverse aberration of the variable magnification optical system according to the Second Example of the present application upon focusing on an infinitely distant object and conducting vibration reduction, in which FIG. 6A shows meridional transverse aberration in the wide-angle end state, and FIG. 6B shows meridional transverse aberration in the telephoto end state.

FIGS. 7A, 7B and 7C are sectional views showing a variable magnification optical system according to a Third Example that is common to the first to third embodiments of the present application, in which FIG. 7A shows sectional view in a wide-angle end state, FIG. 7B shows sectional view in an intermediate focal length state, and FIG. 7C shows sectional view in a telephoto end state.

FIGS. 8A, 8B and 8C are graphs showing various aberrations of the variable magnification optical system according to the Third Example of the present application upon focusing on an infinitely distant object, in which FIG. 8A shows various aberrations in the wide-angle end state, FIG. 8B shows various aberrations in the intermediate focal length state, and FIG. 8C shows various aberrations in the telephoto end state.

FIGS. 9A and 9B are graphs showing meridional transverse aberration of the variable magnification optical system according to the Third Example of the present application upon focusing on an infinitely distant object and conducting vibration reduction, in which FIG. 9A shows meridional transverse aberration in the wide-angle end state, and FIG. 9B shows meridional transverse aberration in the telephoto end state.

FIGS. 10A, 10B and 10C are sectional views showing a variable magnification optical system according to a Fourth Example of the fourth embodiment of the present application, in which FIG. 10A shows sectional view in a wide-angle end state, FIG. 10B shows sectional view in an intermediate focal length state, and FIG. 10C shows sectional view in a telephoto end state.

FIGS. 11A, 11B and 11C are graphs showing various aberrations of the variable magnification optical system according to the Fourth Example of the present application upon focusing on an infinitely distant object, in which FIG. 11A shows various aberrations in the wide-angle end state, FIG. 11B shows various aberrations in the intermediate focal length state, and FIG. 11C shows various aberrations in the telephoto end state.

FIGS. 12A, 12B and 12C are sectional views showing a variable magnification optical system according to a Fifth Example of the fourth embodiment of the present application, in which FIG. 12A shows sectional view in a wide-angle end state, FIG. 12B shows sectional view in an intermediate focal length state, and FIG. 12C shows sectional view in a telephoto end state.

FIGS. 13A, 13B and 13C are graphs showing various aberrations of the variable magnification optical system according to the Fifth Example of the present application upon focusing on an infinitely distant object, in which FIG. 13A shows various aberrations in the wide-angle end state, FIG. 13B shows various aberrations in the intermediate focal length state, and FIG. 13C shows various aberrations in the telephoto end state.

FIGS. 14A, 14B and 14C are sectional views showing a variable magnification optical system according to a Sixth Example the fourth embodiment of the present application, in which FIG. 14A shows sectional view in a wide-angle end state, FIG. 14B shows sectional view in an intermediate focal length state, and FIG. 14C shows sectional view in a telephoto end state.

FIGS. 15A, 15B and 15C are graphs showing various aberrations of the variable magnification optical system according to the Sixth Example of the present application upon focusing on an infinitely distant object, in which FIG. 15A shows various aberrations in the wide-angle end state, FIG. 15B shows various aberrations in the intermediate focal length state, and FIG. 15C shows various aberrations in the telephoto end state.

FIGS. 16A, 16B and 16C are sectional views showing a variable magnification optical system according to a Seventh Example the fourth embodiment of the present application, in which FIG. 16A shows sectional view in a wide-angle end state, FIG. 16B shows sectional view in an intermediate focal length state, and FIG. 16C shows sectional view in a telephoto end state.

FIGS. 17A, 17B and 17C are graphs showing various aberrations of the variable magnification optical system according to the Seventh Example of the present application upon focusing on an infinitely distant object, in which FIG. 17A shows various aberrations in the wide-angle end state, FIG. 17B shows various aberrations in the intermediate focal length state, and FIG. 17C shows various aberrations in the telephoto end state.

FIGS. 18A, 18B and 18C are sectional views showing a variable magnification optical system according to a Eighth Example the fourth embodiment of the present application, in which FIG. 18A shows sectional view in a wide-angle end state, FIG. 18B shows sectional view in an intermediate focal length state, and FIG. 18C shows sectional view in a telephoto end state.

FIGS. 19A, 19B and 19C are graphs showing various aberrations of the variable magnification optical system according to the Eighth Example of the present application upon focusing on an infinitely distant object, in which FIG. 19A shows various aberrations in the wide-angle end state, FIG. 19B shows various aberrations in the intermediate focal length state, and FIG. 19C shows various aberrations in the telephoto end state.

EMBODIMENTS FOR CARRYING OUT THE INVENTION

Figure 1A:
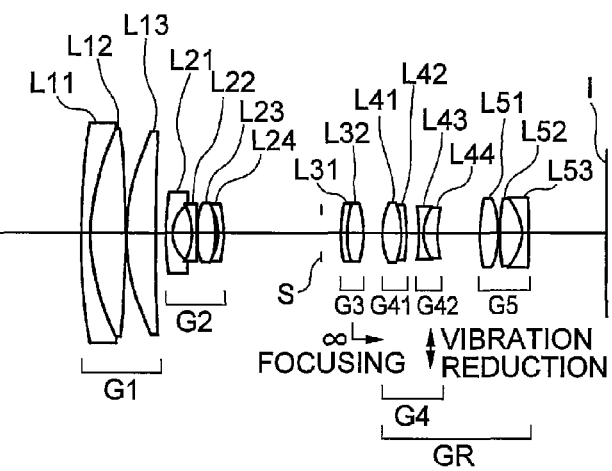

The variable magnification optical system, the optical apparatus and the method for manufacturing the variable magnification optical system according to the first embodiment of the present application is explained below.

The variable magnification optical system according to the first embodiment of the present application comprises, in order from an object side: a first lens group having positive refractive power; a second lens group having negative refractive power; an aperture stop; a third lens group having positive refractive power; and a rear lens group;

upon zooming from a wide-angle end state to a telephoto end state, at least the rear lens group being moved toward the object side; and a distance between the first lens group and the second lens group, a distance between the second lens group and the third lens group, and a distance between the third lens group and the rear lens group being varied;

upon focusing on from an infinite distant object to a close distant object, the third lens group as a whole being moved in the direction of the optical axis;

at least a portion of the rear lens group being moved as a vibration reduction lens group so as to have a component in a direction perpendicular to the optical axis; and the vibration reduction lens group having negative refractive power.

In the variable magnification optical system according to the first embodiment of the present application, the third lens group is disposed in the neighborhood of the aperture stop, and focusing on from an infinite distant object to a close distant object, is carried out by moving the third lens group as a whole in the direction of the optical axis. Due to such configuration, variation in curvature of field can be suppressed upon focusing a closely distant object, so it is preferable.

In the variable magnification optical system according to the first embodiment of the present application, at least a portion of the rear lens groups is moved, as a vibration reduction lens group, to have a component in a direction perpendicular to the optical axis, and the vibration reduction lens group has negative refractive power. Due to this configuration, correction of image blur upon camera shake being caused, that is, vibration reduction, can be conducted. Further, vibration reduction can be conducted by a small-sized lens group, so a mechanism for the vibration reduction can be made downsized and small in weight, thereby a lens barrel being able to be downsized. It is preferable.

Due to the above mentioned configuration, a variable magnification optical system having high zoom ratio, being downsized, and having excellent optical performance can be realized.

In the variable magnification optical system according to the first embodiment of the present application, it is preferable that the following conditional expression (1) is satisfied:

$$0.60 < f1/f3 < 2.60 \quad (1)$$

where f1 denotes a focal length of the first lens group, and f3 denotes a focal length of the third lens group.

The conditional expression (1) defines the focal length of the first lens group relative to the focal length of the third lens group. With satisfying the conditional expression (1), the variable magnification optical system according to the first embodiment of the present application is capable of correcting superbly spherical aberration upon focusing on a closely distant object in the telephoto end state and spherical aberration in the telephoto end state.

When the value of f1/f3 of the conditional expression (1) of the variable magnification optical system according to the first embodiment of the present application is equal to or exceeds the upper limit, refractive power of the third lens group becomes large, and it becomes difficult to correct spherical aberration upon focusing on the closely distant object in the telephoto end state. It is not preferable. Meanwhile, in order to attain the advantageous effect of the present application more surely, it is preferable to set the upper limit value of the conditional expression (1) to 2.50.

On the other hand, when the value of f1/f3 of the conditional expression (1) of the variable magnification optical system according to the first embodiment of the present application is equal to or falls below the lower limit, refractive power of the first lens group increases. Thus, spherical aberration is generated in the telephoto end state, so that it is not desirable.

Meanwhile, in order to attain the advantageous effect of the present application more surely, it is preferable to set the lower limit value of the conditional expression (1) to 0.40.

Further, in the variable magnification optical system according to the first embodiment of the present application, it is preferable that the following conditional expression (2) is satisfied:

$$5.00 < f1/(-f2) < 10.00 \quad (2)$$

where f1 denotes the focal length of the first lens group, and f2 denotes a focal length of the second lens group.

The conditional expression (2) defines the focal length of the first lens group relative to the focal length of the second lens group. With satisfying the conditional expression (2), the variable magnification optical system according to the first embodiment of the present invention is capable of correcting superbly spherical aberration upon focusing in the wide-angle end state and spherical aberration in the telephoto end state.

When the value of f1/(−f2) of the conditional expression (2) of the variable magnification optical system according to the first embodiment of the present application is equal to or exceeds the upper limit, refractive power of the second lens group becomes large, and it becomes difficult to correct curvature of field in the wide-angle end state. It is not preferable. Meanwhile, in order to attain the advantageous effect of the present application more surely, it is preferable to set the upper limit value of the conditional expression (2) to 8.00.

On the other hand, when the value of f1/(−f2) of the conditional expression (2) of the variable magnification optical system according to the first embodiment of the present application is equal to or falls below the lower limit, refractive power of the first lens group becomes large. Thus, spherical aberration is generated in the telephoto end state, so that it is not desirable.

Meanwhile, in order to attain the advantageous effect of the present application more surely, it is more preferable to set the lower limit value of the conditional expression (2) to 6.00.

Further, in the variable magnification optical system according to the first embodiment of the present application, it is preferable that the following conditional expression (3) is satisfied:

$$0.20<(-fVR)/f3<1.20 \qquad (3)$$

where fVR denotes a focal length of the vibration reduction lens group, and f3 denotes the focal length of the third lens group.

The conditional expression (3) defines the focal length of the vibration reduction lens group relative to the focal length of the third lens group. With satisfying the conditional expression (3), the variable magnification optical system according to the first embodiment of the present invention is capable of correcting superbly spherical aberration upon focusing on a closely distant object in the telephoto end state and eccentric coma aberration upon conducting the vibration reduction.

When the value of (−fVR)/f3 of the conditional expression (3) of the variable magnification optical system according to the first embodiment of the present application is equal to or exceeds the upper limit, refractive power of the third lens group becomes large, and it becomes difficult to correct spherical aberration upon focusing on the closely distant object in the telephoto end state. It is not preferable. Meanwhile, in order to attain the advantageous effect of the present application more surely, it is preferable to set the upper limit value of the conditional expression (3) to 1.00.

On the other hand, when the value of (−fVR)/f3 of the conditional expression (3) of the variable magnification optical system according to the first embodiment of the present application is equal to or falls below the lower limit, refractive power of the vibration reduction lens group increases. Thus, eccentric coma aberration is generated upon conducting the vibration reduction, so that it is not desirable. Meanwhile, in order to attain the advantageous effect of the present application more surely, it is preferable to set the lower limit value of the conditional expression (3) to 0.40.

Further, in the variable magnification optical system according to the first embodiment of the present application, it is preferable that the following conditional expression (4) is satisfied:

$$0.10<(-f2)/f3<0.38 \qquad (4)$$

where f2 denotes the focal length of the second lens group, and f3 denotes the focal length of the third lens group.

The conditional expression (4) defines the focal length of the second lens group relative to the focal length of the third lens group. The variable magnification optical system according to the first embodiment of the present invention is capable of correcting superbly spherical aberration upon focusing on a closely distant object in the telephoto end state and curvature of field in the wide-angle end state, by satisfying the conditional expression (4).

When the value of (−f2)/f3 of the conditional expression (4) of the variable magnification optical system according to the first embodiment of the present application is equal to or exceeds the upper limit, refractive power of the third lens group becomes large, and it becomes difficult to correct spherical aberration upon focusing on the closely distant object in the telephoto end state. It is not preferable. Meanwhile, in order to attain the advantageous effect of the present application more surely, it is more preferable to set the upper limit value of the conditional expression (4) to 0.36.

On the other hand, when the value of (−f2)/f3 of the conditional expression (4) of the variable magnification optical system according to the first embodiment of the present application is equal to or falls below the lower limit, refractive power of the second lens group increases. Thus, it becomes difficult to correct curvature of field in the wide-angle end state, so that it is not desirable. Meanwhile, in order to attain the advantageous effect of the present application more surely, it is more preferable to set the lower limit value of the conditional expression (4) to 0.15.

In the variable magnification optical system according to the first embodiment of the present application, it is preferable that the following conditional expression (5) is satisfied:

$$0.42<f3/fR<0.80 \qquad (5)$$

where f3 denotes the focal length of the third lens group, and fR denotes a focal length of the rear lens group in the wide-angle end state.

The conditional expression (5) defines the focal length of the rear lens group in the wide-angle end state relative to the focal length of the third lens group. Incidentally, in a case where the rear lens group is composed of a plurality of lens groups, fR denotes a composite focal length of the plurality of lens groups. With satisfying the conditional expression (5), the variable magnification optical system according to the first embodiment of the present invention is capable of correcting superbly spherical aberration upon focusing on a closely distant object in the telephoto end state and eccentric coma aberration upon conducting the vibration reduction.

When the value of f3/fR of the conditional expression (5) of the variable magnification optical system according to the first embodiment of the present application is equal to or exceeds the upper limit, refractive power of the third lens group becomes large, and it becomes difficult to correct spherical aberration upon focusing on the closely distant object in the telephoto end state. It is not preferable. Meanwhile, in order to attain the advantageous effect of the present application more surely, it is preferable to set the upper limit value of the conditional expression (5) to 1.00.

On the other hand, when the value of f3/fR of the conditional expression (5) of the variable magnification optical system according to the first embodiment of the present application is equal to or falls below the lower limit, eccentric coma aberration is generated upon conducting the vibration reduction, so that it is not preferable. Meanwhile, in order to attain the advantageous effect of the present application more surely, it is more preferable to set the lower limit value of the conditional expression (5) to 0.40.

Further, in the variable magnification optical system according to the first embodiment of the present application, it is preferable that the vibration reduction lens group is composed of a cemented lens constructed by a positive lens cemented with a negative lens. By this configuration, eccentric coma aberration generated upon conducting the vibration reduction can be corrected superbly.

In the variable magnification optical system according to the first embodiment of the present application, it is preferable that the first lens group has a negative lens that satisfies the following conditional expression (6):

$$1.90 < nd1 \quad (6)$$

where nd1 denotes refractive index at d-line (wavelength λ=587.6 nm) of the negative lens in the first lens group.

The conditional expression (6) defines refractive index at d-line (wavelength λ=587.6 nm) of the negative lens in the first lens group. With satisfying the conditional expression (6), the variable magnification optical system according to the first embodiment of the present invention is capable of correcting superbly spherical aberration in the telephoto end state.

When the value of nd1 of the conditional expression (6) of the variable magnification optical system according to the first embodiment of the present application is equal to or falls below the lower limit, it becomes difficult to correct spherical aberration in the telephoto end state, so that it is not desirable.

Meanwhile, in order to attain the advantageous effect of the present application more surely, it is preferable to set the lower limit value of the conditional expression (6) to 1.92.

Further, in the variable magnification optical system according to the first embodiment of the present application, it is preferable that, upon zooming from the wide-angle end state to the telephoto end state, the second lens group is moved in the direction of the optical axis. With taking such a configuration, curvature of field can be corrected superbly.

Further, in the variable magnification optical system according to the first embodiment of the present application, it is preferable that, upon zooming from the wide-angle end state to the telephoto end state, the third lens group is moved in the direction of the optical axis. With taking such a configuration, spherical aberration can be corrected superbly.

Further, in the variable magnification optical system according to the first embodiment of the present application, it is preferable that, upon zooming from the wide-angle end state to the telephoto end state, the first lens group is moved in the direction of the optical axis. With taking such a configuration, higher zoom ratio can be attained.

The optical apparatus of the present application, is characterized in the provision of the variable magnification optical system according to the first embodiment having the above described configuration. Owing to this, an optical apparatus having high zoom ratio, being downsized and having superb optical performance, can be realized.

The method for manufacturing the variable magnification optical system according to the first embodiment of the present application is a method for manufacturing a variable magnification optical system comprising, in order from an object side: a first lens group having positive refractive power; a second lens group having negative refractive power; an aperture stop; a third lens group having positive refractive power; and a rear lens group;

the method being characterized in comprising the steps of:

constructing such that, upon zooming from a wide-angle end state to a telephoto end state, at least the rear lens group is moved toward the object side; and a distance between the first lens group and the second lens group, a distance between the second lens group and the third lens group, and a distance between the third lens group and the rear lens group being varied;

constructing such that upon focusing on from an infinitely distant object to a close distant object, the third lens group as a whole is moved in the direction of the optical axis;

constructing such that at least a portion of the rear lens group is moved as a vibration reduction lens group so as to have a component in a direction perpendicular to the optical axis; and constructing the vibration reduction lens group to have negative refractive power.

By such a method, it is possible to manufacture a magnification variable optical system that has high zoom ratio, is downsized and has superb optical performance.

Next, the variable magnification optical system, the optical apparatus and the method for manufacturing the variable magnification optical system according to the second embodiment of the present application is explained below.

The variable magnification optical system according to the second embodiment of the present application comprises, in order from an object side: a first lens group having positive refractive power; a second lens group having negative refractive power; a third lens group having positive refractive power and a rear lens group;

upon zooming from a wide-angle end state to a telephoto end state, at least the first lens group and the rear lens group being moved toward an object side, and a distance between the first lens group and the second lens group, a distance between the second lens group and the third lens group and a distance between the third lens group and the rear lens group being varied;

upon focusing on from an infinitely distant object to a closely distant object, the third lens group as a whole being moved in the direction of the optical axis;

at least a portion of the rear lens group being moved as a vibration reduction lens group to have a component in a direction perpendicular to the optical axis;

the vibration reduction lens group having negative refractive power; and the following conditional expression (3) being satisfied:

$$0.20 < (-fVR)/f3 < 1.20 \quad (3)$$

where fVR denotes a focal length of the vibration reduction lens group, and f3 denotes a focal length of the third lens group.

In the variable magnification optical system according to the second embodiment of the present application, upon focusing on from an infinitely distant object to a closely distant object, the third lens group as a whole is moved in the direction of the optical axis. Due to such a configuration, variation in curvature of field upon focusing a closely distant object can be preferably suppressed.

In the variable magnification optical system according to the second embodiment of the present application, at least a portion that is a portion of the rear lens group is moved as a vibration reduction lens group to have a component in a direction perpendicular to the optical axis, and the vibration reduction lens group has negative refractive power. Due to such configuration, image blur upon camera shake being caused can be corrected, that is, vibration reduction can be effected. Further more, since vibration reduction can be conducted by downsized lens group, the vibration reduction mechanism can be downsized and made small in weight, so that the lens barrel can be downsized preferably.

The conditional expression (3) defines a focal length of the vibration reduction lens group relative to the focal length of the third lens group. The variable magnification optical system according to the second embodiment of the present application is capable of correcting superbly spherical aberration upon focusing on a closely distant object in the telephoto end state and eccentric coma aberration upon conducting the vibration reduction.

When the value of (−fVR)/f3 of the conditional expression (3) of the variable magnification optical system according to the second embodiment of the present application is equal to or exceeds the upper limit, refractive power of the third lens group becomes large, and it becomes difficult to correct spherical aberration upon focusing on the closely distant object in the telephoto end state. It is not preferable. Meanwhile, in order to attain the advantageous effect of the present application more surely, it is preferable to set the upper limit value of the conditional expression (3) to 1.00.

On the other hand, when the value of (−fVR)/f3 of the conditional expression (3) of the variable magnification optical system according to the second embodiment of the present application is equal to or falls below the lower limit, refractive power of the vibration reduction lens group increases. Thus, eccentric coma aberration is generated upon conducting the vibration reduction, so that it is not desirable.

Meanwhile, in order to attain the advantageous effect of the present application more surely, it is more preferable to set the lower limit value of the conditional expression (3) to 0.40.

Due to the above configuration, a variable magnification optical system that has high zoom ratio, is downsized and has superb optical performance, can be realized.

Further, in the variable magnification optical system according to the second embodiment of the present application, it is preferable that the following conditional expression (4) is satisfied:

$$0.10 < (-f2)/f3 < 0.38 \quad (4)$$

where f2 denotes the focal length of the second lens group, and f3 denotes the focal length of the third lens group.

The conditional expression (4) defines the focal length of the second lens group relative to the focal length of the third lens group. The variable magnification optical system according to the second embodiment of the present application is capable of correcting superbly spherical aberration upon focusing on a closely distant object in the telephoto end state and curvature of field in the wide-angle end state.

When the value of (−f2)/f3 of the conditional expression (4) of the variable magnification optical system according to the second embodiment of the present application is equal to or exceeds the upper limit, refractive power of the third lens group becomes large, and it becomes difficult to correct spherical aberration upon focusing on the closely distant object in the telephoto end state. It is not preferable. Meanwhile, in order to attain the advantageous effect of the present application more surely, it is more preferable to set the upper limit value of the conditional expression (4) to 0.36.

On the other hand, when the value of (−f2)/f3 of the conditional expression (4) of the variable magnification optical system according to the second embodiment of the present application is equal to or falls below the lower limit, refractive power of the second lens group increases. Thus, it becomes difficult to correct curvature of field in the wide-angle end state, so that it is not desirable.

Meanwhile, in order to attain the advantageous effect of the present application more surely, it is more preferable to set the lower limit value of the conditional expression (4) to 0.15.

In the variable magnification optical system according to the second embodiment of the present application, it is preferable that the following conditional expression (1) is satisfied:

$$0.60 < f1/f3 < 2.60 \quad (1)$$

where f1 denotes a focal length of the first lens group, and f3 denotes a focal length of the third lens group.

The conditional expression (1) defines the focal length of the first lens group relative to the focal length of the third lens group. With satisfying the conditional expression (1), the variable magnification optical system according to the second embodiment of the present application is capable of correcting superbly spherical aberration upon focusing on a closely distant object in the telephoto end state and spherical aberration in the telephoto end state.

When the value of f1/f3 of the conditional expression (1) of the variable magnification optical system according to the second embodiment of the present application is equal to or exceeds the upper limit, refractive power of the third lens group becomes large, and it becomes difficult to correct spherical aberration upon focusing on the closely distant object in the telephoto end state. It is not preferable. Meanwhile, in order to attain the advantageous effect of the present application more surely, it is more preferable to set the upper limit value of the conditional expression (1) to 2.50.

On the other hand, when the value of f1/f3 of the conditional expression (1) of the variable magnification optical system according to the second embodiment of the present application is equal to or falls below the lower limit, refractive power of the first lens group increases. Thus, spherical aberration is generated in the telephoto end state, so that it is not desirable.

Meanwhile, in order to attain the advantageous effect of the present application more surely, it is more preferable to set the lower limit value of the conditional expression (1) to 0.40.

Further, in the variable magnification optical system according to the second embodiment of the present application, it is preferable that the following conditional expression (2) is satisfied:

$$5.00 < f1/(-f2) < 10.00 \quad (2)$$

where f1 denotes the focal length of the first lens group, and f2 denotes a focal length of the second lens group.

The conditional expression (2) defines the focal length of the first lens group relative to the focal length of the second lens group. With satisfying the conditional expression (2), the variable magnification optical system according to the second embodiment of the present invention is capable of correcting superbly curvature of field in the wide-angle end state and spherical aberration in the telephoto end state.

When the value of f1/(−f2) of the conditional expression (2) of the variable magnification optical system according to the second embodiment of the present application is equal to or exceeds the upper limit, refractive power of the second lens group becomes large, and thereby it becomes difficult to correct curvature of field in the wide-angle end state. It is not preferable. Meanwhile, in order to attain the advantageous effect of the present application more surely, it is preferable to set the upper limit value of the conditional expression (2) to 8.00.

On the other hand, when the value of f1/(−f2) of the conditional expression (2) of the variable magnification optical system according to the second embodiment of the present application is equal to or falls below the lower limit, refractive power of the first lens group becomes large. Thus, spherical aberration is generated in the telephoto end state, so that it is not desirable.

Meanwhile, in order to attain the advantageous effect of the present application more surely, it is more preferable to set the lower limit value of the conditional expression (2) to 6.00.

In the variable magnification optical system according to the second embodiment of the present application, it is preferable that the following conditional expression (5) is satisfied:

$$0.42 < f3/fR < 0.80 \quad (5)$$

where f3 denotes the focal length of the third lens group, and fR denotes a focal length of the rear lens group in the wide-angle end state.

The conditional expression (5) defines the focal length of the rear lens group in the wide-angle end state relative to the focal length of the third lens group. Incidentally, in a case where the rear lens group is composed of a plurality of lens groups, fR denotes a composite focal length of the plurality of lens groups. With satisfying the conditional expression (5), the variable magnification optical system according to the second embodiment of the present application is capable of correcting superbly spherical aberration upon focusing on a closely distant object in the telephoto end state and eccentric coma aberration upon conducting the vibration reduction.

When the value of f3/fR of the conditional expression (5) of the variable magnification optical system according to the second embodiment of the present application is equal to or exceeds the upper limit, refractive power of the third lens group becomes large, and it becomes difficult to correct spherical aberration upon focusing on the closely distant object in the telephoto end state. It is not preferable. Meanwhile, in order to attain the advantageous effect of the present application more surely, it is more preferable to set the upper limit value of the conditional expression (5) to 1.00.

On the other hand, when the value of f3/fR of the conditional expression (5) of the variable magnification optical system according to the second embodiment of the present application is equal to or falls below the lower limit, refractive power of the rear lens group becomes large. Owing to this, eccentric coma aberration is generated upon conducting the vibration reduction, so that it is not preferable. Meanwhile, in order to attain the advantageous effect of the present application more surely, it is more preferable to set the lower limit value of the conditional expression (5) to 0.40.

Further, in the variable magnification optical system according to the second embodiment of the present application, it is preferable that the vibration reduction lens group is composed of a cemented lens constructed by a positive lens cemented with a negative lens. By this configuration, eccentric coma aberration generated upon conducting the vibration reduction can be corrected superbly.

In the variable magnification optical system according to the second embodiment of the present application, it is preferable that the first lens group has a negative lens that satisfies the following conditional expression (6):

$$1.90 < nd1 \quad (6)$$

where nd1 denotes refractive index at d-line (wavelength $\lambda = 587.6$ nm) of the negative lens in the first lens group.

The conditional expression (6) defines refractive index at d-line (wavelength $\lambda = 587.6$ nm) of the negative lens in the first lens group. With satisfying the conditional expression (6), the variable magnification optical system according to the second embodiment of the present invention is capable of correcting superbly spherical aberration in the telephoto end state.

When the value of nd1 of the conditional expression (6) of the variable magnification optical system according to the second embodiment of the present application is equal to or falls below the lower limit, it becomes difficult to correct spherical aberration in the telephoto end state, so that it is not desirable.

Meanwhile, in order to attain the advantageous effect of the present application more surely, it is more preferable to set the lower limit value of the conditional expression (6) to 1.92.

Further, in the variable magnification optical system according to the second embodiment of the present application, it is preferable that, upon zooming from the wide-angle end state to the telephoto end state, the second lens group is moved in the direction of the optical axis. With taking such a configuration, curvature of field can be corrected superbly.

Further, in the variable magnification optical system according to the second embodiment of the present application, it is preferable that, upon zooming from the wide-angle end state to the telephoto end state, the third lens group is moved in the direction of the optical axis. With taking such a configuration, spherical aberration can be corrected superbly.

Further, in the variable magnification optical system according to the second embodiment of the present application, it is preferable that, upon zooming from the wide-angle end state to the telephoto end state, the first lens group is moved in the direction of the optical axis. With taking such a configuration, higher zoom ratio can be attained.

The optical apparatus of the present application, is characterized in the provision of the variable magnification optical system according to the second embodiment having the above described configuration. Owing to this, an optical apparatus having high zoom ratio, being downsized and having superb optical performance, can be realized.

The method for manufacturing the variable magnification optical system according to the second embodiment of the present application is a method for manufacturing a variable magnification optical system comprising, in order from an object side: a first lens group having positive refractive power; a second lens group having negative refractive power; a third lens group having positive refractive power; and a rear lens group, and being characterized in comprising the steps of:

constructing such that, upon zooming from a wide-angle end state to a telephoto end state, at least the first lens group and the rear lens group are moved toward the object side; and a distance between the first lens group and the second lens group, a distance between the second lens group and the third lens group, and a distance between the third lens group and the rear lens group are varied;

constructing such that, upon focusing on from an infinitely distant object to a closely distant object, the third lens group as a whole is moved in the direction of the optical axis, constructing such that at least a portion of the rear lens group is moved as a vibration reduction lens group so as to have a component in a direction perpendicular to the optical axis;

constructing the vibration reduction lens group to have negative refractive power; and constructing such that the third lens group and the rear lens group satisfy the following conditional expression (3):

$$0.20<(-fVR)/f3<1.20 \qquad (3)$$

where fVR denotes a focal length of the vibration reduction lens group, and f3 denotes a focal length of the third lens group.

By such a method, it is possible to manufacture a variable magnification optical system that has high zoom ratio, is downsized and has superb optical performance.

Next, the variable magnification optical system, the optical apparatus and the method for manufacturing the variable magnification optical system according to the third embodiment of the present application is explained below.

The variable magnification optical system according to the third embodiment of the present application comprises, in order from an object side: a first lens group having positive refractive power; a second lens group having negative refractive power; an aperture stop; a third lens group having positive refractive power and a rear lens group, the third lens group being composed of a cemented lens constructed by a positive lens cemented with a negative lens; upon zooming from a wide-angle end state to a telephoto end state, at least the rear lens group being moved toward an object side, and a distance between the first lens group and the second lens group, a distance between the second lens group and the third lens group and a distance between the third lens group and the rear lens group being varied; and upon focusing on from an infinitely distant object to a closely distant object, the third lens group as a whole being moved in the direction of the optical axis.

In the variable magnification optical system according to the third embodiment of the present application, focusing on from an infinitely distant object to a closely distant object, is carried out by moving, as a whole in the direction of the optical axis, the third lens group that is disposed in the neighborhood of the aperture stop. Due to such a configuration, variation in curvature of field upon focusing on a closely distant object can be preferably suppressed. Moreover, the third lens group is composed of a cemented lens constructed by a positive lens cemented with a negative lens, and thereby variation in spherical aberration upon focusing on the closely distant object as well as variation in longitudinal chromatic aberration can be suppressed, so that it is preferable.

By such configuration, a variable magnification optical system that has high zoom ratio, is downsized and has superb optical performance, can be realized.

In the variable magnification optical system according to the third embodiment of the present application, it is preferable that the following conditional expression (5) is satisfied:

$$0.42<f3/fR<0.80 \qquad (5)$$

where f3 denotes the focal length of the third lens group, and fR denotes a focal length of the rear lens group in the wide-angle end state.

The conditional expression (5) defines the focal length of the rear lens group in the wide-angle end state relative to the focal length of the third lens group. Incidentally, in a case where the rear lens group is composed of a plurality of lens groups, fR denotes a composite focal length of the plurality of lens groups. With satisfying the conditional expression (5), the variable magnification optical system according to the third embodiment of the present invention is capable of correcting superbly spherical aberration upon focusing on a closely distant object in the telephoto end state. Further, in a case where the variable magnification optical system according to the third embodiment of the present application is configured to carry out vibration reduction, it is possible to correct superbly eccentric coma aberration upon conducting the vibration reduction.

When the value of f3/fR of the conditional expression (5) of the variable magnification optical system according to the third embodiment of the present application is equal to or exceeds the upper limit, refractive power of the third lens group becomes large, and it becomes difficult to correct spherical aberration upon focusing on the closely distant object in the telephoto end state. It is not preferable. Meanwhile, in order to attain the advantageous effect of the present application more surely, it is more preferable to set the upper limit value of the conditional expression (5) to 1.00.

On the other hand, when the value of f3/fR of the conditional expression (5) of the variable magnification optical system according to the third embodiment of the present application is equal to or falls below the lower limit, refractive power of the rear lens group becomes large. Owing to this, in the case where the variable magnification optical system according to the third embodiment of the present invention is configured to conduct the vibration reduction, eccentric coma aberration is generated upon conducting the vibration reduction, so that it is not preferable. Meanwhile, in order to attain the advantageous effect of the present application more surely, it is more preferable to set the lower limit value of the conditional expression (5) to 0.40.

Further, in the variable magnification optical system according to the third embodiment of the present application, it is preferable that the following conditional expression (2) is satisfied:

$$5.00<f1/(-f2)<10.00 \qquad (2)$$

where f1 denotes a focal length of the first lens group, and f2 denotes a focal length of the second lens group.

The conditional expression (2) defines the focal length of the first lens group relative to the focal length of the second lens group. With satisfying the conditional expression (2), the variable magnification optical system according to the third embodiment of the present application is capable of correcting superbly curvature of field in the wide-angle end state and spherical aberration in the telephoto end state.

When the value of f1/(-f2) of the conditional expression (2) of the variable magnification optical system according to the third embodiment of the present application is equal to or exceeds the upper limit, refractive power of the second lens group becomes large, and it becomes difficult to correct curvature of field in the wide-angle end state. It is not preferable. Meanwhile, in order to attain the advantageous effect of the present application more surely, it is preferable to set the upper limit value of the conditional expression (2) to 8.00.

On the other hand, when the value of f1/(-f2) of the conditional expression (2) of the variable magnification optical system according to the third embodiment of the present application is equal to or falls below the lower limit, refractive power of the first lens group becomes large. Thus, spherical aberration is generated in the telephoto end state, so that it is not desirable.

Meanwhile, in order to attain the advantageous effect of the present application more surely, it is more preferable to set the lower limit value of the conditional expression (2) to 6.00.

In the variable magnification optical system according to the third embodiment of the present application, it is preferable that the following conditional expression (1) is satisfied:

$$0.60 < f1/f3 < 2.60 \quad (1)$$

where f1 denotes the focal length of the first lens group, and f3 denotes a focal length of the third lens group.

The conditional expression (1) defines the focal length of the first lens group relative to the focal length of the third lens group. With satisfying the conditional expression (1), the variable magnification optical system according to the third embodiment of the present invention is capable of correcting superbly spherical aberration upon focusing on a closely distant object in the telephoto end state and spherical aberration in the telephoto end state.

When the value of f1/f3 of the conditional expression (1) of the variable magnification optical system according to the third embodiment of the present application is equal to or exceeds the upper limit, refractive power of the third lens group becomes large, and it becomes difficult to correct spherical aberration upon focusing on the closely distant object in the telephoto end state. It is not preferable. Meanwhile, in order to attain the advantageous effect of the present application more surely, it is preferable to set the upper limit value of the conditional expression (1) to 2.50.

On the other hand, when the value of f1/f3 of the conditional expression (1) of the variable magnification optical system according to the third embodiment of the present application is equal to or falls below the lower limit, refractive power of the first lens group increases. Thus, spherical aberration is generated in the telephoto end state, so that it is not desirable.

Meanwhile, in order to attain the advantageous effect of the present application more surely, it is preferable to set the lower limit value of the conditional expression (1) to 0.40.

Further, in the variable magnification optical system according to the third embodiment of the present application, it is preferable that the following conditional expression (4) is satisfied:

$$0.10 < (-f2)/f3 < 0.38 \quad (4)$$

where f2 denotes the focal length of the second lens group, and f3 denotes the focal length of the third lens group.

The conditional expression (4) defines the focal length of the second lens group relative to the focal length of the third lens group. The variable magnification optical system according to the third embodiment of the present invention is capable of correcting superbly spherical aberration upon focusing on a closely distant object in the telephoto end state and curvature of field in the wide-angle end state, by satisfying the conditional expression (4).

When the value of (-f2)/f3 of the conditional expression (4) of the variable magnification optical system according to the third embodiment of the present application is equal to or exceeds the upper limit, refractive power of the third lens group becomes large, and it becomes difficult to correct spherical aberration upon focusing on the closely distant object in the telephoto end state. It is not preferable. Meanwhile, in order to attain the advantageous effect of the present application more surely, it is more preferable to set the upper limit value of the conditional expression (4) to 0.36.

On the other hand, when the value of (-f2)/f3 of the conditional expression (4) of the variable magnification optical system according to the third embodiment of the present application is equal to or falls below the lower limit, refractive power of the second lens group increases. Thus, it becomes difficult to correct curvature of field in the wide-angle end state, so that it is not desirable. Meanwhile, in order to attain the advantageous effect of the present application more surely, it is more preferable to set the lower limit value of the conditional expression (4) to 0.15.

In the variable magnification optical system according to the third embodiment of the present application, it is preferable that the first lens group has a negative lens that satisfies the following conditional expression (6):

$$1.90 < nd1 \quad (6)$$

where nd1 denotes refractive index at d-line (wavelength λ=587.6 nm) of the negative lens in the first lens group.

The conditional expression (6) defines refractive index at d-line (wavelength λ=587.6 nm) of the negative lens in the first lens group. With satisfying the conditional expression (6), the variable magnification optical system according to the third embodiment of the present invention is capable of correcting superbly spherical aberration in the telephoto end state.

When the value of nd1 of the conditional expression (6) of the variable magnification optical system according to the third embodiment of the present application is equal to or falls below the lower limit, it becomes difficult to correct spherical aberration in the telephoto end state, so that it is not desirable.

Meanwhile, in order to attain the advantageous effect of the present application more surely, it is preferable to set the lower limit value of the conditional expression (6) to 1.92.

Further, in the variable magnification optical system according to the third embodiment of the present application, it is preferable that a lens that is at least a portion of the rear lens group is moved to have a component in a direction perpendicular to the optical axis, and the vibration reduction lens has negative refractive power. By such configuration, it is possible to correct image blur upon generating camera shake, that is, to conduct vibration reduction. Moreover, the vibration reduction can be conducted by a lens group having small diameter, so the vibration reduction mechanism can be downsized and small in weight. Thus, a lens barrel can be downsized. This is preferable.

Furthermore, in the variable magnification optical system according to the third embodiment of the present application, it is preferable that the vibration reduction lens group is constructed by a cemented lens composed of a positive lens and a negative lens. Due to such configuration, eccentric coma aberration upon conducting the vibration reduction can be corrected excellently.

Further, in the variable magnification optical system according to the third embodiment of the present application, it is preferable that the following conditional expression (3) is satisfied:

$$0.20 < (-fVR)/f3 < 1.20 \quad (3)$$

where fVR denotes a focal length of the vibration reduction lens group, and f3 denotes the focal length of the third lens group.

The conditional expression (3) defines the focal length of the vibration reduction lens group relative to the focal length of the third lens group. With satisfying the conditional expression (3), the variable magnification optical system according to the third embodiment of the present invention is capable of correcting superbly spherical aberration upon focusing on a closely distant object in the telephoto end state and eccentric coma aberration upon conducting the vibration reduction.

When the value of (−fVR)/f3 of the conditional expression (3) of the variable magnification optical system according to the third embodiment of the present application is equal to or exceeds the upper limit, refractive power of the third lens group becomes large, and it becomes difficult to correct spherical aberration upon focusing on the closely distant object in the telephoto end state. It is not preferable. Meanwhile, in order to attain the advantageous effect of the present application more surely, it is preferable to set the upper limit value of the conditional expression (3) to 1.00.

On the other hand, when the value of (−fVR)/f3 of the conditional expression (3) of the variable magnification optical system according to the third embodiment of the present application is equal to or falls below the lower limit, refractive power of the vibration reduction lens group increases. Thus, eccentric coma aberration is generated upon conducting the vibration reduction, so that it is not desirable. Meanwhile, in order to attain the advantageous effect of the present application more surely, it is preferable to set the lower limit value of the conditional expression (3) to 0.40.

Further, in the variable magnification optical system according to the third embodiment of the present application, it is preferable that, upon zooming from the wide-angle end state to the telephoto end state, the second lens group is moved in the direction of the optical axis. With taking such a configuration, curvature of field can be corrected superbly.

Further, in the variable magnification optical system according to the third embodiment of the present application, it is preferable that, upon zooming from the wide-angle end state to the telephoto end state, the third lens group is moved in the direction of the optical axis. With taking such a configuration, spherical aberration can be corrected superbly.

Further, in the variable magnification optical system according to the third embodiment of the present application, it is preferable that, upon zooming from the wide-angle end state to the telephoto end state, the first lens group is moved in the direction of the optical axis. With taking such a configuration, higher zoom ratio can be attained.

The optical apparatus of the present application, is characterized in the provision of the variable magnification optical system according to the third embodiment having the above described configuration. Owing to this, an optical apparatus having high zoom ratio, being downsized and having superb optical performance, can be realized.

The method for manufacturing the variable magnification optical system according to the third embodiment of the present application is a method for manufacturing a variable magnification optical system comprising, in order from an object side: a first lens group having positive refractive power; a second lens group having negative refractive power; an aperture stop; a third lens group having positive refractive power; and a rear lens group, and being characterized in comprising the steps of:

constructing such that the third lens group is composed of a cemented lens constructed by a positive lens cemented with a negative lens;

constructing such that, upon zooming from a wide-angle end state to a telephoto end state, at least the rear lens group is moved toward the object side; and a distance between the first lens group and the second lens group, a distance between the second lens group and the third lens group, and a distance between the third lens group and the rear lens group are varied;

constructing such that upon focusing on from an infinitely distant object to a closely distant object, the third lens group as a whole is moved in the direction of the optical axis.

By such a method, it is possible to manufacture a variable magnification optical system that has high zoom ratio, is downsized and has superb optical performance.

The variable magnification optical system, the optical apparatus and the method for manufacturing the variable magnification optical system according to the fourth embodiment of the present application is explained below.

The variable magnification optical system according to the fourth embodiment of the present application comprises, in order from an object side: a first lens group having positive refractive power; a second lens group having negative refractive power; a third lens group having positive refractive power; and a fourth lens group having positive refractive power;

upon zooming from a wide-angle end state to a telephoto end state, a distance between the first lens group and the second lens group, a distance between the second lens group and the third lens group, and a distance between the third lens group and the fourth lens group are varied.

By such a configuration, the variable magnification optical system according to the fourth embodiment of the present application can realize zooming from a wide-angle end state to a telephoto end state, and variation in distortion caused upon zooming can be suppressed.

Further, the variable magnification optical system according to the fourth embodiment of the present application is characterized in having at least one lens that satisfies the following conditional expressions (7) and (8):

$$1.928 < ndh \qquad (7)$$

$$28.60 < vdh \qquad (8)$$

where ndh denotes refractive index at d-line (wavelength λ=587.6 nm) of the lens, and vdh denotes Abbe number at d-line (wavelength λ=587.6 nm) of the lens.

The conditional expression (7) defines optimal refractive index of the lens. With satisfying the conditional expression (7), the variable magnification optical system according to the fourth embodiment of the present application is capable of suppressing variation in spherical aberration as well as variation in astigmatism upon zooming, while being downsized.

When the value of ndh of the conditional expression (7) of the variable magnification optical system according to the fourth embodiment of the present application is equal to or falls below the lower limit, it becomes difficult to suppress variation in spherical aberration as well as variation in astigmatism upon zooming, so that high optical performance cannot become realized. Meanwhile, in order to attain the advantageous effect of the present application more surely, it is more preferable to set the lower limit value of the conditional expression (7) to 1.940.

In order to attain the advantageous effect of the present application more surely, it is more preferable to set the upper limit value of the conditional expression (7) to 2.800. If the value of ndh is made smaller than 2.800, it is possible to ensure sufficiently transmittance of visible light rays for material of the lens.

The conditional expression (8) defines optimal Abbe number of the lens. With satisfying the conditional expression (8), the variable magnification optical system according to the fourth embodiment of the present application is capable of suppressing variation in longitudinal chromatic aberration as well as variation in lateral chromatic aberration upon zooming, while being downsized.

When the value of vdh of the conditional expression (8) of the variable magnification optical system according to the fourth embodiment of the present application is equal to or falls below the lower limit, it becomes difficult to suppress variation in longitudinal chromatic aberration as well as variation in lateral chromatic aberration upon zooming, so that high optical performance cannot become realized. Meanwhile, in order to attain the advantageous effect of the present application more surely, it is more preferable to set the lower limit value of the conditional expression (8) to 29.00. In order to attain the advantageous effect of the present application further more surely, it is further more preferable to set the lower limit value of the conditional expression (8) to 32.00.

In order to attain the advantageous effect of the present application more surely, it is more preferable to set the upper limit value of the conditional expression (8) to 50.00. If the value of vdh is made smaller than 50.00, it is possible to suppress variation in longitudinal chromatic aberration and variation in lateral chromatic aberration which are generated at other lenses than the said lens upon zooming, and accordingly high optical performance can be realized.

Due to the above described configuration, a variable magnification optical system that is downsized and has high optical performance, can be realized.

In the variable magnification optical system according to the fourth embodiment of the present application, it is preferable that the first lens group has at least one said lens. By such configuration, it is possible to suppress respective variations in spherical aberration, astigmatism, longitudinal chromatic aberration and lateral chromatic aberration which are generated at the first lens group upon zooming.

Further, in the variable magnification optical system according to the fourth embodiment of the present application, it is preferable that the following conditional expression (9) is satisfied:

$$5.50 < f1/(-f2) < 15.00 \qquad (9)$$

where f1 denotes a focal length of the first lens group, and f2 denotes a focal length of the second lens group.

The conditional expression (9) defines the focal length of the first lens group relative to the focal length of the second lens group. With satisfying the conditional expression (9), the variable magnification optical system according to the fourth embodiment of the present invention is capable of suppressing variation in astigmatism upon zooming while maintaining high zoom ratio.

When the value of f1/(−f2) of the conditional expression (9) of the variable magnification optical system according to the fourth embodiment of the present application is equal to or falls below the lower limit, astigmatism is generated largely in the wide-angle end state, so that it becomes not possible to attain high optical performance. Meanwhile, in order to attain the advantageous effect of the present application more surely, it is preferable to set the lower limit value of the conditional expression (9) to 5.90.

On the other hand, when the value of f1/(−f2) of the conditional expression (9) of the variable magnification optical system according to the fourth embodiment of the present application is equal to or exceeds the upper limit, it becomes difficult to suppress variation in astigmatism generated at the second lens group upon zooming. Meanwhile, in order to attain the advantageous effect of the present application more surely, it is more preferable to set the upper limit value of the conditional expression (9) to 11.50. Further, in order to attain the advantageous effect of the present application more surely, it is more preferable to set the upper limit value of the conditional expression (9) to 10.20.

Due to the above described configuration, a variable magnification optical system that is downsized and has high optical performance, can be realized.

Further, in the variable magnification optical system according to the fourth embodiment of the present application, it is preferable that the following conditional expression (10) is satisfied:

$$0.220 < (-f2)/f3 < 0.530 \qquad (10)$$

where f2 denotes the focal length of the second lens group, and f3 denotes a focal length of the third lens group.

The conditional expression (10) defines a proper range of a ratio of the focal length of the second lens group to the focal length of the third lens group. The variable magnification optical system according to the fourth embodiment of the present invention is capable of suppressing variation in spherical aberration and variation in astigmatism upon zooming, while maintaining high zoom ratio, by satisfying the conditional expression (10).

When the value of (−f2)/f3 of the conditional expression (10) of the variable magnification optical system according to the fourth embodiment of the present application is equal to or falls below the lower limit, it becomes difficult to suppress variation in astigmatism generated at the second lens group upon zooming. Meanwhile, in order to attain the advantageous effect of the present application more surely, it is more preferable to set the lower limit value of the conditional expression (10) to 0.270.

On the other hand, when the value of (−f2)/f3 of the conditional expression (10) of the variable magnification optical system according to the fourth embodiment of the present application is equal to or exceeds the upper limit, it becomes difficult to suppress variation in spherical aberration generated at the third lens group upon zooming. Meanwhile, in order to attain the advantageous effect of the present application more surely, it is more preferable to set the upper limit value of the conditional expression (10) to 0.490. Furthermore, it is more preferable to set the upper limit value of the conditional expression (10) to 0.450.

In the variable magnification optical system according to the fourth embodiment of the present application, it is preferable that the first lens group has at least one lens that satisfies the following conditional expression (11):

$$0.450 < |fh/f1| < 1.400 \qquad (11)$$

where fh denotes a focal length of the lens in the first lens group, and f1 denotes the focal length of the first lens group.

The conditional expression (11) defines a proper focal length range of the said lens in the first lens group. Meanwhile, when the said lens is cemented with other lens, fh denotes the focal length of the said lens alone. In the variable magnification optical system according to the fourth embodiment of the present application, it is preferable that the first lens group has at least one said lens. The variable magnification optical system according to the fourth embodiment of the present application can suppress respective variations in spherical aberration, astigmatism, longitudinal chromatic aberration and lateral chromatic aberration which are generated upon zooming, by satisfying the conditional expression (11).

Here, with respect to the conditional expression (11), two cases where the said lens has positive refractive power and where the said lens has negative refractive power will be separately explained.

In the case where the said lens has positive refractive power, when the value of |fh/f1| of the conditional expression (11) of the variable magnification optical system according to the fourth embodiment of the present application is equal to or falls below the lower limit, it becomes difficult to suppress variation in longitudinal chromatic aberration and variation in lateral chromatic aberration generated at the said lens upon zooming, so that high optical performance can not be realized. On the other hand, when the value of |fh/f1| of the conditional expression (11) of the variable magnification optical system according to the fourth embodiment of the present application is equal to or exceeds the upper limit, it becomes difficult to suppress positive spherical aberration generated at the second lens group in the telephoto end state, thereby it becoming not possible to realize high optical performance.

In the case where the said lens has negative refractive power, when the value of |fh/f1| of the conditional expression (11) of the variable magnification optical system according to the fourth embodiment of the present application is equal to or falls below the lower limit, it becomes difficult to suppress variation in astigmatism generated at the said lens upon zooming, so that high optical performance can not be realized. On the other hand, when the value of |fh/f1| of the conditional expression (11) of the variable magnification optical system according to the fourth embodiment of the present application is equal to or exceeds the upper limit, it becomes difficult to suppress variation in longitudinal chromatic aberration and variation in lateral chromatic aberration which are generated at other lenses than the said lens upon zooming, and accordingly high optical performance can not be realized.

Meanwhile, in order to attain the advantageous effect of the present application more surely, it is more preferable to set the lower limit value of the conditional expression (11) to 0.620. Further, it is more preferable to set the upper limit value of the conditional expression (11) to 1.290.

In the variable magnification optical system according to the fourth embodiment of the present application, it is preferable that the fourth lens group has at least one said lens. With this configuration, it is possible to suppress, from the wide-angle end state to the telephoto end state, respective variations in spherical aberration, astigmatism, longitudinal chromatic aberration and lateral chromatic aberration which are generated at the fourth lens group.

In the variable magnification optical system according to the fourth embodiment of the present application, it is preferable that the second lens group has at least one said lens. With this configuration, it is possible to suppress, from the wide-angle end state to the telephoto end state, respective variations in spherical aberration, astigmatism, longitudinal chromatic aberration and lateral chromatic aberration which are generated at the second lens group upon zooming.

In the variable magnification optical system according to the fourth embodiment of the present application, it is preferable that the third lens group has at least one said lens. With this configuration, it is possible to suppress, from the wide-angle end state to the telephoto end state, respective variations in spherical aberration, astigmatism, longitudinal chromatic aberration and lateral chromatic aberration which are generated at the third lens group upon zooming.

In the variable magnification optical system according to the fourth embodiment of the present application, it is preferable that the first lens group has at least one said lens that has negative refractive power. With this configuration, it is possible to suppress variation in astigmatism, variation in spherical aberration, longitudinal chromatic aberration and particularly variation in secondary chromatic aberration, which are generated at the first lens group upon zooming, thereby it becoming possible to realize high optical performance.

In the variable magnification optical system according to the fourth embodiment of the present application, it is preferable that the fourth lens group has at least one said lens that has negative refractive power. With this configuration, it is possible to suppress variation in astigmatism, variation in spherical aberration and longitudinal chromatic aberration which are generated at the fourth lens group upon zooming, thereby it becoming possible to realize high optical performance.

In the variable magnification optical system according to the fourth embodiment of the present application, it is preferable that the fourth lens group has at least one said lens that satisfies the following conditional expression (12):

$$31.60 < vdh4 \quad (12)$$

Where vdh4 denotes Abbe number at d-line (wavelength λ=587.6 nm) of the said lens in the fourth lens group.

The conditional expression (12) defines optimal Abbe number of the said lens in the fourth lens group. With satisfying the conditional expression (12), the variable magnification optical system according to the fourth embodiment of the present invention is capable of suppressing longitudinal chromatic aberration and lateral chromatic aberration.

When the value of vdh4 of the conditional expression (12) of the variable magnification optical system according to the fourth embodiment of the present application is equal to or falls below the lower limit, it becomes difficult to suppress longitudinal chromatic aberration and lateral chromatic aberration generated at other lenses than the said lens, so that high optical performance can not be realized.

In the variable magnification optical system according to the fourth embodiment of the present application, it is preferable that the second lens group has at least one said lens that has negative refractive power. With this configuration, it is possible to suppress variation in longitudinal chromatic aberration, lateral chromatic aberration and particularly secondary chromatic aberration, which are generated at the second lens group, thereby it becoming possible to realize high optical performance.

In the variable magnification optical system according to the fourth embodiment of the present application, it is preferable that the third lens group has at least one said lens, has negative refractive power. With this configuration, it is possible to suppress longitudinal chromatic aberration and particularly secondary chromatic aberration, which are generated at the third lens group, thereby it becoming possible to realize high optical performance.

In the variable magnification optical system according to the fourth embodiment of the present application, it is preferable that the first lens group has at least one positive lens that satisfies the following conditional expression (13):

$$75.00 < vdp1 \quad (13)$$

Where vdp1 denotes Abbe number at d-line (wavelength λ=587.6 nm) of the said positive lens in the first lens group.

The conditional expression (13) defines optimal Abbe number of the said positive lens in the first lens group. With satisfying the conditional expression (13), the variable magnification optical system according to the fourth embodiment of the present invention is capable of suppressing variation in longitudinal chromatic aberration and variation in lateral chromatic aberration, upon zooming.

When the value of vdp1 of the conditional expression (13) of the variable magnification optical system according to the fourth embodiment of the present application is equal to or falls below the lower limit, it becomes difficult to suppress variation in longitudinal chromatic aberration and variation in lateral chromatic aberration, upon zooming, so that high optical performance can not be realized.

Meanwhile, in order to attain the advantageous effect of the present application more surely, it is preferable to set the upper limit value of the conditional expression (13) to 99.00. If the value of vdp1 in the conditional expression (13) of the variable magnification optical system according to the fourth embodiment of the present application, is smaller than 99.00, it is possible to suppress variation in longitudinal chromatic aberration and variation in lateral chromatic aberration which are generated at other lenses than the said positive lens upon zooming, so that high optical performance can be realized.

In the variable magnification optical system according to the fourth embodiment of the present application, it is preferable that the fourth lens group has a positive lens that satisfies the following conditional expression (14):

$$75.00 < vdp4 \quad (14)$$

Where vdp4 denotes Abbe number at d-line (wavelength $\lambda=587.6$ nm) of the said positive lens in the fourth lens group.

The conditional expression (14) defines optimal Abbe number of the said positive lens in the fourth lens group. With satisfying the conditional expression (14), the variable magnification optical system according to the fourth embodiment of the present invention is capable of suppressing variation in longitudinal chromatic aberration and variation in lateral chromatic aberration, upon zooming.

When the value of vdp4 of the conditional expression (14) of the variable magnification optical system according to the fourth embodiment of the present application is equal to or falls below the lower limit, it becomes difficult to suppress variation in longitudinal chromatic aberration, upon zooming, so that high optical performance can not be realized.

Meanwhile, in order to attain the advantageous effect of the present application more surely, it is preferable to set the upper limit value of the conditional expression (14) to 99.00. If the value of vdp4 in the conditional expression (14) of the variable magnification optical system according to the fourth embodiment of the present application, is smaller than 99.00, it is possible to suppress variation in longitudinal chromatic aberration generated at other lenses than the said positive lens, so that high optical performance can be realized.

Further, in the variable magnification optical system according to the fourth embodiment of the present application, it is preferable that, upon zooming from the wide-angle end state to the telephoto end state, a distance between the first lens group and the second lens group increases. With such configuration, the focal length of the first lens group and the focal length of the second lens group can be made proper. And, spherical aberration and astigmatism generated at each lens can be suppressed, and variation in spherical aberration and variation in astigmatism upon zooming can be suppressed.

Further, in the variable magnification optical system according to the fourth embodiment of the present application, it is preferable that, upon zooming from the wide-angle end state to the telephoto end state, a distance between the second lens group and the third lens group decreases. With such configuration, the focal length of the second lens group and the focal length of the third lens group can be made proper. And, spherical aberration and astigmatism generated at each lens can be suppressed, and variation in spherical aberration and variation in astigmatism upon zooming can be suppressed.

Further, in the variable magnification optical system according to the fourth embodiment of the present application, it is preferable that, upon zooming from the wide-angle end state to the telephoto end state, a distance between the third lens group and the fourth lens group increases. With such configuration, variation in spherical aberration and variation in astigmatism generated at the third lens group and the fourth lens group upon zooming can be suppressed.

The optical apparatus of the present application, is characterized in the provision of the variable magnification optical system according to the fourth embodiment having the above described configuration. Owing to this, an optical apparatus that is downsized and has high optical performance, can be realized.

The method for manufacturing the variable magnification optical system according to the fourth embodiment of the present application is a method for manufacturing a variable magnification optical system comprising, in order from an object side: a first lens group having positive refractive power; a second lens group having negative refractive power; a third lens group having positive refractive power; and a fourth lens group having positive refractive power, and being characterized in comprising the steps of:

constructing such that at least one lens satisfies the following conditional expressions (7) and (8):

$$1.928 < ndh \quad (7)$$

$$28.60 < vdh \quad (8)$$

where ndh denotes refractive index at d-line (wavelength $\lambda=587.6$ nm) of the said lens, and vdh denotes Abbe number at d-line (wavelength $\lambda=587.6$ nm) of the said lens; and constructing such that, upon zooming from a wide-angle end state to a telephoto end state, a distance between the first lens group and the second lens group, a distance between the second lens group and the third lens group, and a distance between the third lens group and the fourth lens group are varied. By such a configuration, it is possible to manufacture a variable magnification optical system that is downsized and has high optical performance.

Hereinafter, a variable magnification optical system relating to numerical examples according to the first to the third embodiments of the present application will be explained with reference to the accompanying drawings. Meanwhile, the first to the third examples are common to all of the first to the third embodiments.

(First Example)

Figure 1B:
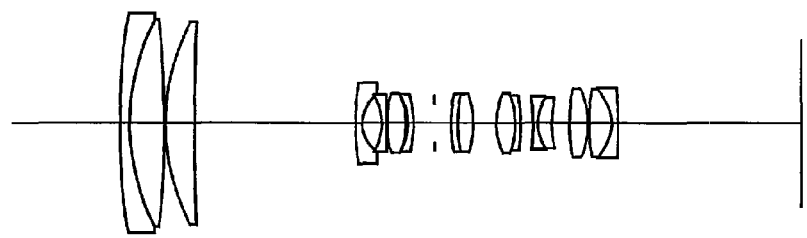
Figure 1C:
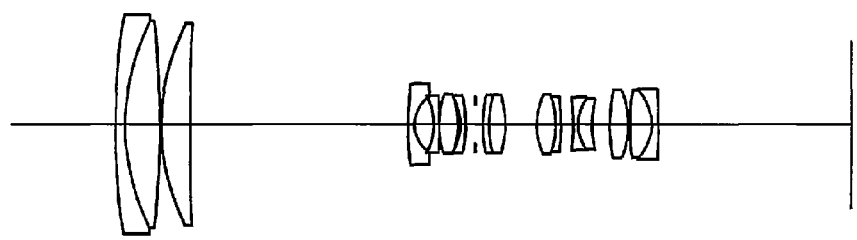

FIGS. 1A, 1B and 1C are sectional views showing a variable magnification optical system according to a first example that is common to a first to third embodiments of the present application, in which FIG. 1A shows sectional view in a wide-angle end state, FIG. 1B shows sectional view in an intermediate focal length state, and FIG. 1C shows sectional view in a telephoto end state.

The variable magnification optical system according to the present example is composed of, in order from an object side: a first lens group G1 having positive refractive power; a second lens group G2 having negative refractive power; a third lens group G3 having positive refractive power; and a rear lens group GR having positive refractive power. The rear lens group GR is composed of, in order from an object side: a fourth lens group G4 having negative refractive power and a fifth lens group G5 having positive refractive power.

The first lens group G1 consists of, in order from the object side, a cemented lens constructed by a negative meniscus lens L11 having a convex surface facing the object side cemented with a double convex positive lens L12, and a positive meniscus lens L13 having a convex surface facing the object side.

The second lens group G2 consists of, in order from the object side, a negative meniscus lens L21 having a convex surface facing the object side, a double concave negative lens L22, a double convex positive lens L23 and a negative meniscus lens L24 having a concave surface facing the object side. The most object side negative meniscus lens L21 in the second lens group G2 is an aspherical lens whose object side lens surface is aspherically shaped.

The third lens group G3 consists of, in order from the object side, a cemented lens constructed by a negative meniscus lens L31 having a convex surface facing the object side cemented with a double convex positive lens L32. An aperture stop S is disposed at the object side of the third lens group G3.

The fourth lens group G4 consists of, in order from the object side, a first segment lens group G41 having positive refractive power and a second segment lens group G42 having negative refractive power.

The first segment lens group G41 consists of, in order from the object side, a cemented lens constructed by a double convex positive lens L41 cemented with a negative meniscus lens L42 having a concave surface facing the object side.

The second segment lens group G42 consists of, in order from the object side, a cemented lens constructed by a double concave negative lens L43 cemented with a positive meniscus lens L44 having a convex surface facing the object side. The most object side negative lens L43 in the second segment lens group G42 is an aspherical lens whose object side surface is aspherically shaped.

The fifth lens group G5 consists of, in order from the object side, a double convex positive lens L51, and a cemented lens constructed by a double convex positive lens L52 cemented with a negative meniscus lens L53 having a concave surface facing the object side. The most object side positive lens L51 in the fifth lens group G5 is an aspherical lens whose object side surface is aspherically shaped.

In the variable magnification optical system according to the present example, zooming from the wide-angle end state to the telephoto end state, is conducted by moving the first lens group G1, the third lens group G3, the fourth lens group G4 and the fifth lens group G5 along the optical axis toward the object side and moving the second lens group G2 and the aperture stop S along the optical axis such that a distance between the first lens group G1 and the second lens group G2 is increased, a distance between the second lens group G2 and the third lens group G3 is decreased, a distance between the third lens group G3 and the fourth lens group G4 is varied, and a distance between the fourth lens group G4 and the fifth lens group G5 is decreased.

In the variable magnification optical system according to the present example, the third group G3 as a whole is moved along the optical axis toward the image side, thereby conducting focusing from an infinitely distant object to a close distant object.

In the variable magnification optical system according to the present example, only the second segment lens group G42 in the fourth lens group G4 is moved, as a vibration reduction lens group, to have a component in a direction perpendicular to the optical axis, thereby conducting vibration reduction.

It is noted that in a lens system having a focal length f of the whole lens system and a vibration reduction coefficient K, which is a ratio of a moving amount of an image on the image plane I to a moving amount of the vibration reduction lens group upon conducting a vibration reduction, it is possible to correct rotational camera shake of an angle θ, by moving the vibration reduction lens group by the amount of (f·tan θ)/K perpendicularly to the optical axis.

Accordingly, in the variable magnification optical system according to the present example, in the wide-angle end state, the vibration reduction coefficient K is −1.03, and the focal length is 10.30 (mm), so that the moving amount of the second segment lens group G42 for correcting a rotational camera shake of 0.62 degrees is −0.11 (mm). In the telephoto end state, the vibration reduction coefficient K is −1.87, and the focal length is 97.00 (mm), so that the moving amount of the second segment lens group G42 for correcting a rotational camera shake of 0.20 degrees is −0.18 (mm).

Table 1 below shows various values of the variable magnification optical system according to the present example.

In table 1, f denotes a focal length, and BF denotes a back focal length (a distance on the optical axis between the most image side lens surface and the image plane I).

In [Surface Data], m denotes an order of an optical surface counted from the object side, r denotes a radius of curvature, d denotes a surface-to-surface distance (an interval from an n-th surface to an (n+1)-th surface, where n is an integer.), nd denotes refractive index for d-line (wavelength λ=587.6 nm) and vd denotes an Abbe number for d-line (wavelength λ=587.6 nm). Further, OP denotes an object surface, and I denotes an image plane. Meanwhile, radius of curvature r=∞ denotes a plane surface. The position of an aspherical surface is expressed by attaching "*" to the surface number, and in the column of the radius of curvature, a paraxial radius of curvature is shown.

In [Aspherical Data], with respect to an aspherical surface shown in [Surface Data], an aspherical surface coefficient and a conical coefficient are shown in the case where the aspherical surface is exhibited by the following expression:

$$X=(h^2/r)/[1+[1-\kappa(h^2/r^2)]^{1/2}]+A4h^4+A6h^6+A8h^8+A10h^{10}$$

where h denotes a vertical height from the optical axis, X denotes a sag amount which is a distance along the optical axis from the tangent surface at the vertex of the aspherical surface to the aspherical surface at the vertical height from the optical axis, κ denotes a conical coefficient, A4, A6, A8 and A10 denote respective aspherical coefficients, and r denotes a paraxial radius of curvature that is a radius of curvature of a reference sphere. "E−n", where n is an integer, denotes "×10$^{-n}$", for example, "1.234E−05" denotes "1.234× 10$^{-5}$". The 2nd order aspherical surface coefficient A2 is 0, and omitted in the description.

In [Various Data], FNO denotes an f-number, 2ω denotes an angle of view (unit "°", Y denotes an image height, TL denotes a total length of the variable magnification optical system, that is, a distance along the optical axis from the first surface to the image plane I, do denotes a variable interval between an n-th surface and an (n+1)-th surface. β denotes a phototaking magnification upon focusing on an object of 0.45 mm. Meanwhile, W denotes a wide-angle end state, M denotes an intermediate focal length state, and T denotes a telephoto end state.

In [Lens Group Data], a starting surface ST and focal length of each lens group are shown.

In [Values for Conditional Expressions], values corresponding to respective conditional expressions are shown.

It is noted, here, that "mm" is generally used for the unit of length such as the focal length f, the radius of curvature r and the unit for other lengths shown in Table 1. However, since similar optical performance can be obtained by an optical system proportionally enlarged or reduced its dimension, the unit is not necessarily to be limited to "mm".

The explanation of reference symbols in Table 1 described above, is the same in Tables for the other examples.

TABLE 1

First Example

[Surface Data]

| m | r | d | nd | νd |
|---|---|---|---|---|
| OP | ∞ | | | |
| 1 | 149.869 | 1.600 | 1.94967 | 27.56 |
| 2 | 44.374 | 6.840 | 1.49782 | 82.51 |
| 3 | −243.506 | 0.100 | 1.00000 | |
| 4 | 45.376 | 5.351 | 1.86790 | 41.78 |
| 5 | 311.414 | d5 | 1.00000 | |
| *6 | 89.024 | 1.200 | 1.83481 | 42.73 |
| 7 | 8.490 | 3.758 | 1.00000 | |
| 8 | −15.726 | 1.000 | 1.83481 | 42.73 |
| 9 | 250.000 | 0.100 | 1.00000 | |
| 10 | 25.275 | 3.293 | 1.80809 | 22.74 |
| 11 | −17.475 | 0.548 | 1.00000 | |
| 12 | −12.620 | 1.000 | 1.81600 | 46.59 |
| 13 | −33.425 | d13 | 1.00000 | |
| 14 | ∞ | d14 | 1.00000 | Aperture Stop S |
| 15 | 29.168 | 1.000 | 1.88904 | 39.77 |
| 16 | 18.240 | 3.207 | 1.59313 | 66.16 |
| 17 | −26.526 | d17 | 1.00000 | |
| 18 | 14.286 | 3.565 | 1.49782 | 82.51 |
| 19 | −21.978 | 1.000 | 1.90200 | 25.23 |
| 20 | −82.840 | 2.205 | 1.00000 | |
| *21 | −52.307 | 1.000 | 1.84898 | 43.01 |
| 22 | 9.141 | 2.692 | 1.95000 | 29.37 |
| 23 | 25.864 | d23 | 1.00000 | |
| *24 | 35.441 | 3.335 | 1.58913 | 61.22 |
| 25 | −21.319 | 0.300 | 1.00000 | |
| 26 | 42.310 | 4.403 | 1.58144 | 40.98 |
| 27 | −10.198 | 1.200 | 1.95400 | 33.46 |
| 28 | −300.472 | BF | 1.00000 | |
| I | ∞ | | | |

[Aspherical Surface Data]

| m | κ | A4 | A6 | A8 | A10 |
|---|---|---|---|---|---|
| 6 | 1.00000 | 3.46E−05 | −1.39E−07 | −5.60E−11 | 1.26E−11 |
| 21 | 1.00000 | 1.74E−06 | 1.28E−07 | −2.64E−09 | |
| 24 | 1.00000 | −1.23E−05 | 1.47E−07 | −5.49E−10 | |

[Various Data]
zoom ratio 9.42

| | W | M | T |
|---|---|---|---|
| f | 10.30 | 50.00 | 97.00 |
| FNO | 3.50 | 5.20 | 5.60 |
| 2ω | 79.80 | 18.04 | 9.37 |
| Y | 8.19 | 8.19 | 8.19 |
| TL | 99.26 | 129.21 | 139.68 |

[Upon focusing an infinitely distant object]

| | W | M | T |
|---|---|---|---|
| f | 10.30 | 50.00 | 97.00 |
| d5 | 2.000 | 30.682 | 41.260 |
| d13 | 18.534 | 4.142 | 2.000 |
| d14 | 3.765 | 2.963 | 1.400 |

TABLE 1-continued

First Example

| d17 | 3.542 | 4.343 | 5.907 |
|---|---|---|---|
| d23 | 8.018 | 3.307 | 3.300 |
| BF | 14.70 | 35.08 | 37.11 |

[Upon focusing on a closely distant object]

| | W | M | T |
|---|---|---|---|
| β | −0.025 | −0.103 | −0.153 |
| d5 | 2.000 | 30.682 | 41.260 |
| d13 | 18.534 | 4.142 | 2.000 |
| d14 | 4.216 | 4.444 | 5.211 |
| d17 | 3.090 | 2.863 | 2.096 |
| d23 | 8.018 | 3.307 | 3.300 |
| BF | 14.70 | 35.08 | 37.11 |

[Lens Group Data]

| | ST | f |
|---|---|---|
| G1 | 1 | 66.85 |
| G2 | 6 | −9.36 |
| G3 | 15 | 27.88 |
| G4 | 18 | −160.92 |
| G5 | 24 | 33.56 |
| GR | 18 | 53.0 |

[Values for Conditional Expression]

| (1) | f1/f3 = 2.40 |
|---|---|
| (2) | f1/(−f2) = 7.14 |
| (3) | (−fVR)/f3 = 0.85 |
| (4) | (−f2)/f3 = 0.34 |
| (5) | f3/fR = 0.53 |
| (6) | nd1 = 1.94967 |

Figure 2A:
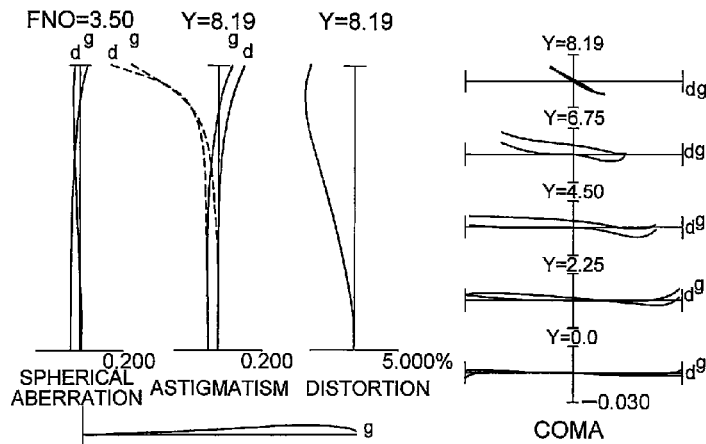
Figure 2B:
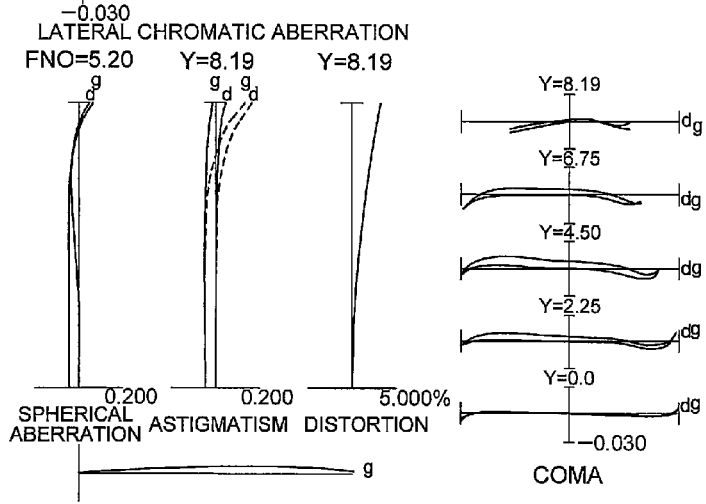
Figure 2C:
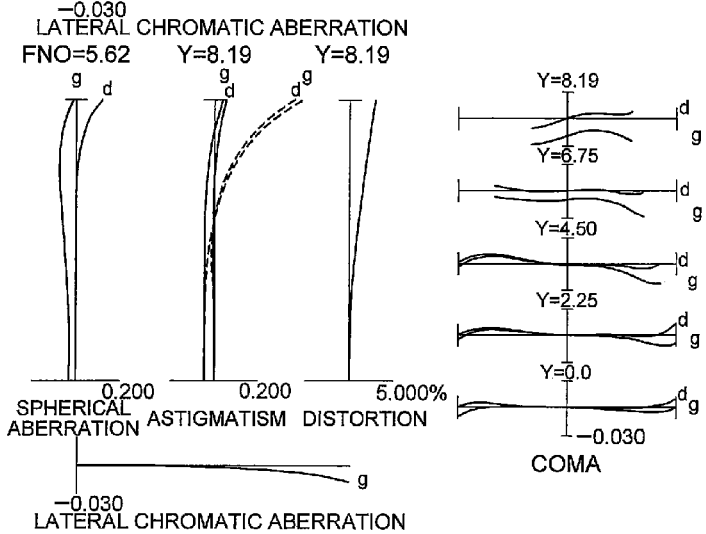

FIGS. 2A, 2B and 2C are graphs showing various aberrations of the variable magnification optical system according to the first example of the present application upon focusing on an infinitely distant object, in which FIG. 2A is in a wide-angle end state, FIG. 2B is in an intermediate focal length state, and FIG. 2C is in a telephoto end state.

Figure 3A:
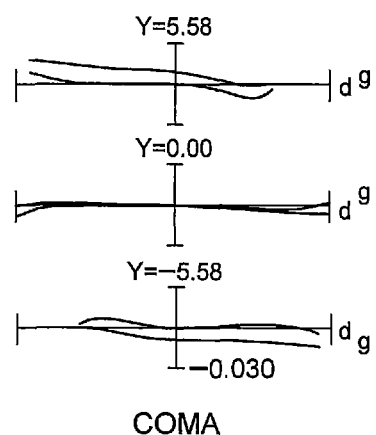
Figure 3B:
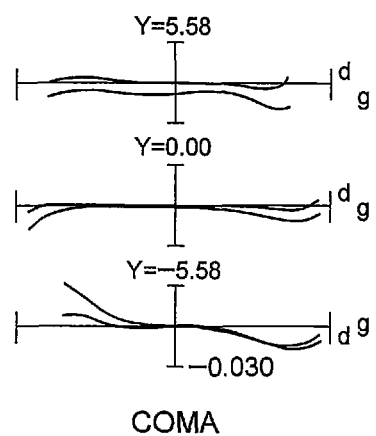

FIGS. 3A and 3B are graphs showing meridional transverse aberration of the variable magnification optical system according to the first example upon focusing on an infinitely distant object in the wide-angle end state with carrying out vibration reduction in which FIG. 3A is for a rotational camera shake of 0.62 degrees in the wide-angle end state, and FIG. 3B is for a rotational camera shake of 0.20 degrees in a telephoto end state.

In respective graphs, FNO denotes an f-number, Y denotes an image height. In respective graphs, d denotes an aberration curve at d-line (wavelength λ=587.6 nm), and g denotes an aberration curve at g-line (wavelength λ=435.8 nm). In the graph showing astigmatism, a solid line indicates a sagittal image plane, and a broken line indicates a meridional image plane.

Incidentally, the above-described explanation regarding various aberration graphs is the same as the other Examples.

As is apparent from the respective graphs, the variable magnification optical system according to the present example shows superb optical performance as a result of good corrections to various aberrations from the wide-angle end state to the telephoto end state, and also shows superb optical performance upon carrying out vibration reduction.

(Second Example)

Figure 4A:
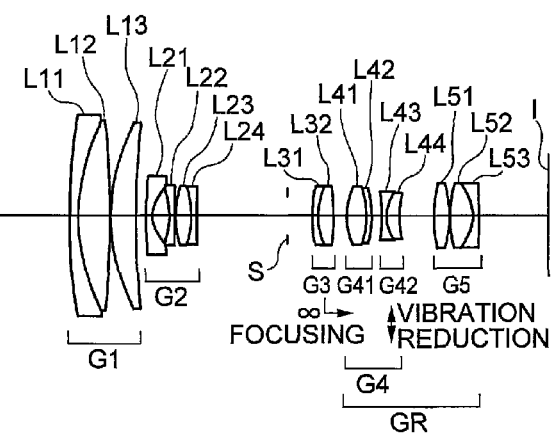
Figure 4B:
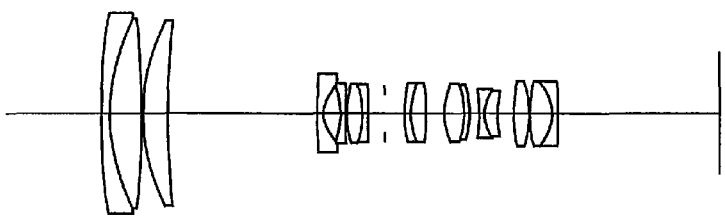
Figure 4C:
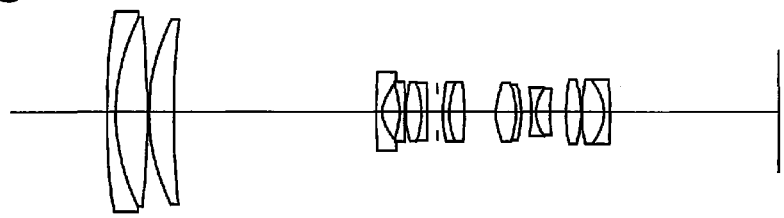

FIGS. 4A, 4B and 4C are sectional views showing a variable magnification optical system according to a second example that is common to the first to third embodiments of the present application, in which FIG. 4A shows sectional view in a wide-angle end state, FIG. 4B shows sectional view in an intermediate focal length state, and FIG. 4C shows sectional view in a telephoto end state.

The variable magnification optical system according to the present example is composed of, in order from an object side: a first lens group G1 having positive refractive power; a second lens group G2 having negative refractive power; a third lens group G3 having positive refractive power; and a rear lens group GR having positive refractive power. The rear lens group GR is composed of, in order from an object side: a fourth lens group G4 having negative refractive power and a fifth lens group G5 having positive refractive power.

The first lens group G1 consists of, in order from the object side, a cemented lens constructed by a negative meniscus lens L11 having a convex surface facing the object side cemented with a double convex positive lens L12, and a positive meniscus lens L13 having a convex surface facing the object side.

The second lens group G2 consists of, in order from the object side, a negative meniscus lens L21 having a convex surface facing the object side, a double concave negative lens L22, a cemented lens constructed by a double convex positive lens L23 and a negative meniscus lens L24 having a concave surface facing the object side. The most object side negative meniscus lens L21 in the second lens group G2 is an aspherical lens whose object side lens surface is aspherically shaped.

The third lens group G3 consists of, in order from the object side, a cemented lens constructed by a negative meniscus lens L31 having a convex surface facing the object side cemented with a double convex positive lens L32. An aperture stop S is disposed at the object side of the third lens group G3.

The fourth lens group G4 consists of, in order from the object side, a first segment lens group G41 having positive refractive power and a second segment lens group G42 having negative refractive power.

The first segment lens group G41 consists of, in order from the object side, a cemented lens constructed by a double convex positive lens L41 cemented with a negative meniscus lens L42 having a concave surface facing the object side.

The second segment lens group G42 consists of, in order from the object side, a cemented lens constructed by a double concave negative lens L43 cemented with a double convex positive lens L44. The most object side negative lens L43 in the second segment lens group G42 is an aspherical lens whose object side surface is aspherically shaped.

The fifth lens group G5 consists of, in order from the object side, a double convex positive lens L51, a cemented lens constructed by a double convex positive lens L52 cemented with a negative meniscus lens L53 having a concave surface facing the object side. The most object side positive lens L51 in the fifth lens group G5 is an aspherical lens whose object side surface is aspherically shaped.

In the variable magnification optical system according to the present example, zooming from the wide-angle end state to the telephoto end state, is conducted by moving the first lens group G1, the third lens group G3, the fourth lens group G4 and the fifth lens group G5 along the optical axis toward the object side and moving the second lens group G2 and the aperture stop S along the optical axis such that a distance between the first lens group G1 and the second lens group G2 is increased, a distance between the second lens group G2 and the third lens group G3 is decreased, a distance between the third lens group G3 and the fourth lens group G4 is varied, and a distance between the fourth lens group G4 and the fifth lens group G5 is decreased.

In the variable magnification optical system according to the present example, the third group G3 as a whole is moved along the optical axis toward the image side, thereby conducting focusing from an infinitely distant object to a close distant object.

In the variable magnification optical system according to the present example, only the second segment lens group G42 in the fourth lens group G4 is moved, as a vibration reduction lens group, to have a component in a direction perpendicular to the optical axis, thereby conducting vibration reduction.

In the variable magnification optical system according to the present example, in the wide-angle end state, the vibration reduction coefficient is −1.43, and the focal length is 10.30 (mm), so that the moving amount of the second segment lens group G42 for correcting a rotational camera shake of 0.62 degrees is −0.08 (mm). In the telephoto end state, the vibration reduction coefficient is −2.59, and the focal length is 97.00 (mm), so that the moving amount of the second segment lens group G42 for correcting a rotational camera shake of 0.20 degrees is −0.13 (mm).

TABLE 2

Second Example

[Surface Data]

| m | r | d | nd | νd |
|---|---|---|---|---|
| OP | ∞ | | | |
| 1 | 161.271 | 1.600 | 1.95000 | 29.37 |
| 2 | 49.424 | 6.736 | 1.49782 | 82.51 |
| 3 | −163.134 | 0.100 | 1.00000 | |
| 4 | 42.661 | 5.130 | 1.80400 | 46.60 |
| 5 | 174.429 | d5 | 1.00000 | |
| *6 | 81.138 | 1.200 | 1.81600 | 46.59 |
| 7 | 8.430 | 3.674 | 1.00000 | |
| 8 | −20.479 | 1.000 | 1.88300 | 40.76 |
| 9 | 120.000 | 0.100 | 1.00000 | |
| 10 | 20.642 | 3.336 | 1.80809 | 22.74 |
| 11 | −21.855 | 1.000 | 1.83481 | 42.73 |
| 12 | −2443.660 | d12 | 1.00000 | |
| 13 | ∞ | d13 | 1.00000 | Aperture Stop S |
| 14 | 32.818 | 1.000 | 1.95400 | 33.46 |
| 15 | 12.652 | 3.417 | 1.75484 | 52.35 |
| 16 | −38.178 | d16 | 1.00000 | |
| 17 | 14.363 | 4.402 | 1.49782 | 82.51 |
| 18 | −19.407 | 1.000 | 1.88087 | 27.51 |
| 19 | −31.773 | 2.035 | 1.00000 | |
| *20 | −36.627 | 1.000 | 1.88300 | 40.66 |
| 21 | 7.873 | 2.750 | 1.95000 | 29.37 |
| 22 | 20.460 | d22 | 1.00000 | |
| *23 | 34.272 | 3.115 | 1.61800 | 63.34 |
| 24 | −25.939 | 0.100 | 1.00000 | |
| 25 | 29.742 | 4.552 | 1.58144 | 40.98 |
| 26 | −10.558 | 1.200 | 1.95400 | 33.46 |
| 27 | −228.600 | BF | 1.00000 | |
| I | ∞ | | | |

[Aspherical Surface Data]

| m | κ | A4 | A6 | A8 |
|---|---|---|---|---|
| 6 | 1.00000 | −2.03E−06 | 2.60E−08 | −4.85E−10 |
| 20 | 1.00000 | 2.72E−05 | −6.63E−08 | |
| 23 | 1.00000 | −9.13E−06 | 3.14E−08 | |

[Various Data]
zoom ratio 9.42

| | W | M | T |
|---|---|---|---|
| f | 10.30 | 50.00 | 97.00 |
| FNO | 3.50 | 5.20 | 5.60 |

TABLE 2-continued

Second Example

| 2ω | 79.80 | 18.04 | 9.37 |
|---|---|---|---|
| Y | 8.19 | 8.19 | 8.19 |
| TL | 98.69 | 127.23 | 138.71 |

[Upon focusing an infinitely distant object]

| | W | M | T |
|---|---|---|---|
| f | 10.30 | 50.00 | 97.00 |
| d5 | 2.000 | 30.607 | 41.889 |
| d12 | 18.865 | 3.375 | 2.000 |
| d13 | 5.283 | 4.127 | 1.400 |
| d16 | 2.502 | 3.658 | 6.385 |
| d22 | 7.241 | 3.302 | 3.300 |
| BF | 14.35 | 33.71 | 35.29 |

[Upon focusing on a closely distant object]

| | W | M | T |
|---|---|---|---|
| β | −0.025 | −0.103 | −0.152 |
| d5 | 2.000 | 30.607 | 41.889 |
| d12 | 18.865 | 3.375 | 2.000 |
| d13 | 5.785 | 5.785 | 5.774 |
| d16 | 2.000 | 2.000 | 2.011 |
| d22 | 7.241 | 3.302 | 3.300 |
| BF | 14.35 | 33.71 | 35.29 |

[Lens Group Data]

| | ST | f |
|---|---|---|
| G1 | 1 | 69.02 |
| G2 | 6 | −10.07 |
| G3 | 14 | 30.75 |
| G4 | 17 | −167.27 |
| G5 | 23 | 28.42 |
| GR | 17 | 46.2 |

[Values for Conditional Expression]

| (1) | f1/f3 = 2.24 |
|---|---|
| (2) | f1/(−f2) = 6.85 |
| (3) | (−fVR)/f3 = 0.51 |
| (4) | (−f2)/f3 = 0.33 |
| (5) | f3/fR = 0.67 |
| (6) | nd1 = 1.95000 |

Figure 5A:
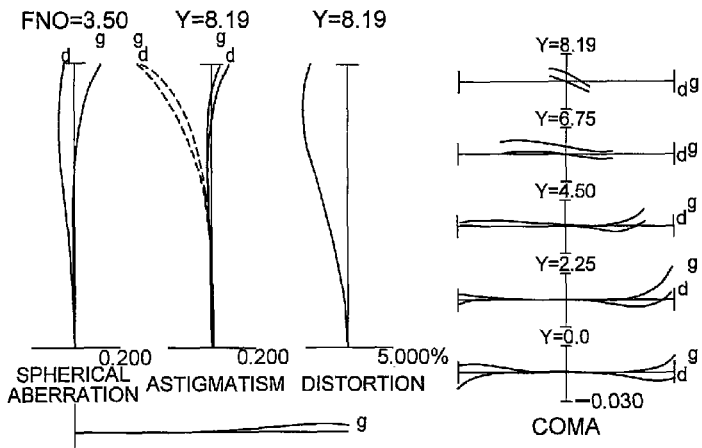
Figure 5B:
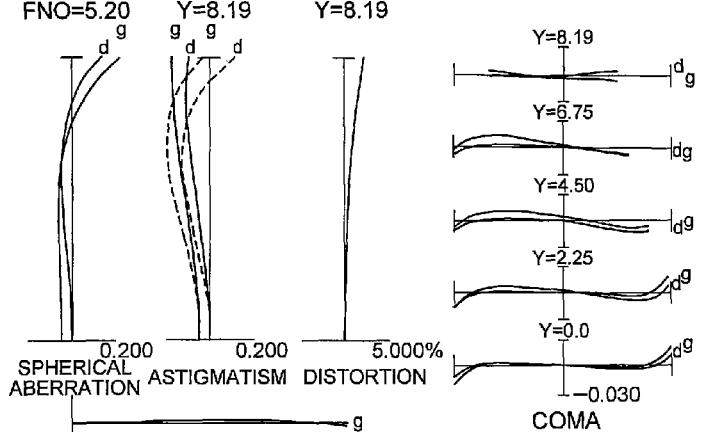
Figure 5C:
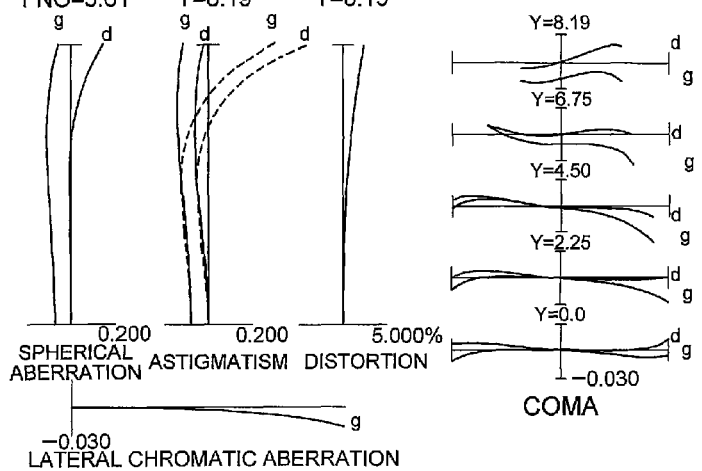

FIGS. 5A, 5B and 5C are graphs showing various aberrations of the variable magnification optical system according to the second example of the present application upon focusing on an infinitely distant object, in which FIG. 5A is in a wide-angle end state, FIG. 5B is in an intermediate focal length state, and FIG. 5C is in a telephoto end state.

Figure 6A:
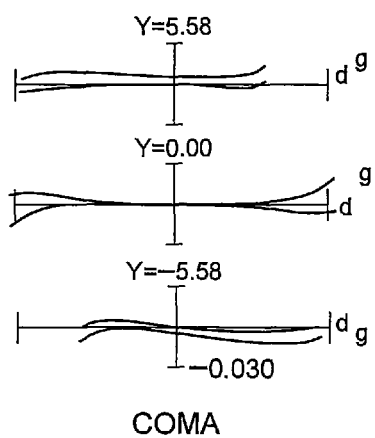
Figure 6B:
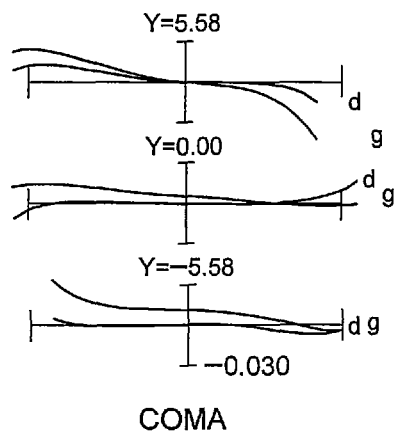

FIGS. 6A and 6B are graphs showing meridional transverse aberration of the variable magnification optical system according to the second example upon focusing on an infinitely distant object in the wide-angle end state with carrying out vibration reduction in which FIG. 6A is for a rotational camera shake of 0.62 degrees in the wide-angle end state, and FIG. 6B is for a rotational camera shake of 0.20 degrees in a telephoto end state.

As is apparent from the respective graphs, the variable magnification optical system according to the present example shows superb optical performance as a result of good corrections to various aberrations from the wide-angle end state to the telephoto end state, and also shows superb optical performance upon carrying out vibration reduction.

(Third Example)

Figure 7A:
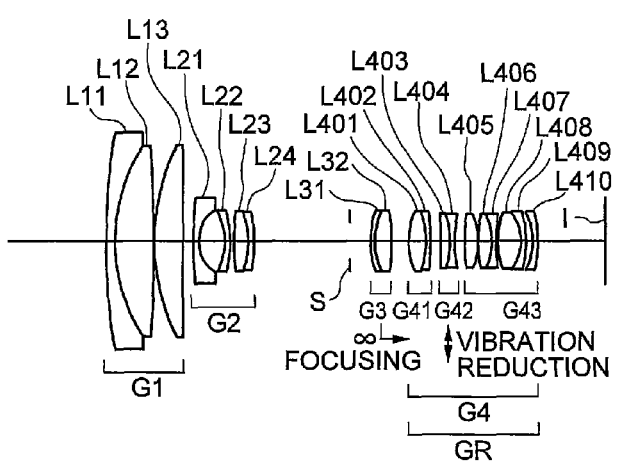
Figure 7B:
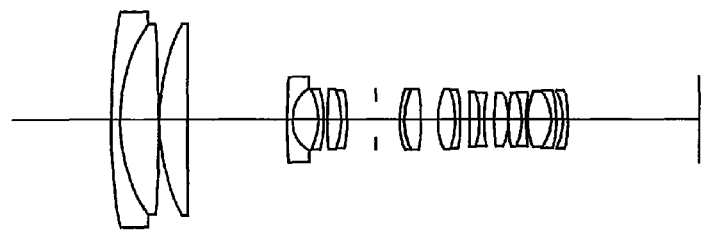
Figure 7C:
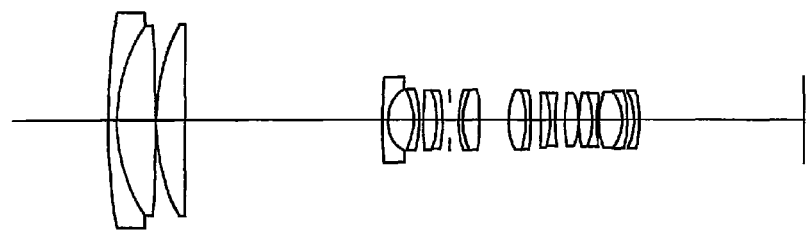

FIGS. 7A, 7B and 7C are sectional views showing a variable magnification optical system according to a third example that is common to the first to third embodiments of the present application, in which FIG. 7A shows sectional view in a wide-angle end state, FIG. 7B shows sectional view in an intermediate focal length state, and FIG. 7C shows sectional view in a telephoto end state.

The variable magnification optical system according to the present example is composed of, in order from an object side: a first lens group G1 having positive refractive power; a second lens group G2 having negative refractive power; a third lens group G3 having positive refractive power; and a rear lens group GR having positive refractive power. The rear lens group GR consists of a fourth lens group G4 having positive refractive power.

The first lens group G1 consists of, in order from the object side, a cemented lens constructed by a negative meniscus lens L11 having a convex surface facing the object side cemented with a double convex positive lens L12, and a plano-convex positive lens L13 having a convex surface facing the object side.

The second lens group G2 consists of, in order from the object side, a negative meniscus lens L21 having a convex surface facing the object side, a negative meniscus lens L22 having a concave surface facing the object side, a cemented lens constructed by a double convex positive lens L23 and a negative meniscus lens L24 having a concave surface facing the object side. The most object side negative meniscus lens L21 in the second lens group G2 is an aspherical lens whose object side lens surface is provided with a resin layer to be formed with an aspherical surface.

The third lens group G3 consists of, in order from the object side, a cemented lens constructed by a negative meniscus lens L31 having a convex surface facing the object side cemented with a double convex positive lens L32. An aperture stop S is disposed at the object side of the third lens group G3.

The fourth lens group G4 consists of, in order from the object side, a first segment lens group G41 having positive refractive power, a second segment lens group G42 having negative refractive power and a third segment lens group G43 having positive refractive power.

The first segment lens group G41 consists of, in order from the object side, a cemented lens constructed by a double convex positive lens L401 cemented with a negative meniscus lens L402 having a concave surface facing the object side.

The second segment lens group G42 consists of, in order from the object side, a cemented lens constructed by a positive meniscus lens L403 cemented with a double concave negative lens L404. The most image side negative lens L404 in the second segment lens group G42 is an aspherical lens whose image side surface is aspherically shaped.

The third segment lens group G43 consists of, in order from the object side, a double convex positive lens 405, a cemented lens constructed by a double convex positive lens L406 cemented with a double concave negative lens L407, a cemented lens constructed by a double convex positive lens L408 cemented with a negative meniscus lens L409 having a concave surface facing the object side, and a negative meniscus lens having a concave surface facing the object side. The most image side negative lens L410 in the third segment lens group G43 is an aspherical lens whose image side surface is aspherically shaped.

By the above described configuration, in the variable magnification optical system according to the present example, zooming from the wide-angle end state to the telephoto end state, is conducted by moving the first lens group G1, the third lens group G3 and the fourth lens group G4 along the optical axis toward the object side and moving the second lens group G2 and the aperture stop S along the optical axis such that a distance between the first lens group G1 and the second lens group G2 is increased, a distance between the second lens group G2 and the third lens group G3 is decreased, and a distance between the third lens group G3 and the fourth lens group G4 is varied.

In the variable magnification optical system according to the present example, the third group G3 as a whole is moved along the optical axis toward the image side, thereby conducting focusing from an infinitely distant object to a close distant object.

In the variable magnification optical system according to the present example, only the second segment lens group G42 in the fourth lens group G4 is moved, as a vibration reduction lens group, to have a component in a direction perpendicular to the optical axis, thereby conducting vibration reduction.

In the variable magnification optical system according to the present example, in the wide-angle end state, the vibration reduction coefficient is −0.92, and the focal length is 10.30 (mm), so that the moving amount of the second segment lens group G42 for correcting a rotational camera shake of 0.62 degrees is −0.12 (mm). In the telephoto end state, the vibration reduction coefficient is −1.68, and the focal length is 97.00 (mm), so that the moving amount of the second segment lens group G42 for correcting a rotational camera shake of 0.20 degrees is −0.20 (mm).

Table 3 below shows various values of the variable magnification of the present example.

TABLE 3

Third Example

[Surface Data]

| m | r | d | nd | νd |
|---|---|---|---|---|
| OP | ∞ | | | |
| 1 | 145.183 | 1.700 | 2.00100 | 29.14 |
| 2 | 36.639 | 8.100 | 1.49782 | 82.57 |
| 3 | −399.352 | 0.100 | 1.00000 | |
| 4 | 43.208 | 6.000 | 1.88300 | 40.66 |
| 5 | ∞ | d5 | 1.00000 | |
| *6 | 436.597 | 0.100 | 1.55389 | 38.09 |
| 7 | 87.003 | 1.100 | 1.83481 | 42.73 |
| 8 | 8.300 | 5.350 | 1.00000 | |
| 9 | −12.607 | 1.000 | 1.75500 | 52.34 |
| 10 | −32.799 | 0.800 | 1.00000 | |
| 11 | 41.120 | 2.950 | 1.80809 | 22.74 |
| 12 | −19.604 | 0.900 | 1.88300 | 40.66 |
| 13 | −73.132 | d13 | 1.00000 | |
| 14 | ∞ | d14 | 1.00000 | Aperture Stop S |
| 15 | 22.373 | 0.900 | 1.90265 | 35.73 |
| 16 | 12.230 | 3.450 | 1.67003 | 47.14 |
| 17 | −59.699 | d17 | 1.00000 | |
| 18 | 13.739 | 3.600 | 1.49782 | 82.57 |
| 19 | −24.820 | 0.900 | 2.00069 | 25.46 |
| 20 | −270.014 | 2.200 | 1.00000 | |
| 21 | −117.055 | 2.050 | 1.84666 | 23.80 |
| 22 | −15.985 | 1.000 | 1.77377 | 47.25 |
| *23 | 24.175 | 2.084 | 1.00000 | |
| 24 | 66.365 | 2.800 | 1.56883 | 56.00 |
| 25 | −15.447 | 0.100 | 1.00000 | |
| 26 | 44.994 | 2.750 | 1.51742 | 52.20 |
| 27 | −15.201 | 0.900 | 1.90366 | 31.27 |
| 28 | 29.993 | 0.300 | 1.00000 | |
| 29 | 14.609 | 5.050 | 1.67270 | 32.19 |
| 30 | −9.200 | 0.900 | 2.00069 | 25.46 |
| 31 | −24.389 | 1.400 | 1.00000 | |
| 32 | −12.862 | 1.000 | 1.85135 | 40.10 |
| *33 | −27.495 | BF | 1.00000 | |
| I | ∞ | | | |

TABLE 3-continued

Third Example

[Aspherical Surface Data]

| m | κ | A4 | A6 | A8 | A10 |
|---|---|---|---|---|---|
| 6 | 20.00000 | 9.17E−05 | −6.52E−07 | 2.70E−09 | −1.24E−11 |
| 23 | 0.48230 | −7.25E−06 | −3.60E−07 | 4.06E−09 | |
| 33 | −20.00000 | −1.23E−04 | 8.28E−07 | −6.05E−09 | −9.89E−11 |

[Various Data]
zoom ratio 9.42

| | W | M | T |
|---|---|---|---|
| f | 10.30 | 30.00 | 96.99 |
| FNO | 4.12 | 5.48 | 5.80 |
| 2ω | 80.89 | 29.72 | 9.45 |
| Y | 8.19 | 8.19 | 8.19 |
| TL | 103.03 | 121.38 | 143.32 |

[Upon focusing an infinitely distant object]

| | W | M | T |
|---|---|---|---|
| f | 10.30 | 30.00 | 96.99 |
| d5 | 2.106 | 20.131 | 40.209 |
| d13 | 19.664 | 6.244 | 1.800 |
| d14 | 4.279 | 4.974 | 1.800 |
| d17 | 3.438 | 2.743 | 5.916 |
| BF | 14.06 | 27.81 | 34.12 |

[Upon focusing on a closely distant object]

| | W | M | T |
|---|---|---|---|
| β | −0.032 | −0.068 | −0.116 |
| d5 | 2.106 | 20.131 | 40.209 |
| d13 | 19.664 | 6.244 | 1.800 |
| d14 | 4.983 | 5.899 | 5.217 |
| d17 | 2.733 | 1.818 | 2.499 |
| BF | 14.06 | 27.81 | 34.12 |

[Lens Group Data]

| | ST | f |
|---|---|---|
| G1 | 1 | 64.10 |
| G2 | 6 | −10.17 |
| G3 | 15 | 31.06 |
| G4(R) | 18 | 67.06 |

[Values for Conditional Expression]

| (1) | f1/f3 = 2.06 |
|---|---|
| (2) | f1/(−f2) = 6.30 |
| (3) | (−fVR)/f3 = 0.92 |
| (4) | (−f2)/f3 = 0.33 |
| (5) | f3/fR = 0.46 |
| (6) | nd1 = 2.00100 |

Figure 8A:
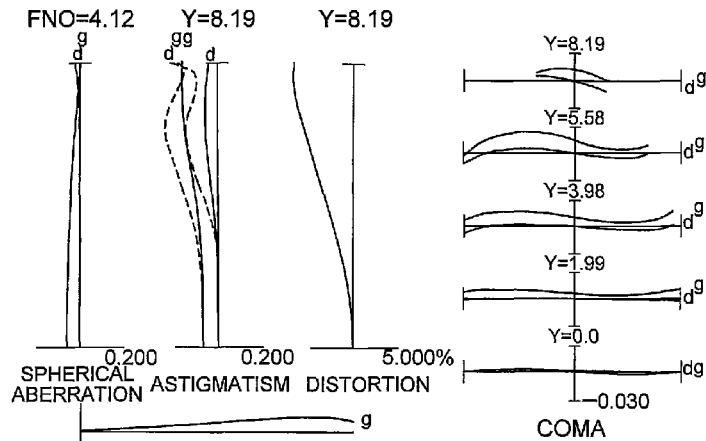
Figure 8B:
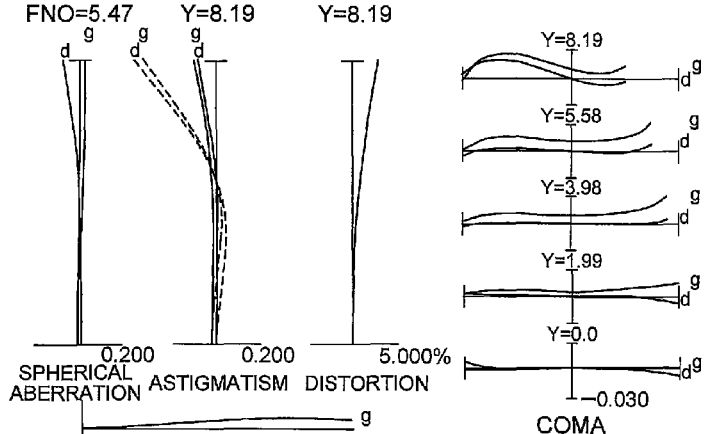
Figure 8C:
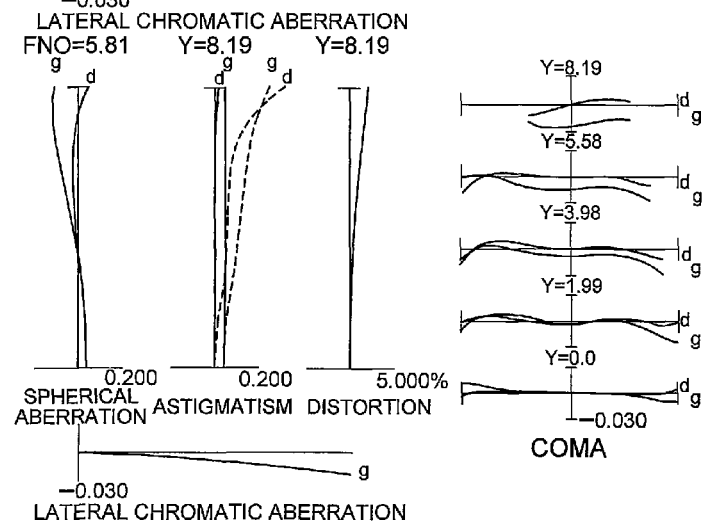

FIGS. 8A, 8B and 8C are graphs showing various aberrations of the variable magnification optical system according to the third example of the present application upon focusing on an infinitely distant object, in which FIG. 8A is in a wide-angle end state, FIG. 8B is in an intermediate focal length state, and FIG. 8C is in a telephoto end state.

Figure 9A:
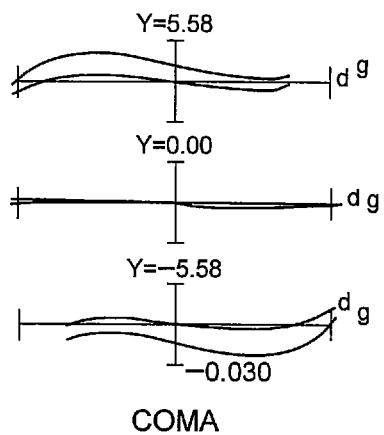
Figure 9B:
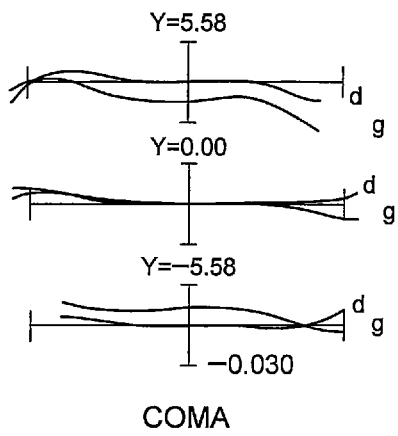

FIGS. 9A and 9B are graphs showing meridional transverse aberration of the variable magnification optical system according to the third example upon focusing on an infinitely distant object in the wide-angle end state with carrying out vibration reduction in which FIG. 9A is for a rotational camera shake of 0.62 degrees in the wide-angle end state, and FIG. 9B is for a rotational camera shake of 0.20 degrees in a telephoto end state.

As is apparent from the respective graphs, the variable magnification optical system according to the present example shows superb optical performance as a result of good corrections to various aberrations from the wide-angle end state to the telephoto end state, and also shows superb optical performance upon carrying out vibration reduction.

According to the first to third examples, a variable magnification optical system that has high zoom ratio, is downsized and excellent optical performance can be realized. In particular, the variable magnification optical systems according to the first to third examples each has vibration reducing function and zoom ratio of about 10 and is compact in size and light in weight, and angle of view in the wide-angle end state is more than 70 degrees, and variation in various aberrations upon focusing on a closely distant object can be corrected excellently.

Hereinafter, a variable magnification optical system relating to numerical examples according to the fourth embodiment of the present application will be explained with reference to the accompanying drawings. Meanwhile, the fourth to the eighth examples are of the fourth embodiment.

(Fourth Example)

Figure 10A:
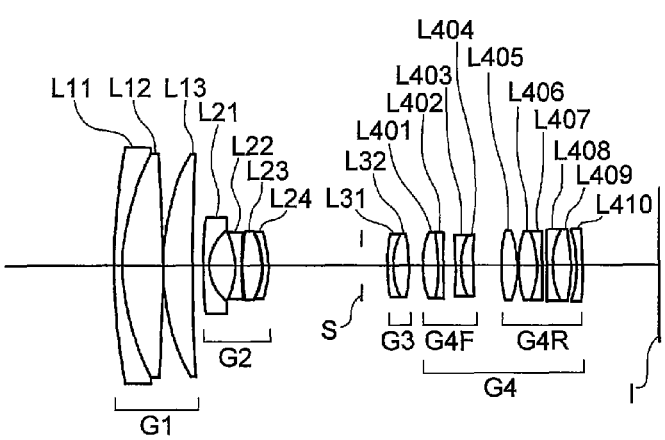
Figure 10B:
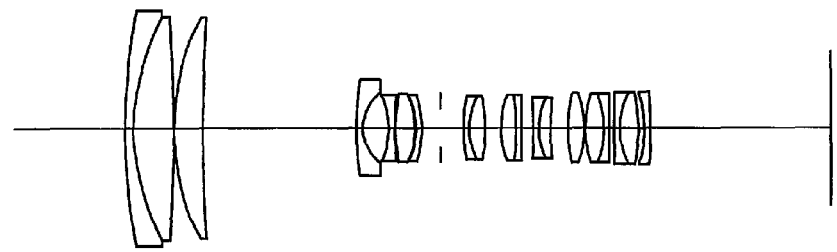
Figure 10C:
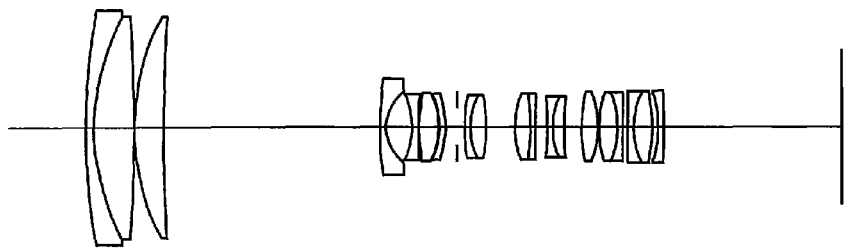

FIGS. 10A, 10B and 10C are sectional views showing a variable magnification optical system according to a fourth example of the fourth embodiment of the present application, in which FIG. 10A shows sectional view in a wide-angle end state, FIG. 10B shows sectional view in an intermediate focal length state, and FIG. 10C shows sectional view in a telephoto end state.

The variable magnification optical system according to the present example is composed of, in order from an object side: a first lens group G1 having positive refractive power; a second lens group G2 having negative refractive power; a third lens group G3 having positive refractive power; and a fourth lens group GR having positive refractive power.

The first lens group G1 consists of, in order from the object side, a cemented lens constructed by a negative meniscus lens L11 having a convex surface facing the object side cemented with a double convex positive lens L12, and a positive meniscus lens L13 having a convex surface facing the object side.

The second lens group G2 consists of, in order from the object side, a negative meniscus lens L21 having a convex surface facing the object side, a double concave negative lens L22, a double convex positive lens L23 and a negative meniscus lens L24 having a concave surface facing the object side. The most object side negative meniscus lens L21 is a glass mold type aspherical lens whose object side lens surface is aspherically shaped.

The third lens group G3 consists of, in order from the object side, a cemented lens constructed by a negative meniscus lens L31 having a convex surface facing the object side cemented with a double convex positive lens L32. An aperture stop S is disposed at the object side of the third lens group G3.

The fourth lens group G4 consists of, in order from the object side, a front group G4F having negative refractive power and a rear group G4R having positive refractive power.

The front group G4F consists of, in order from the object side, a cemented lens constructed by a double convex positive lens L401 cemented with a double concave negative lens L402 and a cemented lens constructed by a double concave negative lens L403 cemented with a positive meniscus lens L404 having a convex surface facing the object side. The negative lens L403 is a glass mold type aspherical lens whose object side lens surface is aspherically shaped.

The rear group G4R consists of, in order from the object side, a double convex positive lens L405, a cemented lens constructed by a double convex positive lens L406 cemented with a negative meniscus lens L407 having a concave surface facing the object side, a cemented lens constructed by a negative meniscus lens L408 having a convex surface facing the object side cemented with a double convex positive lens L409, and a negative meniscus lens L410 having a convex surface having the image side. The negative meniscus lens L410 is a glass mold type aspherical lens whose image side lens surface is aspherically shaped.

Incidentally, in the variable magnification optical system according to the present example, a low pass filter as well as a glass cover for a sensor can be disposed between the fourth lens group G4 and the image plane.

In the variable magnification optical system according to the present example, zooming from the wide-angle end state to the telephoto end state, is conducted by moving the first lens group G1 to the fourth lens group G4 along the optical axis and moving the aperture stop S in a body with the front group G4F in the fourth lens group G4 such that a distance between the first lens group G1 and the second lens group G2 is increased, a distance between the second lens group G2 and the third lens group G3 is decreased, a distance between the third lens group G3 and the fourth lens group G4 is increased, and a distance between the aperture stop S and the third lens group G3 is decreased. In more detail, upon zooming, the first lens group G1 and the third lens group G3 are moved toward the object side. The second lens group G2 is moved toward the object side from the wide-angle end state to the intermediate focal length state and toward the image side from the intermediate focal length state to the telephoto end state. In the fourth lens group G4, upon zooming from the wide-angle end state to the telephoto end state, the front group G4F and the rear group G4R are moved toward the object side from the wide-angle end state to the intermediate focal length state and toward the image side from the intermediate focal length state to the telephoto end state, such that a distance between the front group G4F and the rear group G4R is decreased.

Table 4 below shows various values of the variable magnification optical system according to the present example.

In table 4, f denotes a focal length, and BF denotes a back focal length (a distance on the optical axis between the most image side lens surface and the image plane I).

In [Surface Data], m denotes an order of an optical surface counted from the object side, r denotes a radius of curvature, d denotes a surface-to-surface distance (an interval from an n-th surface to an (n+1)-th surface, where n is an integer.), nd denotes refractive index for d-line (wavelength λ=587.6 nm) and vd denotes an Abbe number for d-line (wavelength λ=587.6 nm). Further, OP denotes an object surface, and I denotes an image plane. Meanwhile, radius of curvature r=∞ denotes a plane surface. The position of an aspherical surface is expressed by attaching "*" to the surface number, and in the column of the radius of curvature, a paraxial radius of curvature is shown.

In [Aspherical Data], with respect to an aspherical surface shown in [Surface Data], an aspherical surface coefficient and a conical coefficient are shown in the case where the aspherical surface is exhibited by the following expression:

$$X=(h^2/r)/[1+[1-\kappa(h^2/r^2)]^{1/2}]+A4h^4+A6h^6+A8h^8+A10h^{10}$$

where h denotes a vertical height from the optical axis, X denotes a sag amount which is a distance along the optical axis from the tangent surface at the vertex of the aspherical surface to the aspherical surface at the vertical height from the optical axis, κ denotes a conical coefficient, A4, A6, A8 and A10 denote respective aspherical coefficients, and r denotes a paraxial radius of curvature that is a radius of curvature of a reference sphere. "E–n", where n is an integer, denotes "×10$^{-n}$", for example, "1.234E-05" denotes "1.234× 10$^{-5}$".

The 2nd order aspherical surface coefficient A2 is 0, and omitted in the description.

In [Various Data], FNO denotes an f-number, ω denotes a half angle of view (unit "°", Y denotes an image height, TL denotes a total length of the variable magnification optical system, that is, a distance along the optical axis from the first surface to the image plane I upon focusing on an infinitely distant object, do denotes a variable interval between an n-th surface and an (n+1)-th surface. φ denotes a diameter f the aperture stop S. Meanwhile, W denotes a wide-angle end state, M denotes an intermediate focal length state, and T denotes a telephoto end state.

In [Lens Group Data], a starting surface ST and a focal length of each lens group are shown.

In [Values for Conditional Expressions], values corresponding to respective conditional expressions are shown.

It is noted, here, that "mm" is generally used for the unit of length such as the focal length f, the radius of curvature r and the unit for other lengths shown in Table 4. However, since similar optical performance can be obtained by an optical system proportionally enlarged or reduced its dimension, the unit is not necessarily to be limited to "mm".

The explanation of reference symbols in Table 4 described above, is the same in Tables for the fifth to eighth examples.

TABLE 4

Fourth Example

[Surface Data]

| m | r | d | nd | vd |
|---|---|---|---|---|
| OP | ∞ | | | |
| 1 | 104.5118 | 1.6000 | 2.003300 | 28.27 |
| 2 | 39.3751 | 7.4000 | 1.497820 | 82.57 |
| 3 | −463.5701 | 0.1000 | | |
| 4 | 40.3116 | 5.4000 | 1.834810 | 42.73 |
| 5 | 241.9089 | d5 | | |
| *6 | 79.9711 | 1.0000 | 1.851350 | 40.10 |
| 7 | 8.1252 | 4.8500 | | |
| 8 | −14.2116 | 1.0000 | 1.883000 | 40.66 |
| 9 | 124.9279 | 0.1000 | | |
| 10 | 30.8124 | 3.5000 | 1.808090 | 22.74 |
| 11 | −15.1873 | 0.3000 | | |
| 12 | −13.2222 | 1.0000 | 1.883000 | 40.66 |
| 13 | −23.0302 | d13 | | |
| 14 | ∞ | d14 | | Aperture Stop S |
| 15 | 26.1923 | 1.0000 | 1.954000 | 33.46 |
| 16 | 12.2483 | 2.8500 | 1.719990 | 50.27 |
| 17 | −43.5073 | d17 | | |
| 18 | 14.5527 | 2.8500 | 1.497820 | 82.57 |
| 19 | −40.3302 | 1.0000 | 1.950000 | 29.37 |
| 20 | 173.4596 | 2.1500 | | |
| *21 | −105.0156 | 1.0000 | 1.806100 | 40.71 |
| 22 | 10.9037 | 2.2000 | 1.808090 | 22.74 |
| 23 | 28.6084 | d23 | | |
| 24 | 30.6882 | 2.8500 | 1.579570 | 53.74 |
| 25 | −18.3905 | 0.1000 | | |
| 26 | 18.8919 | 3.6000 | 1.518230 | 58.82 |
| 27 | −13.1344 | 1.0000 | 2.000690 | 25.46 |
| 28 | −2198.5412 | 0.7500 | | |
| 29 | 412.2295 | 1.0000 | 1.954000 | 33.46 |
| 30 | 12.8823 | 3.5000 | 1.755200 | 27.57 |
| 31 | −23.7185 | 1.1500 | | |

TABLE 4-continued

Fourth Example

| | | | | |
|---|---|---|---|---|
| 32 | −16.1296 | 1.0000 | 1.806100 | 40.71 |
| *33 | −97.3104 | BF | | |
| I | ∞ | | | |

[Aspherical Surface Data]

| m | 6 |
|---|---|
| κ | −8.7294 |
| A4 | 4.64796E−05 |
| A6 | −4.09659E−07 |
| A8 | 2.44519E−09 |
| A10 | −9.90503E−12 |
| m | 21 |
| κ | −1.5760 |
| A4 | 1.72590E−05 |
| A6 | 9.45415E−08 |
| A8 | −1.00397E−09 |
| A10 | 0.00000E+00 |
| m | 33 |
| κ | −19.8082 |
| A4 | −1.67719E−05 |
| A6 | −2.11776E−07 |
| A8 | −4.15932E−10 |
| A10 | −1.15008E−11 |

[Various Data]
zoom ratio 9.42

| | W | | T |
|---|---|---|---|
| f | 10.30 | ~ | 97.00 |
| FNO | 4.09 | ~ | 5.81 |
| ω | 40.21 | ~ | 4.76° |
| Y | 8.19 | ~ | 8.19 |

| | W | M | T |
|---|---|---|---|
| f | 10.30000 | 50.00013 | 97.00039 |
| ω | 40.21337 | 9.15519 | 4.75685 |
| FNO | 4.09 | 5.78 | 5.81 |
| φ | 7.68 | 8.50 | 9.20 |
| TL | 100.29944 | 130.25093 | 139.59967 |
| d5 | 2.10000 | 28.50000 | 39.66696 |
| d13 | 17.38897 | 3.31447 | 2.00000 |
| d14 | 4.87082 | 3.98262 | 1.60000 |
| d17 | 2.59389 | 3.48209 | 5.86471 |
| d23 | 5.29632 | 3.42829 | 3.30000 |
| BF | 13.94944 | 33.44346 | 33.06800 |

[Lens Group Data]

| | ST | f |
|---|---|---|
| G1 | 1 | 64.38705 |
| G2 | 6 | −9.57903 |
| G3 | 15 | 29.91408 |
| G4 | 18 | 58.41425(W), 61.26584(M), 61.47193(T) |
| G4F | 18 | −81.48313 |
| G4R | 24 | 28.77173 |

[Values for Conditional Expression]

| (7) | ndh = 1.954(L31), 1.950(L402), 1.954(L408) |
|---|---|
| (8) | vdh = 33.46(L31), 29.37(L402), 33.46(L408) |
| (9) | f1/(−f2) = 6.72 |
| (10) | (−f2)/f3 = 0.320 |
| (12) | vdh4 = 33.46(L408) |
| (13) | vdp1 = 82.57(L12) |
| (14) | vdp4 = 82.57(L401) |

Figure 11A:
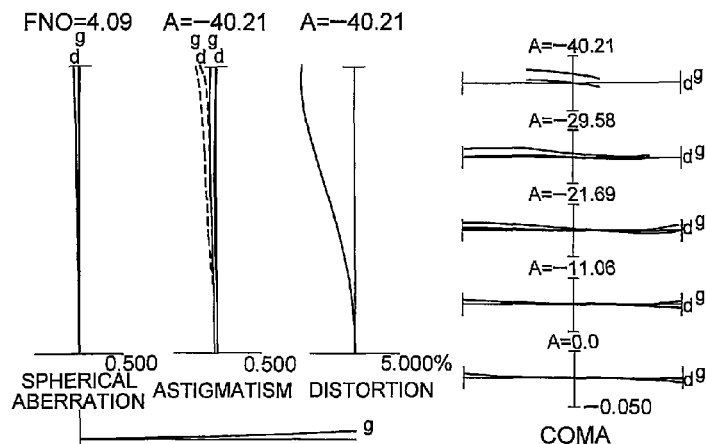
Figure 11B:
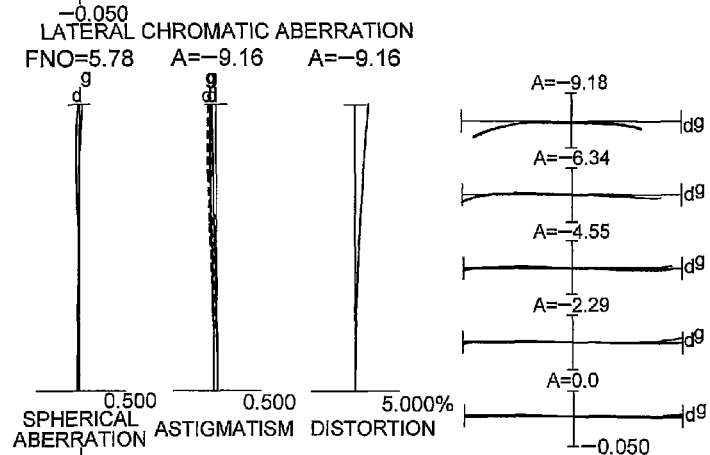
Figure 11C:
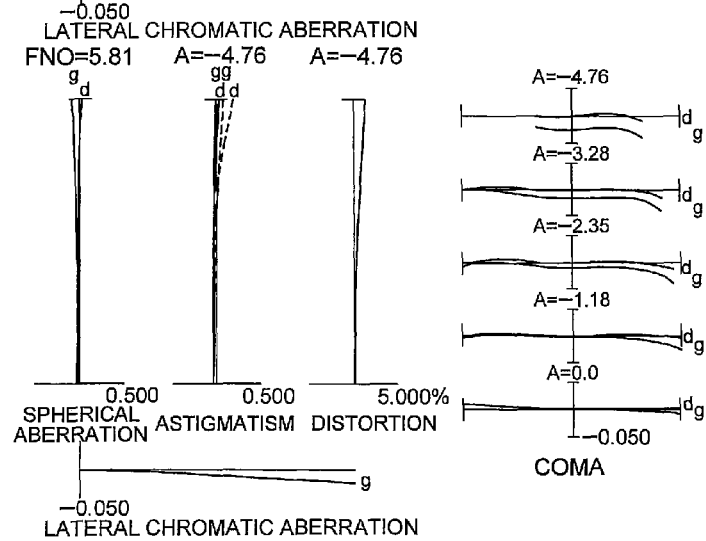

FIGS. 11A, 11B and 11C are graphs showing various aberrations of the variable magnification optical system according to the first example of the present application upon focusing on an infinitely distant object, in which FIG. 11A is in a wide-angle end state, FIG. 11B is in an intermediate focal length state, and FIG. 11C is in a telephoto end state.

In respective graphs, FNO denotes an f-number, A denotes an incident angle of light rays, that is, a half angle of view (unit "°"). d denotes an aberration curve at d-line (wavelength λ=587.6 nm), and g denotes an aberration curve at g-line (wavelength λ=435.8 nm). Curves with no d nor g denote aberrations at d-line. In the graph showing astigmatism, a solid line indicates a sagittal image plane, and a broken line indicates a meridional image plane. Incidentally, the signs regarding various aberration graphs of the present example are the same as the other Examples of the fifth to eighth examples described hereinafter.

As is apparent from the respective graphs, the variable magnification optical system according to the present example shows superb optical performance as a result of good corrections to various aberrations from the wide-angle end state to the telephoto end state.

(Fifth Example)

Figure 12A:
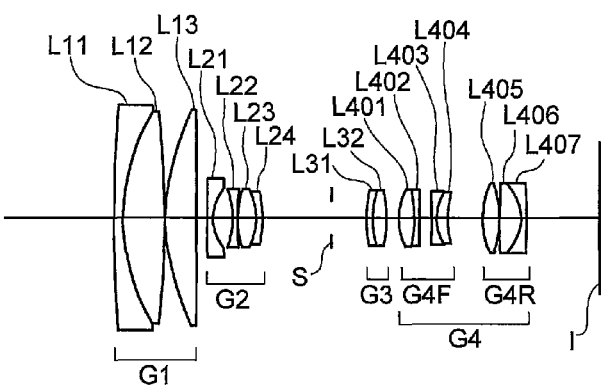
Figure 12B:
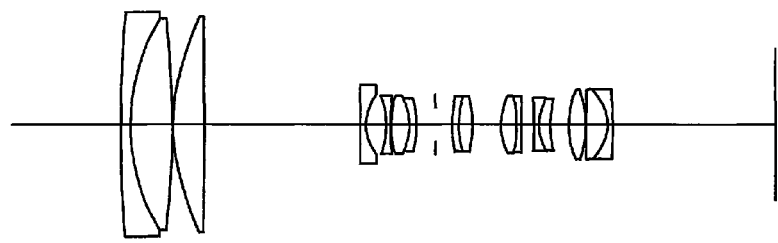
Figure 12C:
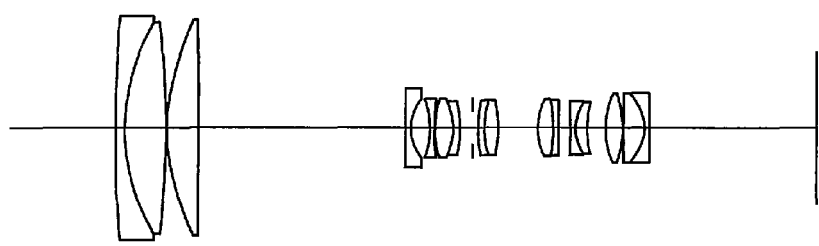

FIGS. 12A, 12B and 12C are sectional views showing a variable magnification optical system according to a fifth example of the fourth embodiment of the present application, in which FIG. 12A shows sectional view in a wide-angle end state, FIG. 12B shows sectional view in an intermediate focal length state, and FIG. 12C shows sectional view in a telephoto end state.

The variable magnification optical system according to the present example is composed of, in order from an object side: a first lens group G1 having positive refractive power; a second lens group G2 having negative refractive power; a third lens group G3 having positive refractive power; and a fourth lens group G4.

The first lens group G1 consists of, in order from the object side, a cemented lens constructed by a negative meniscus lens L11 having a convex surface facing the object side cemented with a double convex positive lens L12, and a positive meniscus lens L13 having a convex surface facing the object side.

The second lens group G2 consists of, in order from the object side, a double concave negative lens L21, a double concave negative lens L22, a double convex positive lens L23 and a negative meniscus lens L24 having a concave surface facing the object side.

The third lens group G3 consists of, in order from the object side, a cemented lens constructed by a negative meniscus lens L31 having a convex surface facing the object side cemented with a double convex positive lens L32. An aperture stop S is disposed at the object side of the third lens group G3.

The fourth lens group G4 consists of, in order from the object side, a front group G4F having negative refractive power and a rear group G4R having positive refractive power.

The front group G4F consists of, in order from the object side, a cemented lens constructed by a double convex positive lens L401 cemented with a double concave negative lens L402 and a cemented lens constructed by a double concave negative lens L403 cemented with a positive meniscus lens L404 having a convex surface facing the object side. The negative lens L403 is a glass mold type aspherical lens whose object side lens surface is aspherically shaped.

The rear group G4R consists of, in order from the object side, a double convex positive lens L405 and a cemented lens constructed by a positive meniscus lens L406 having a concave surface facing the object side cemented with a negative meniscus lens L407 having a concave surface facing the object side. The positive lens L405 is a glass mold type aspherical lens whose object side lens surface is aspherically shaped.

Incidentally, in the variable magnification optical system according to the present example, a low pass filter as well as a glass cover for a sensor can be disposed between the fourth lens group G4 and the image plane.

In the variable magnification optical system according to the present example, zooming from the wide-angle end state to the telephoto end state, is conducted by moving the first lens group G1 to the fourth lens group G4 along the optical axis and moving the aperture stop S in a body with the front group G4F in the fourth lens group G4 such that a distance between the first lens group G1 and the second lens group G2 is increased, a distance between the second lens group G2 and the third lens group G3 is decreased, a distance between the third lens group G3 and the fourth lens group G4 is increased, and a distance between the aperture stop S and the third lens group G3 is decreased. In more detail, upon zooming, the first lens group G1 and the third lens group G3 are moved toward the object side. The second lens group G2 is moved toward the object side from the wide-angle end state to the intermediate focal length state and toward the image side from the intermediate focal length state to the telephoto end state. In the fourth lens group G4, upon zooming from the wide-angle end state to the telephoto end state, the front group G4F and the rear group G4R are moved toward the object side such that a distance between the front group G4F and the rear group G4R is decreased.

Table 5 below shows various values of the variable magnification of the present example.

TABLE 5

Fifth Example

[Surface Data]

| m | r | d | nd | vd |
|---|---|---|---|---|
| OP | ∞ | | | |
| 1 | 251.8446 | 1.6000 | 1.950000 | 29.37 |
| 2 | 36.8495 | 7.9000 | 1.497820 | 82.57 |
| 3 | −162.8867 | 0.1000 | | |
| 4 | 41.6898 | 5.7500 | 1.883000 | 40.66 |
| 5 | 7827.2710 | d5 | | |
| 6 | −808.8261 | 1.0000 | 1.883000 | 40.66 |
| 7 | 9.5148 | 3.6000 | | |
| 8 | −15.5435 | 1.0000 | 1.883000 | 40.66 |
| 9 | 143.0303 | 0.1000 | | |
| 10 | 28.6318 | 3.0500 | 1.808090 | 22.74 |
| 11 | −13.3111 | 0.2500 | | |
| 12 | −12.1771 | 1.0000 | 1.834810 | 42.73 |
| 13 | −36.4394 | d13 | | |
| 14 | ∞ | d14 | | Aperture Stop S |
| 15 | 27.0772 | 1.0000 | 2.000690 | 25.46 |
| 16 | 15.7705 | 2.5000 | 1.744000 | 44.80 |
| 17 | −35.2142 | d17 | | |
| 18 | 12.6941 | 2.9500 | 1.497820 | 82.57 |
| 19 | −24.8876 | 1.0000 | 1.846660 | 23.80 |
| 20 | 775.1758 | 2.1500 | | |
| *21 | −227.6550 | 1.0000 | 1.806100 | 40.97 |
| 22 | 8.8217 | 2.2000 | 1.846660 | 23.80 |
| 23 | 19.5840 | d23 | | |
| *24 | 15.0000 | 3.1500 | 1.583130 | 59.42 |
| 25 | −23.9888 | 0.1000 | | |
| 26 | −509.6518 | 4.2000 | 1.581440 | 40.98 |
| 27 | −7.8594 | 1.0000 | 1.954000 | 33.46 |
| 28 | −200.0000 | BF | | |
| I | ∞ | | | |

[Aspherical Surface Data]

| M | 21 |
|---|---|
| κ | −20.0000 |
| A4 | 1.61374E−05 |
| A6 | −2.79859E−08 |
| A8 | −1.22068E−09 |

TABLE 5-continued

Fifth Example

| A10 | 0.00000E+00 |
| M | 24 |
| κ | 3.6281 |
| A4 | −1.21377E−04 |
| A6 | −7.10924E−07 |
| A8 | 1.36403E−08 |
| A10 | −4.10781E−10 |

[Various Data]
zoom ratio 9.42

| | W | | T |
|---|---|---|---|
| f | 10.30 | ~ | 97.00 |
| FNO | 4.12 | ~ | 6.48 |
| ω | 43.07 | ~ | 4.70° |
| Y | 8.19 | ~ | 8.19 |

| | W | M | T |
|---|---|---|---|
| f | 10.30000 | 50.00001 | 96.99995 |
| ω | 43.07103 | 9.11914 | 4.70123 |
| FNO | 4.12 | 5.81 | 6.48 |
| φ | 6.80 | 7.90 | 7.90 |
| TL | 90.80323 | 122.13334 | 131.09941 |
| d5 | 2.28937 | 28.97477 | 38.62002 |
| d13 | 13.12572 | 3.71901 | 2.00000 |
| d14 | 6.29895 | 3.32684 | 1.40000 |
| d17 | 2.43367 | 5.40578 | 7.33262 |
| d23 | 6.60623 | 3.30000 | 3.30000 |
| BF | 13.44928 | 30.80693 | 31.84677 |

[Lens Group Data]

| | ST | f |
|---|---|---|
| G1 | 1 | 59.94630 |
| G2 | 6 | −8.99248 |
| G3 | 15 | 24.34092 |
| G4 | 18 | 71.07089(W), 75.48860(M), 75.48860(T) |
| G4F | 18 | −112.21259 |
| G4R | 24 | 35.78226 |

[Values for Conditional Expression]

| (7) | ndh = 1.950(L11), 1.954(L407) |
| (8) | vdh = 29.37(L11), 33.46(L407) |
| (9) | f1/(−f2) = 6.67 |
| (10) | (−f2)/f3 = 0.369 |
| (11) | |fh/f1| = 0.761(L11) |
| (12) | vdh4 = 33.46(L407) |
| (13) | vdp1 = 82.57(L12) |
| (14) | vdp4 = 82.57(L401) |

Figure 13A:
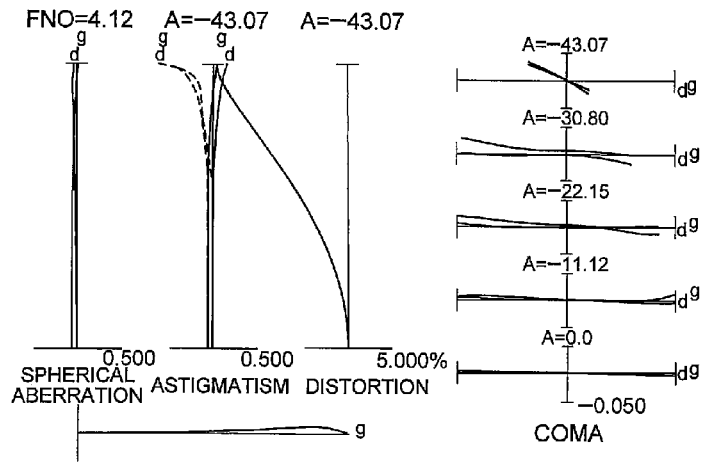
Figure 13B:
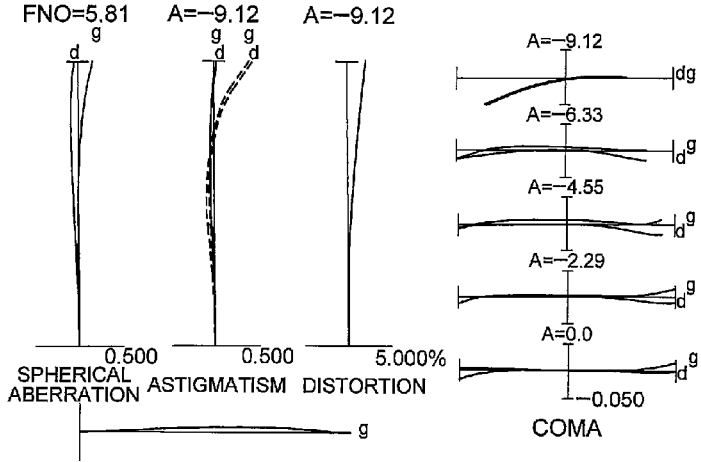
Figure 13C:
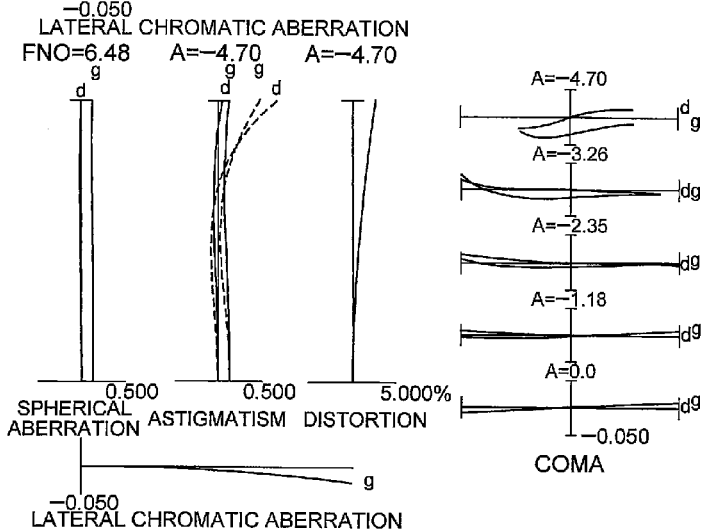

FIGS. 13A, 13B and 13C are sectional views showing a variable magnification optical system according to a fifth example of the present application, in which FIG. 13A shows sectional view in a wide-angle end state, FIG. 13B shows sectional view in an intermediate focal length state, and FIG. 13C shows sectional view in a telephoto end state.

As is apparent from the respective graphs, the variable magnification optical system according to the present example shows superb optical performance as a result of good corrections to various aberrations from the wide-angle end state to the telephoto end state.

(Sixth Example)

Figure 14A:
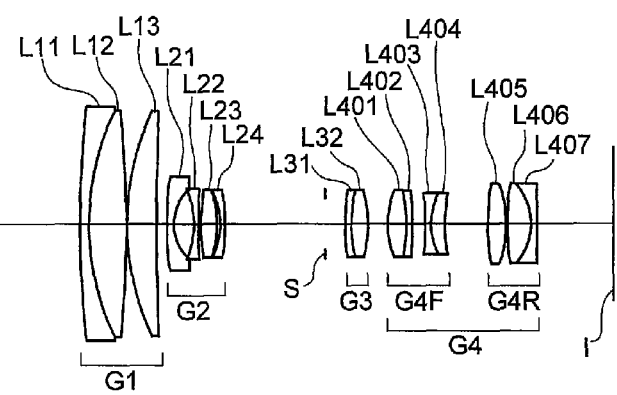
Figure 14B:
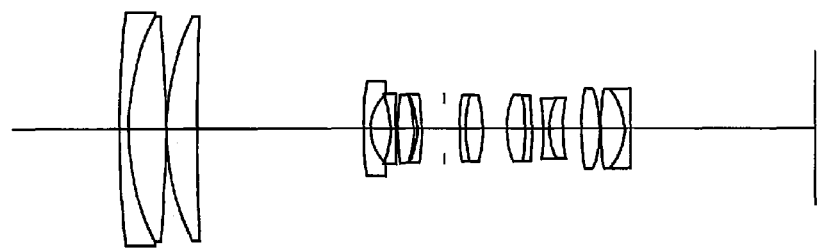
Figure 14C:
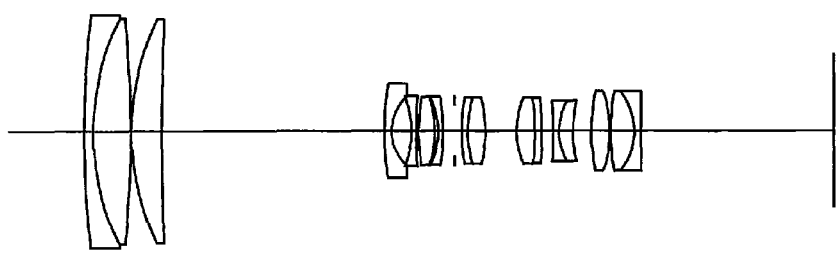

FIGS. 14A, 14B and 14C are sectional views showing a variable magnification optical system according to a sixth example of the fourth embodiment of the present application, in which FIG. 14A shows sectional view in a wide-angle end state, FIG. 14B shows sectional view in an intermediate focal length state, and FIG. 14C shows sectional view in a telephoto end state.

The variable magnification optical system according to the present example is composed of, in order from an object side: a first lens group G1 having positive refractive power; a second lens group G2 having negative refractive power; a third lens group G3 having positive refractive power; and a fourth lens group G4 having positive refractive power.

The first lens group G1 consists of, in order from the object side, a cemented lens constructed by a negative meniscus lens L11 having a convex surface facing the object side cemented with a double convex positive lens L12, and a positive meniscus lens L13 having a convex surface facing the object side.

The second lens group G2 consists of, in order from the object side, a negative meniscus lens L21 having a convex surface facing the object side, a double concave negative lens L22, a double convex positive lens L23 and a negative meniscus lens L24 having a concave surface facing the object side. The negative meniscus lens L21 is a glass mold type aspherical lens whose object side lens surface is aspherically shaped.

The third lens group G3 consists of, in order from the object side, a cemented lens constructed by a negative meniscus lens L31 having a convex surface facing the object side cemented with a double convex positive lens L32. An aperture stop S is disposed at the object side of the third lens group G3.

The fourth lens group G4 consists of, in order from the object side, a front group G4F having negative refractive power and a rear group G4R having positive refractive power.

The front group G4F consists of, in order from the object side, a cemented lens constructed by a double convex positive lens L401 cemented with a negative meniscus lens L402 having a convex surface facing the image side and a cemented lens constructed by a double concave negative lens L403 cemented with a positive meniscus lens L404 having a convex surface facing the object side. The negative lens L403 is a glass mold type aspherical lens whose object side lens surface is aspherically shaped.

The rear group G4R consists of, in order from the object side, a double convex positive lens L405 and a cemented lens constructed by a double convex positive lens L406 cemented with a negative meniscus lens L407 having a concave surface facing the object side. The positive lens L405 is a glass mold type aspherical lens whose object side lens surface is aspherically shaped.

Incidentally, in the variable magnification optical system according to the present example, a low pass filter as well as a glass cover for a sensor can be disposed between the fourth lens group G4 and the image plane.

In the variable magnification optical system according to the present example, zooming from the wide-angle end state to the telephoto end state, is conducted by moving the first lens group G1 to the fourth lens group G4 along the optical axis and moving the aperture stop S in a body with the front group G4F in the fourth lens group G4 such that a distance between the first lens group G1 and the second lens group G2 is increased, a distance between the second lens group G2 and the third lens group G3 is decreased, a distance between the third lens group G3 and the fourth lens group G4 is increased, and a distance between the aperture stop S and the third lens group G3 is decreased. In more detail, upon zooming, the first lens group G1 and the third lens group G3 are moved toward the object side. The second lens group G2 is moved toward the object side from the wide-angle end state to the intermediate focal length state and toward the image side from the intermediate focal length state to the telephoto end state. In the fourth lens group G4, upon zooming from the wide-angle end state to the telephoto end state, the front group G4F and the rear group G4R are moved toward the object side such that a distance between the front group G4F and the rear group G4R is decreased.

Table 6 below shows various values of the variable magnification of the present example.

TABLE 6

Sixth Example

[Surface Data]

| m | r | d | nd | νd |
|---|---|---|---|---|
| OP | ∞ | | | |
| 1 | 149.8692 | 1.6000 | 1.949665 | 27.56 |
| 2 | 44.3736 | 6.8398 | 1.497820 | 82.51 |
| 3 | −243.5058 | 0.1000 | | |
| 4 | 45.3756 | 5.3508 | 1.867900 | 41.78 |
| 5 | 311.4136 | d5 | | |
| *6 | 89.0243 | 1.2000 | 1.834810 | 42.73 |
| 7 | 8.4900 | 3.7581 | | |
| 8 | −15.7255 | 1.0000 | 1.834810 | 42.73 |
| 9 | 250.0000 | 0.1000 | | |
| 10 | 25.2749 | 3.2925 | 1.808090 | 22.74 |
| 11 | −17.4750 | 0.5480 | | |
| 12 | −12.6196 | 1.0000 | 1.816000 | 46.59 |
| 13 | −33.4252 | d13 | | |
| 14 | ∞ | d14 | | Aperture Stop S |
| 15 | 29.1681 | 1.0000 | 1.889044 | 39.77 |
| 16 | 18.2404 | 3.2071 | 1.593125 | 66.16 |
| 17 | −26.5261 | d17 | | |
| 18 | 14.2857 | 3.5654 | 1.497820 | 82.51 |
| 19 | −21.9776 | 1.0000 | 1.902000 | 25.23 |
| 20 | −82.8398 | 2.2052 | | |
| *21 | −52.3071 | 1.0000 | 1.848976 | 43.01 |
| 22 | 9.1414 | 2.6915 | 1.950000 | 29.37 |
| 23 | 25.8642 | d23 | | |
| *24 | 35.4414 | 3.3350 | 1.589130 | 61.22 |
| 25 | −21.3191 | 0.3000 | | |
| 26 | 42.3100 | 4.4029 | 1.581440 | 40.98 |
| 27 | −10.1979 | 1.2000 | 1.954000 | 33.46 |
| 28 | −300.4717 | BF | | |
| I | ∞ | | | |

[Aspherical Surface Data]

| m | 6 |
|---|---|
| κ | 1.0000 |
| A4 | 3.45801E−05 |
| A6 | −1.38520E−07 |
| A8 | −5.59965E−11 |
| A10 | 1.26030E−11 |
| m | 21 |
| κ | 1.0000 |
| A4 | 1.74477E−06 |
| A6 | 1.28096E−07 |
| A8 | −2.63692E−09 |
| A10 | 0.00000E+00 |
| m | 24 |
| κ | 1.0000 |
| A4 | −1.22983E−05 |
| A6 | 1.47314E−07 |
| A8 | −5.48742E−10 |
| A10 | 0.00000E+00 |

[Various Data]
zoom ratio 9.42

| | W | | T |
|---|---|---|---|
| f | 10.30 | ~ | 97.00 |
| FNO | 3.50 | ~ | 5.62 |
| ω | 39.90 | ~ | 4.69° |
| Y | 8.19 | ~ | 8.19 |

TABLE 6-continued

Sixth Example

| | W | M | T |
|---|---|---|---|
| f | 10.30001 | 49.99971 | 96.99932 |
| ω | 39.90076 | 9.01930 | 4.68610 |
| FNO | 3.50 | 5.20 | 5.62 |
| φ | 8.99 | 8.81 | 9.00 |
| TL | 99.25773 | 129.21001 | 139.67596 |
| d5 | 1.99991 | 30.68218 | 41.26022 |
| d13 | 18.53440 | 4.14191 | 2.00000 |
| d14 | 3.76478 | 2.96318 | 1.40000 |
| d17 | 3.54181 | 4.34341 | 5.90655 |
| d23 | 8.01786 | 3.30678 | 3.30001 |
| BF | 14.70262 | 35.07621 | 37.11281 |

[Lens Group Data]

| | ST | f |
|---|---|---|
| G1 | 1 | 66.85483 |
| G2 | 6 | −9.36043 |
| G3 | 15 | 27.88295 |
| G4 | 18 | 53.04244(W), 55.61603(M), 55.61991(T) |
| G4F | 18 | −160.91663 |
| G4R | 24 | 33.55859 |

[Values for Conditional Expression]

| (7) | ndh = 1.950(L404), 1.954(L407) |
| (8) | νdh = 29.37(L404), 33.46(L407) |
| (9) | f1/(−f2) = 7.14 |
| (10) | (−f2)/f3 = 0.336 |
| (12) | νdh4 = 33.46(L407) |
| (13) | νdp1 = 82.51(L12) |
| (14) | νdp4 = 82.51(L401) |

Figure 15A:
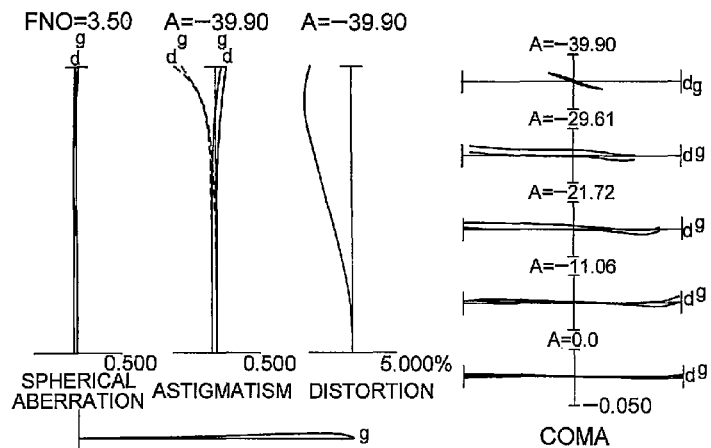
Figure 15B:
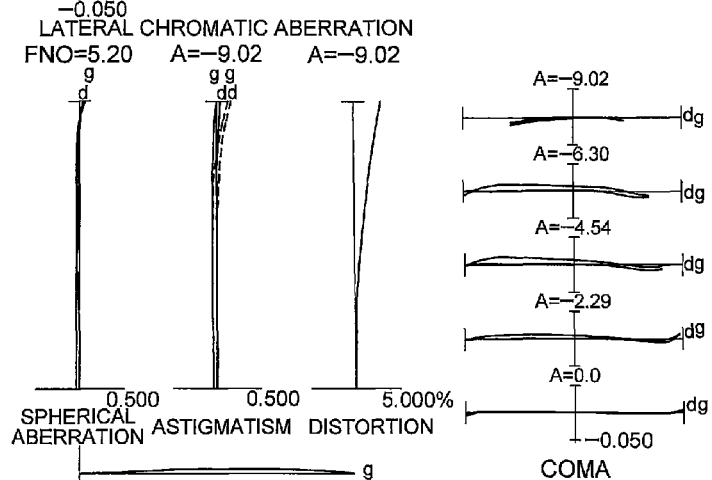
Figure 15C:
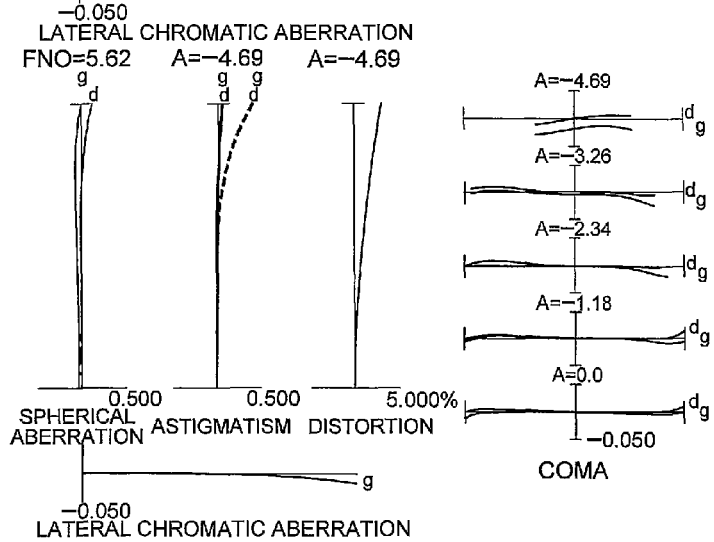

FIGS. 15A, 15B and 15C are graphs showing various aberrations of the variable magnification optical system according to the sixth example of the present application upon focusing on an infinitely distant object, in which FIG. 15A is in a wide-angle end state, FIG. 15B is in an intermediate focal length state, and FIG. 15C is in a telephoto end state.

As is apparent from the respective graphs, the variable magnification optical system according to the present example shows superb optical performance as a result of good corrections to various aberrations from the wide-angle end state to the telephoto end state.

(Seventh Example)

Figure 16A:
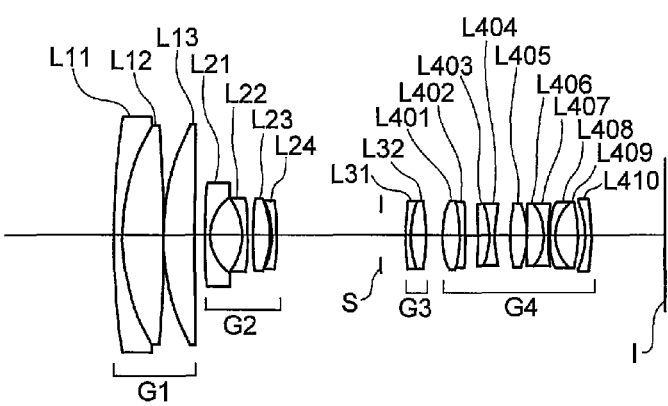
Figure 16B:
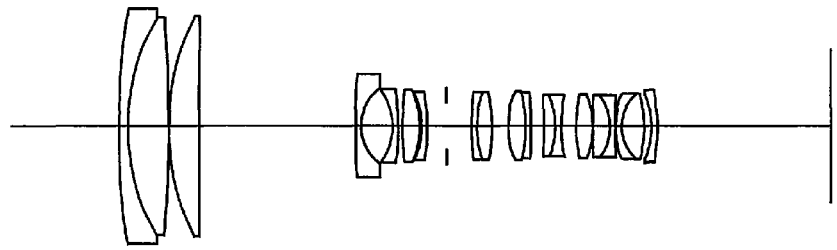
Figure 16C:
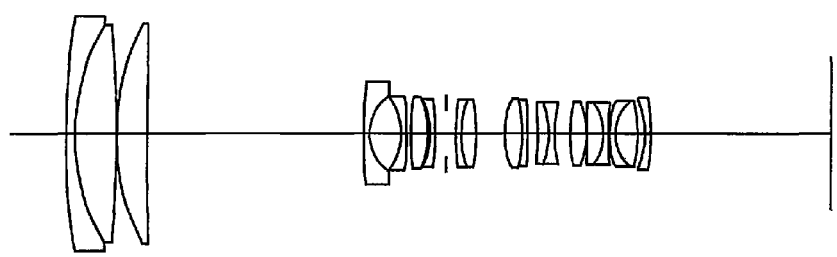

FIGS. 16A, 16B and 16C are sectional views showing a variable magnification optical system according to a seventh example of the fourth embodiment of the present application, in which FIG. 16A shows sectional view in a wide-angle end state, FIG. 16B shows sectional view in an intermediate focal length state, and FIG. 16C shows sectional view in a telephoto end state.

The variable magnification optical system according to the present example is composed of, in order from an object side: a first lens group G1 having positive refractive power; a second lens group G2 having negative refractive power; a third lens group G3 having positive refractive power; and a fourth lens group G4 having positive refractive power.

The first lens group G1 consists of, in order from the object side, a cemented lens constructed by a negative meniscus lens L11 having a convex surface facing the object side cemented with a double convex positive lens L12, and a positive meniscus lens L13 having a convex surface facing the object side.

The second lens group G2 consists of, in order from the object side, a negative meniscus lens L21 having a convex surface facing the object side, a negative meniscus lens L22 having a concave surface facing the object side, a double convex positive lens L23 and a negative meniscus lens L24 having a concave surface facing the object side. Meanwhile, the negative meniscus lens L21 is a glass mold type aspherical lens whose object side lens surface is aspherically shaped.

The third lens group G3 consists of, in order from the object side, a cemented lens constructed by a negative meniscus lens L31 having a convex surface facing the object side cemented with a double convex positive lens L32. Meanwhile, an aperture stop S is disposed at the object side of the third lens group G3.

The fourth lens group G4 consists of, in order from the object side, a cemented lens constructed by a double convex positive lens L401 cemented with a negative meniscus lens L402 having a convex surface facing the image side, a cemented lens constructed by a positive meniscus lens L403 having a concave surface facing the object side cemented with a double concave negative lens L404, a double convex positive lens L405, a cemented lens constructed by a positive meniscus lens L406 having a concave surface facing the object side cemented with a double concave negative lens L407, a cemented lens constructed by a negative meniscus lens L408 having a convex surface facing the object side cemented with a double convex positive lens L409, and a negative meniscus lens L410 having a concave surface facing the object side. Meanwhile, the positive meniscus lens L403 is a glass mold type aspherical lens whose object side lens surface is aspherically shaped, and the negative meniscus lens L410 is a glass mold type aspherical lens whose image side lens surface is aspherically shaped.

Incidentally, in the variable magnification optical system according to the present example, a low pass filter as well as a glass cover for a sensor can be disposed between the fourth lens group G4 and the image plane.

In the variable magnification optical system according to the present example, zooming from the wide-angle end state to the telephoto end state, is conducted by moving the first lens group G1 to the fourth lens group G4 along the optical axis and moving the aperture stop S in a body with the fourth lens group G4 such that a distance between the first lens group G1 and the second lens group G2 is increased, a distance between the second lens group G2 and the third lens group G3 is decreased, a distance between the third lens group G3 and the fourth lens group G4 is increased, and a distance between the aperture stop S and the third lens group G3 is decreased. In more detail, upon zooming, the first lens group G1, the third lens group G3 and the fourth lens group G4 are moved toward the object side. The second lens group G2 is moved toward the object side from the wide-angle end state to the intermediate focal length state and toward the image side from the intermediate focal length state to the telephoto end state.

Table 7 below shows various values of the variable magnification of the present example.

TABLE 7

Seventh Example

[Surface Data]

| m | r | d | nd | vd |
|---|---|---|---|---|
| OP | ∞ | | | |
| 1 | 134.9416 | 1.6000 | 2.001000 | 29.14 |
| 2 | 37.4620 | 7.6500 | 1.497820 | 82.57 |
| 3 | −339.5674 | 0.1000 | | |
| 4 | 41.6639 | 5.5000 | 1.883000 | 40.66 |
| 5 | 520.6025 | d5 | | |
| *6 | 2429.7649 | 1.0000 | 1.851350 | 40.10 |
| 7 | 8.6673 | 5.7500 | | |
| 8 | −10.8429 | 1.0000 | 1.487490 | 70.31 |
| 9 | −45.5363 | 0.8500 | | |
| 10 | 52.5147 | 3.1000 | 1.808090 | 22.74 |
| 11 | −17.4657 | 0.3000 | | |
| 12 | −16.1357 | 1.0000 | 1.954000 | 33.46 |
| 13 | −39.2793 | d13 | | |
| 14 | ∞ | d14 | | Aperture Stop S |
| 15 | 29.3843 | 1.0000 | 1.902650 | 35.73 |
| 16 | 14.8567 | 2.8000 | 1.719990 | 50.27 |
| 17 | −55.5590 | d17 | | |
| 18 | 13.5564 | 3.3500 | 1.497820 | 82.57 |
| 19 | −24.9755 | 1.0000 | 1.950000 | 29.37 |
| 20 | −183.0794 | 2.1500 | | |
| *21 | −145.2052 | 2.2500 | 1.802440 | 25.55 |
| 22 | −14.7800 | 1.0000 | 1.766840 | 46.78 |
| 23 | 23.7425 | 2.8000 | | |
| 24 | 25.8106 | 3.0000 | 1.516800 | 63.88 |
| 25 | −15.0644 | 0.1000 | | |
| 26 | −568.8377 | 3.0000 | 1.568830 | 56.00 |
| 27 | −9.3137 | 1.0000 | 1.954000 | 33.46 |
| 28 | 98.3635 | 0.1000 | | |
| 29 | 15.0059 | 1.0000 | 1.950000 | 29.37 |
| 30 | 7.0809 | 4.2500 | 1.647690 | 33.73 |
| 31 | −21.2496 | 1.4500 | | |
| 32 | −11.4669 | 1.0000 | 1.743300 | 49.32 |
| *33 | −29.8012 | BF | | |
| I | ∞ | | | |

[Aspherical Surface Data]

| m | 6 |
|---|---|
| κ | −20.0000 |
| A4 | 9.19258E−05 |
| A6 | −6.71049E−07 |
| A8 | 3.76181E−09 |
| A10 | −1.11659E−11 |
| m | 21 |
| κ | −13.2727 |
| A4 | 1.25451E−05 |
| A6 | 1.56196E−07 |
| A8 | −2.20815E−09 |
| A10 | 0.00000E+00 |
| m | 33 |
| κ | −0.9208 |
| A4 | −8.91367E−05 |
| A6 | −1.72158E−06 |
| A8 | 2.40673E−08 |
| A10 | −6.77013E−10 |

[Various Data]
Zoom ratio 9.42

| | W | | T |
|---|---|---|---|
| f | 10.30 | ~ | 97.00 |
| FNO | 4.08 | ~ | 5.83 |
| ω | 40.21 | ~ | 4.78° |
| Y | 8.19 | ~ | 8.19 |

| | W | M | T |
|---|---|---|---|
| f | 10.30000 | 50.00021 | 97.00042 |
| ω | 40.21108 | 9.16962 | 4.78008 |
| FNO | 4.08 | 5.79 | 5.83 |
| φ | 8.40 | 9.20 | 10.10 |
| TL | 102.69006 | 133.09448 | 142.59913 |
| d5 | 2.10000 | 29.30442 | 39.87067 |
| d13 | 19.87565 | 4.17251 | 2.00000 |
| d14 | 4.49060 | 3.80672 | 1.60000 |
| d17 | 3.02442 | 3.70831 | 5.91502 |
| BF | 14.04941 | 32.95254 | 34.06346 |

TABLE 7-continued

Seventh Example

[Lens Group Data]

| | ST | f |
|---|---|---|
| G1 | 1 | 63.95755 |
| G2 | 6 | −10.21809 |
| G3 | 15 | 32.27954 |
| G4 | 18 | 70.96006 |

[Values for Conditional Expression]

| (7) | ndh = 2.001(L11), 1.954(L24), 1.950(L402), 1.954(L407), 1.950(L408) |
|---|---|
| (8) | vdh = 29.14(L11), 33.46(L24), 29.37(L402), 33.46(L407), 29.37(L408) |
| (9) | f1/(−f2) = 6.26 |
| (10) | (−f2)/f3 = 0.317 |
| (11) | |fh/f1| = 0.817(L11) |
| (12) | vdh4 = 33.46(L407) |
| (13) | vdp1 = 82.57(L12) |
| (14) | vdp4 = 82.57(L401) |

Figure 17A:
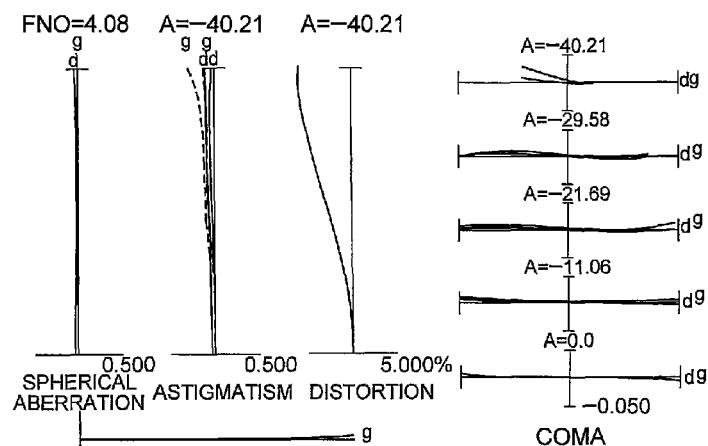
Figure 17B:
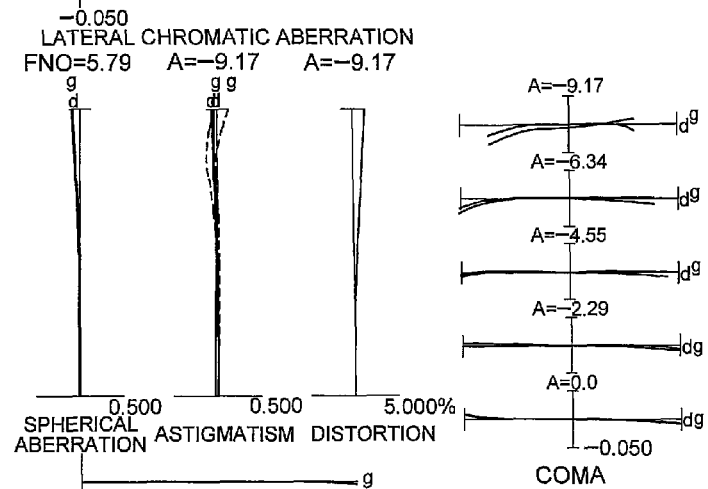
Figure 17C:
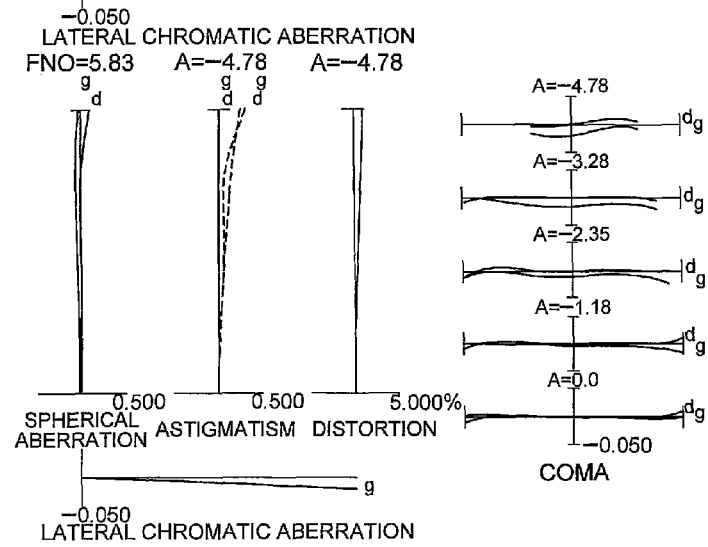

FIGS. 17A, 17B and 17C are graphs showing various aberrations of the variable magnification optical system according to the seventh example of the present application upon focusing on an infinitely distant object, in which FIG. 17A is in a wide-angle end state, FIG. 17B is in an intermediate focal length state, and FIG. 17C is in a telephoto end state.

As is apparent from the respective graphs, the variable magnification optical system according to the present example shows superb optical performance as a result of good corrections to various aberrations from the wide-angle end state to the telephoto end state.

(Eighth Example)

Figure 18A:
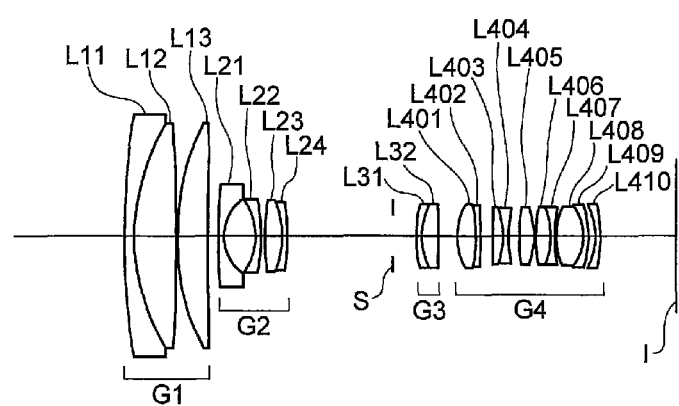
Figure 18B:
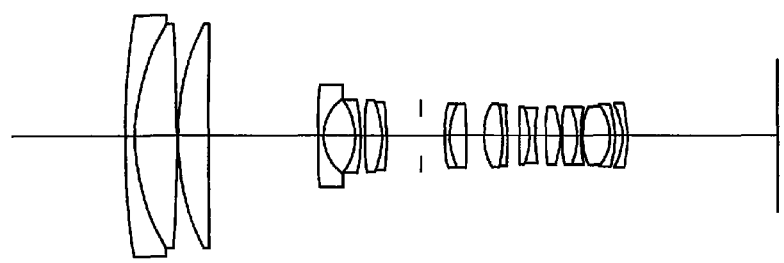
Figure 18C:
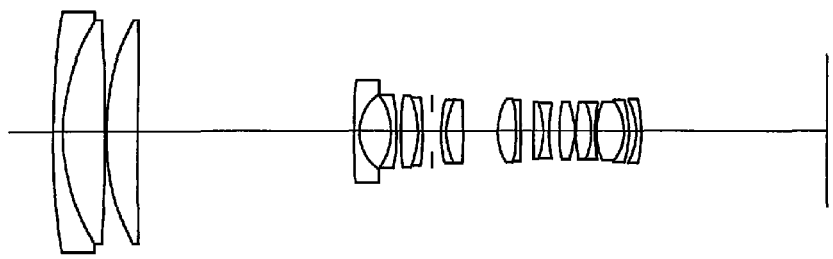

FIGS. 18A, 18B and 18C are sectional views showing a variable magnification optical system according to an eighth example of the fourth embodiment of the present application, in which FIG. 18A shows sectional view in a wide-angle end state, FIG. 18B shows sectional view in an intermediate focal length state, and FIG. 18C shows sectional view in a telephoto end state.

The variable magnification optical system according to the present example is composed of, in order from an object side: a first lens group G1 having positive refractive power; a second lens group G2 having negative refractive power; a third lens group G3 having positive refractive power; and a fourth lens group G4 having positive refractive power.

The first lens group G1 consists of, in order from the object side, a cemented lens constructed by a negative meniscus lens L11 having a convex surface facing the object side cemented with a double convex positive lens L12, and a plano-convex lens L13 having a convex surface facing the object side.

The second lens group G2 consists of, in order from the object side, a negative meniscus lens L21 having a convex surface facing the object side, a negative meniscus lens L22 having a concave surface facing the object side, a cemented lens constructed by a double convex positive lens L23 cemented with a negative meniscus lens L24 having a concave surface facing the object side. Meanwhile, the negative meniscus lens L21 is a compound type aspherical lens whose object side glass surface is provided with a resin layer.

The third lens group G3 consists of, in order from the object side, a cemented lens constructed by a negative meniscus lens L31 having a convex surface facing the object side cemented with a double convex positive lens L32.

The fourth lens group G4 consists of, in order from the object side, a cemented lens constructed by a double convex positive lens L401 cemented with a negative meniscus lens L402 having a convex surface facing the image side, a cemented lens constructed by a positive meniscus lens L403 having a concave surface facing the object side cemented with a double concave negative lens L404, a double convex positive lens L405, a cemented lens constructed by a double convex positive lens L406 cemented with a double concave negative lens L407, a cemented lens constructed by a double convex positive lens L408 cemented with a negative meniscus lens L409 having a convex surface facing the image side, and a negative meniscus lens L410 having a concave surface facing the object side. Meanwhile, the negative meniscus lens L404 is a glass mold type aspherical lens whose image side lens surface is aspherically shaped, and the negative meniscus lens L410 is a glass mold type aspherical lens whose image side lens surface is aspherically shaped.

Incidentally, in the variable magnification optical system according to the present example, a low pass filter as well as a glass cover for a sensor can be disposed between the fourth lens group G4 and the image plane I.

In the variable magnification optical system according to the present example, zooming from the wide-angle end state to the telephoto end state, is conducted by moving the first lens group G1 to the fourth lens group G4 along the optical axis toward the object side and moving the aperture stop S in a body with the fourth lens group G4 such that a distance between the first lens group G1 and the second lens group G2 is increased, a distance between the second lens group G2 and the third lens group G3 is decreased, a distance between the third lens group G3 and the fourth lens group G4 is increased from the wide-angle end state to the intermediate focal length state and is decreased from the intermediate focal length state to the telephoto end state, and a distance between the aperture stop S and the third lens group G3 is increased from the wide-angle end state to the intermediate focal length state and is decreased from the intermediate focal length state to the telephoto end state.

Table 8 below shows various values of the variable magnification of the present example.

TABLE 8

Eighth Example

[Surface Data]

| m | r | d | nd | vd |
|---|---|---|---|---|
| OP | ∞ | | | |
| 1 | 145.1831 | 1.7000 | 2.001000 | 29.14 |
| 2 | 36.6390 | 8.1000 | 1.497820 | 82.57 |
| 3 | −399.3519 | 0.1000 | | |
| 4 | 43.2076 | 6.0000 | 1.883000 | 40.66 |
| 5 | ∞ | d5 | | |
| *6 | 436.5967 | 0.1000 | 1.553890 | 38.09 |
| 7 | 87.0031 | 1.1000 | 1.834810 | 42.73 |
| 8 | 8.3001 | 5.3500 | | |
| 9 | −12.6073 | 1.0000 | 1.755000 | 52.34 |
| 10 | −32.7993 | 0.8000 | | |
| 11 | 41.1197 | 2.9500 | 1.808090 | 22.74 |
| 12 | −19.6043 | 0.9000 | 1.883000 | 40.66 |
| 13 | −73.1316 | d13 | | |
| 14 | ∞ | d14 | | Aperture Stop S |
| 15 | 22.3725 | 0.9000 | 1.902650 | 35.73 |
| 16 | 12.2299 | 3.4500 | 1.670030 | 47.14 |
| 17 | −59.6992 | d17 | | |

TABLE 8-continued

Eighth Example

| 18 | 13.7390 | 3.6000 | 1.497820 | 82.57 |
|---|---|---|---|---|
| 19 | −24.8201 | 0.9000 | 2.000690 | 25.46 |
| 20 | −270.0138 | 2.2000 | | |
| 21 | −117.0547 | 2.0500 | 1.846660 | 23.80 |
| 22 | −15.9850 | 1.0000 | 1.773770 | 47.25 |
| *23 | 24.1750 | 2.0836 | | |
| 24 | 66.3654 | 2.8000 | 1.568830 | 56.00 |
| 25 | −15.4473 | 0.1000 | | |
| 26 | 44.9939 | 2.7500 | 1.517420 | 52.20 |
| 27 | −15.2012 | 0.9000 | 1.903660 | 31.27 |
| 28 | 29.9926 | 0.3000 | | |
| 29 | 14.6093 | 5.0500 | 1.672700 | 32.19 |
| 30 | −9.1997 | 0.9000 | 2.000690 | 25.46 |
| 31 | −24.3892 | 1.4000 | | |
| 32 | −12.8617 | 1.0000 | 1.851350 | 40.10 |
| *33 | −27.4946 | BF | | |
| I | ∞ | | | |

[Aspherical Surface Data]

| m | 6 |
|---|---|
| κ | 20.0000 |
| A4 | 9.17458E−05 |
| A6 | −6.51986E−07 |
| A8 | 2.69890E−09 |
| A10 | −1.23751E−11 |
| m | 23 |
| κ | 0.4823 |
| A4 | −7.24815E−06 |
| A6 | −3.60139E−07 |
| A8 | 4.05630E−09 |
| A10 | 0.00000E+00 |
| m | 33 |
| κ | −20.0000 |
| A4 | −1.22780E−04 |
| A6 | 8.28360E−07 |
| A8 | −6.05245E−09 |
| A10 | −9.88805E−11 |

[Various Data]
zoom ratio 9.42

| | W | T |
|---|---|---|
| f | 10.30 | ~ 96.99 |
| FNO | 4.12 | ~ 5.81 |
| ω | 40.44 | ~ 4.73° |
| Y | 8.19 | ~ 8.19 |

| | W | M | T |
|---|---|---|---|
| f | 10.30260 | 30.00000 | 96.99284 |
| ω | 40.44283 | 14.85841 | 4.72723 |
| FNO | 4.12 | 5.48 | 5.81 |
| φ | 8.12 | 8.12 | 9.70 |
| TL | 103.02710 | 121.37977 | 143.32397 |
| d5 | 2.10606 | 20.13084 | 40.20889 |
| d13 | 19.66416 | 6.24359 | 1.80000 |
| d14 | 4.27874 | 4.97381 | 1.80000 |
| d17 | 3.43763 | 2.74256 | 5.91637 |
| BF | 14.05688 | 27.80535 | 34.11509 |

[Lens Group Data]

| | ST | f |
|---|---|---|
| G1 | 1 | 64.09778 |
| G2 | 6 | −10.16794 |
| G3 | 15 | 31.06055 |
| G4 | 18 | 67.05869 |

[Values for Conditional Expression]

| (7) | ndh = 2.001(L11) |
|---|---|
| (8) | vdh = 29.14(L11) |
| (9) | f1/(−f2) = 6.31 |
| (10) | (−f2)/f3 = 0.327 |
| (11) | \|fh/f1\| = 0.770(L11) |
| (13) | vdp1 = 82.57(L12) |
| (14) | vdp4 = 82.57(L401) |

Figure 19A:
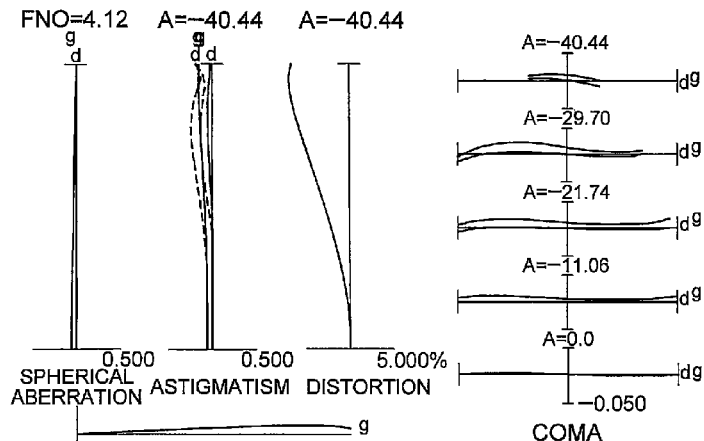
Figure 19B:
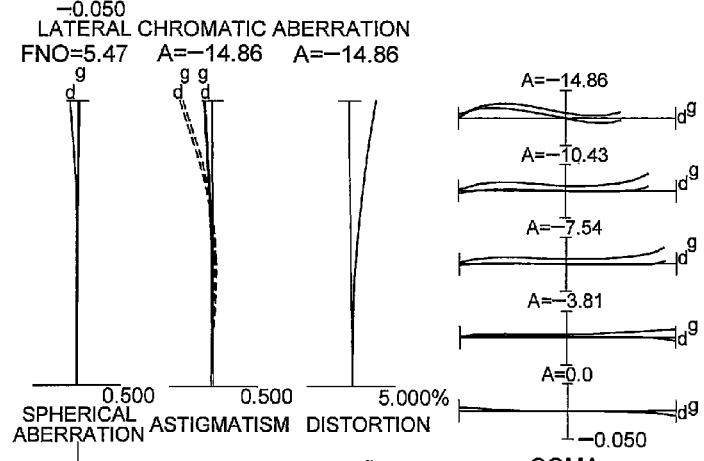
Figure 19C:
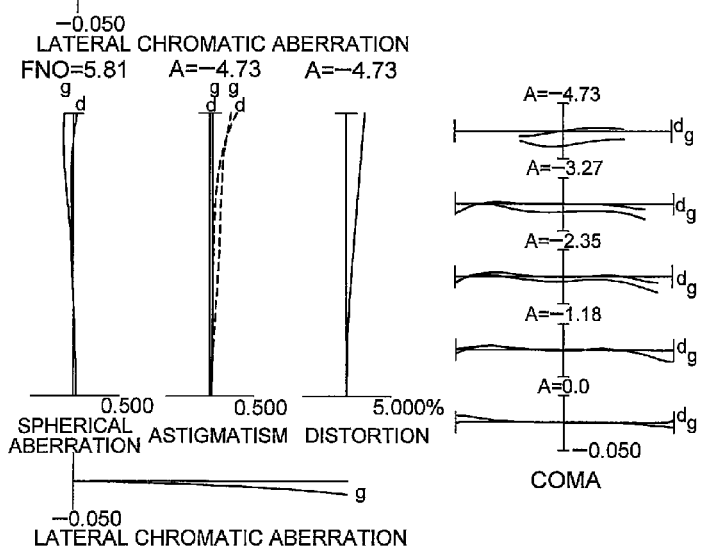

FIGS. 19A, 19B and 19C are graphs showing various aberrations of the variable magnification optical system according to the eighth example of the present application upon focusing on an infinitely distant object, in which FIG. 19A is in a wide-angle end state, FIG. 19B is in an intermediate focal length state, and FIG. 19C is in a telephoto end state.

As is apparent from the respective graphs, the variable magnification optical system according to the present example shows superb optical performance as a result of good corrections to various aberrations from the wide-angle end state to the telephoto end state.

According to the fourth to the eighth examples, a variable magnification optical system that is downsized and has high optical performance can be realized.

Incidentally, the above described examples each only shows a specific example of the invention of the present application, and accordingly the present invention is not limited to them. The following description may suitably be applied within limits that do not deteriorate optical performance of the variable magnification optical system according to the first to the fourth embodiments of the present application.

As the numerical examples of the variable magnification optical system according to the first to the fourth embodiments of the present application, although zoom lenses having a four-lens-group configuration and a five-lens-group configuration have been shown, the present application are not limited to them and can be applied to other lens configurations such as a six-lens-group configuration. Specifically, a lens configuration in which a lens or a lens group is added to the most object side, or the most image side of the variable magnification optical system according to the first to the fourth embodiments of the present application is possible. Incidentally, a lens group is defined as a portion including at least one lens separated by air spaces.

In a variable magnification optical system according to the first to the fourth embodiments of the present application, in order to vary focusing from infinitely distant object to a close object, a portion of a lens group, a single lens group, or a plurality of lens groups may be moved along the optical axis as a focusing lens group. It is particularly preferable that at least a portion of the second lens group, a portion of the third lens group or a portion of the fourth lens group is moved as the focusing lens group. In this case, the focusing lens group can be used for auto focus, and suitable for being driven by a motor such as an ultrasonic motor.

Moreover, in a variable magnification optical system according to the first to the fourth embodiments of the present application, a lens group as a whole or a portion of a lens group may be moved as a vibration reduction lens group to have a component in a direction perpendicular to the optical axis, or tilted (swayed) in a direction including the optical axis, thereby correcting an image blur caused by a camera shake. In particular, at least a portion of the third lens group or a portion of the fourth lens group is preferably made as the vibration reduction lens group.

In a variable magnification optical system according to the first to the fourth embodiments of the present application, any lens surface may be a spherical surface, a plane surface, or an aspherical surface. When a lens surface is a spherical surface or a plane surface, lens processing, assembling and adjustment become easy, and deterioration in optical performance caused by lens processing, assembling and adjustment errors can be prevented, so that it is preferable. Moreover, even if the image plane is shifted, deterioration in optical performance is little, so that it is preferable. When a lens surface is an aspherical surface, the aspherical surface may be fabricated by a fine grinding process, a glass molding process that a glass material is formed into an aspherical shape by a mold, or a compound type process that a resin material is formed into an aspherical shape on a glass lens surface. A lens surface may be a diffractive optical surface, and a lens may be a graded-index type lens (GRIN lens) or a plastic lens.

In a variable magnification optical system according to the first to the fourth embodiments of the present application, although an aperture stop is preferably disposed in the third lens group or in the neighborhood of the third lens group, the function may be substituted by a lens frame without disposing a member as an aperture stop.

Moreover, the lens surface of the lenses composing the variable magnification optical system according to the first to the fourth embodiments of the present application may be applied with an anti-reflection coating having a high transmittance in a broad wavelength range. With this contrivance, it is feasible to attain the high contrast and the high optical performance by reducing a flare and ghost images.

In a variable magnification optical system according to the first to the fourth embodiments of the present application, the zoom ratio is about 5 to 20.

Figure 20:
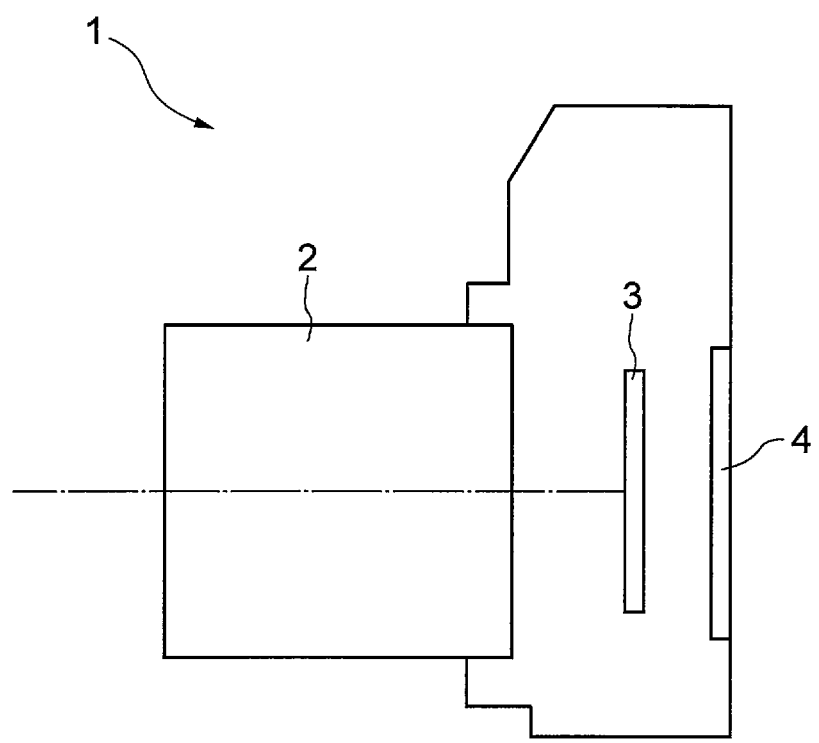
FIG. 20 is a view showing a configuration of a camera equipped with the variable magnification optical system according to the first to fourth embodiments.

Next, a camera, which is an optical apparatus equipped with the variable magnification optical system according to the first to the fourth embodiments of the present application, is explained with referring to FIG. 20.

FIG. 20 is a view showing a configuration of a camera equipped with the variable magnification optical system according to the first to the fourth embodiments of the present application.

In FIG. 20, the camera 1 is a so-called mirror-less camera of a lens interchangeable type equipped with the variable magnification optical system according to the first to the fourth embodiments of the present application as an imaging lens 2.

In the camera 1, light emitted from an unillustrated object is converged by the imaging lens 2, through an OLPF (optical low pass filter), and forms an object image on an imaging surface of an imaging portion 3. The object image is photo-electrically converted by a photo-electric conversion element provided in the imaging portion 3 so that a picture of the object is formed. This picture is displayed on an EVF (Electronic view finder) 4. Thus, a photographer can observe the object through the EVF 4.

When the photographer presses an unillustrated release button, the picture of the object formed by the imaging portion 3 is stored in an unillustrated memory. In this manner, the photographer can take a picture of the object by the camera 1.

Here, the variable magnification optical system according to the first example installed in the camera 1 as the imaging lens 2 is a variable magnification optical system that has an excellent optical performance. Accordingly, the camera 1 can realize excellent optical performance. Further, even if a variable magnification optical system according to the second to the eighth examples is installed in a camera as an imaging lens 2, the same effect as that of the camera 1 can be attained. Further, even if a variable magnification optical system according to each of the above described examples is installed in a single lens reflex camera of the type which is provided with a quick return mirror and in which an object is observed through a finder optical system, the same effect as that of the camera 1 can be attained.

Finally, an outline of a method for manufacturing a variable magnification optical system according to the first to the fourth embodiments of the present application, is described with referring to FIG. 21 to FIG. 24.

Figure 21:
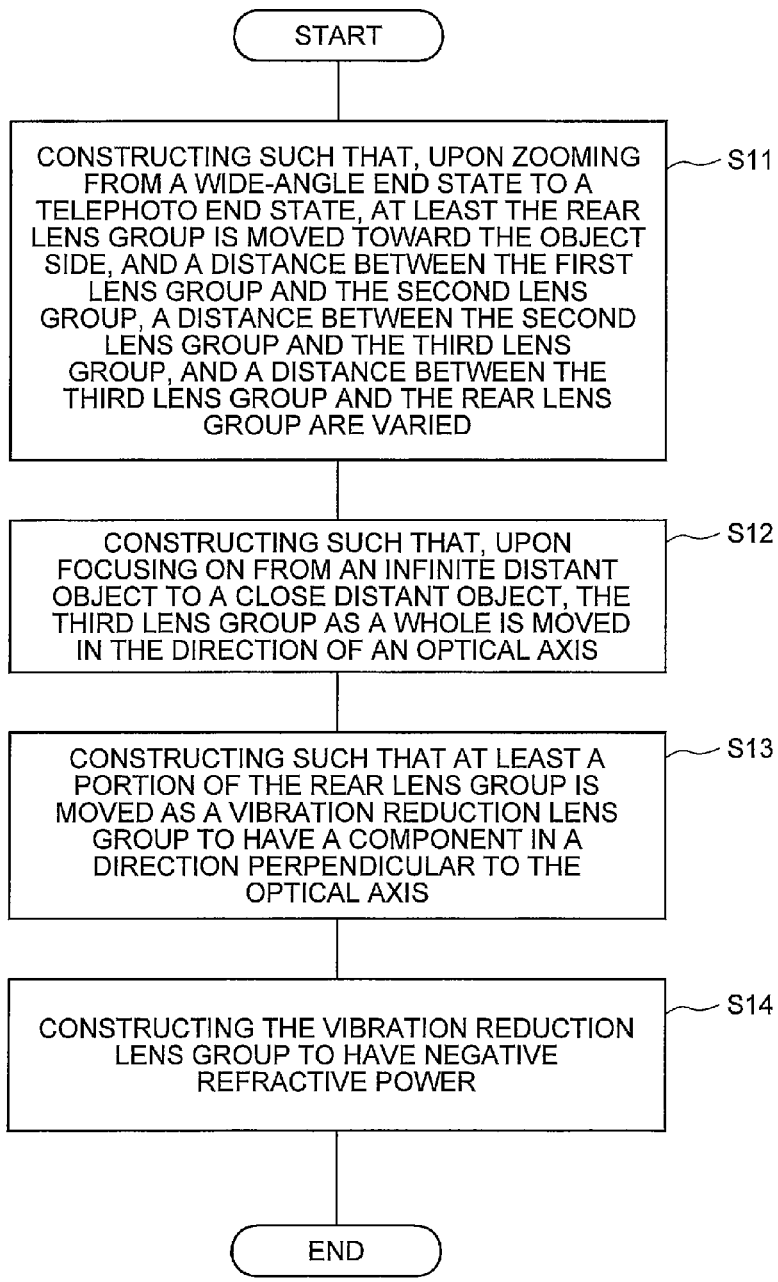
FIG. 21 is a flowchart schematically explaining a method for manufacturing the variable magnification optical system according to the first embodiment of the present application.

The method for manufacturing the variable magnification optical system according to the first embodiment of the present application shown in FIG. 21, is a method for manufacturing a variable magnification optical system, comprising, in order from an object side: a first lens group having positive refractive power; a second lens group having negative refractive power; an aperture stop; a third lens group having positive refractive power; and a rear lens group; and the method comprises the following steps of S11 to S14:

Step S11: disposing each lens group and the aperture stop, in order from the object side, in a lens barrel, and constructing, by providing a known movement mechanism in the lens barrel, such that, upon zooming from a wide angle end state to a telephoto end state, at least the rear lens group is moved toward the object side, and a distance between the first lens group and the second lens group, a distance between the second lens group and the third lens group and a distance between the third lens group and the rear lens group are varied.

Step S12: providing a known movement mechanism in the lens barrel and constructing such that, upon focusing on from an infinitely distant object to a closely distant object, the third lens group as a whole is moved in the direction of the optical axis. Step S13: providing a known movement mechanism and constructing at least a portion of the rear lens group to be moved to have a component in a direction perpendicular to the optical axis, as a vibration reduction lens group.

Step S14: constructing such that the vibration reduction lens group has negative refractive power.

Thus, the method for manufacturing a variable magnification optical system according to the first embodiment of the present application makes it possible to manufacture a variable magnification optical system that has high zoom ratio, is downsized and has excellent optical performance.

Figure 22:
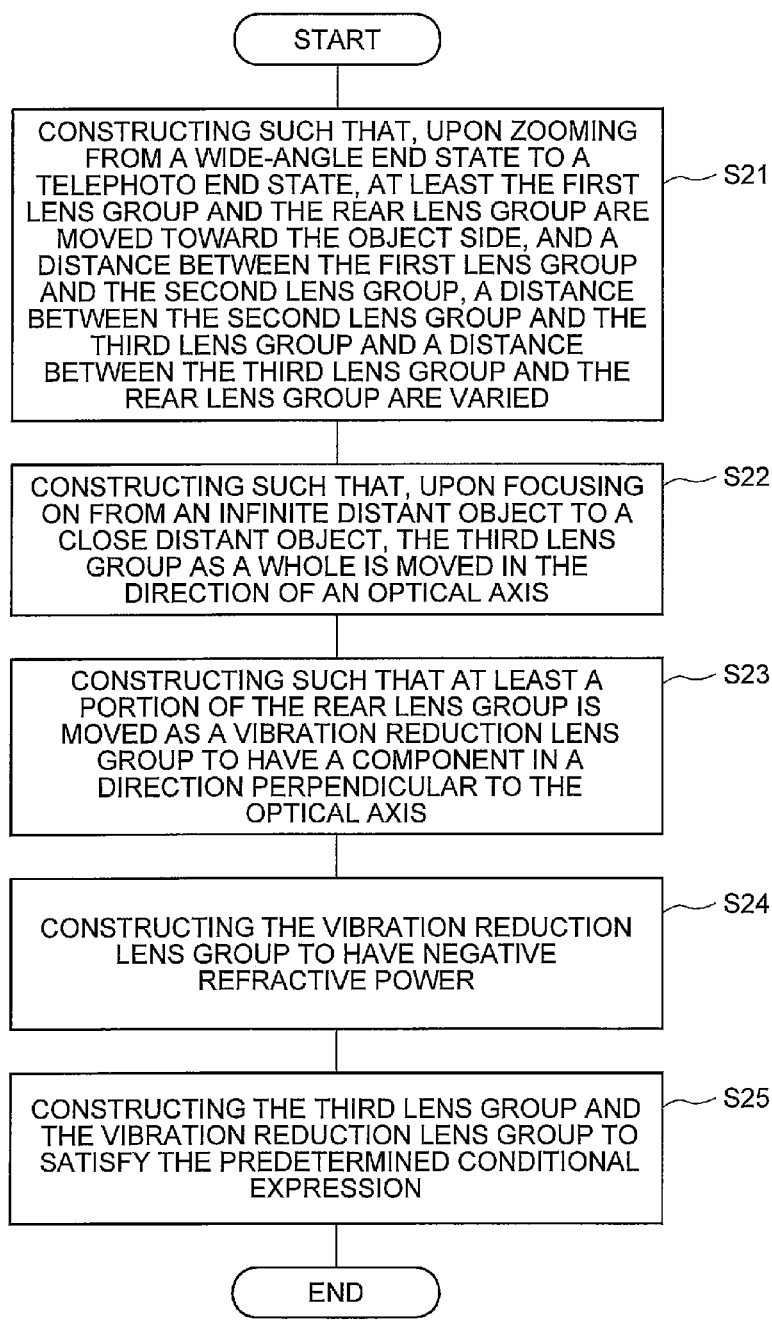
FIG. 22 is a flowchart schematically explaining a method for manufacturing the variable magnification optical system according to the second embodiment of the present application.

The method for manufacturing the variable magnification optical system according to the second embodiment of the present application shown in FIG. 22, is a method for manufacturing a variable magnification optical system, comprising, in order from an object side: a first lens group having positive refractive power; a second lens group having negative refractive power; a third lens group having positive refractive power; and a rear lens group; and the method comprises the following steps of S21 to S25:

Step S21: disposing respective lens groups, in order from the object side, in a lens barrel, and constructing, by providing a known movement mechanism in the lens barrel, such that, upon zooming from a wide-angle end state to a telephoto end state, at least the first lens group and the rear lens group are moved toward the object side, and that a distance between the first lens group and the second lens group, a distance between the second lens group and the third lens group and a distance between the third lens group and the rear lens group are varied.

Step S22: providing a known movement mechanism in the lens barrel and constructing such that, upon focusing on from an infinitely distant object to a closely distant object, the third lens group as a whole is moved in the direction of the optical axis. Step S23: providing a known movement mechanism and constructing at least a portion of the rear lens group to be moved to have a component in a direction perpendicular to the optical axis, as a vibration reduction lens group.

Step S24: constructing such that the vibration reduction lens group has negative refractive power.

Step S25: constructing such that the third lens group and the vibration reduction lens group satisfy the following conditional expression (3):

$$0.20 < (-fVR)/f3 < 1.20 \quad (3)$$

where fVR denotes a focal length of the vibration reduction lens group, and f3 denotes a focal length of the third lens group.

Thus, the method for manufacturing a variable magnification optical system according to the second embodiment of the present application makes it possible to manufacture a variable magnification optical system that has high zoom ratio, is downsized and has excellent optical performance.

Figure 23:
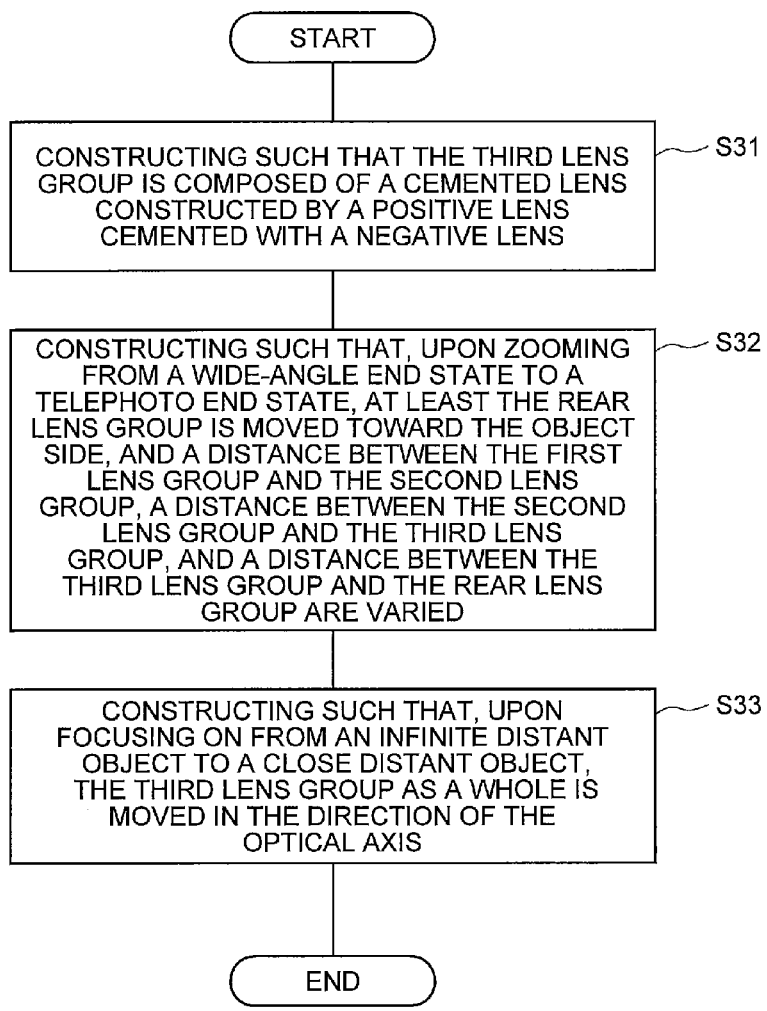
FIG. 23 is a flowchart schematically explaining a method for manufacturing the variable magnification optical system according to the third embodiment of the present application.

The method for manufacturing the variable magnification optical system according to the third embodiment of the present application shown in FIG. 23, is a method for manufacturing a variable magnification optical system, comprising, in order from an object side: a first lens group having positive refractive power; a second lens group having negative refractive power; an aperture stop; a third lens group having positive refractive power; and a rear lens group; and the method comprises the following steps of S31 to S33:

Step S31: constructing such that the third lens group is composed of a cemented lens constructed by a positive lens and a negative lens.

Step 32: disposing each lens group and the aperture stop, in order from the object side, in a lens barrel, and constructing, by providing a known movement mechanism in the lens barrel, such that, upon zooming from a wide-angle end state to a telephoto end state, at least the rear lens group is moved toward the object side, and a distance between the first lens group and the second lens group, a distance between the second lens group and the third lens group and a distance between the third lens group and the rear lens group are varied.

Step 33: providing a known movement mechanism in the lens barrel and constructing such that, upon focusing on from an infinitely distant object to a closely distant object, the third lens group as a whole is moved in the direction of the optical axis.

Thus, the method for manufacturing a variable magnification optical system according to the third embodiment of the present application makes it possible to manufacture a variable magnification optical system that has high zoom ratio, is downsized and has excellent optical performance.

Figure 24:
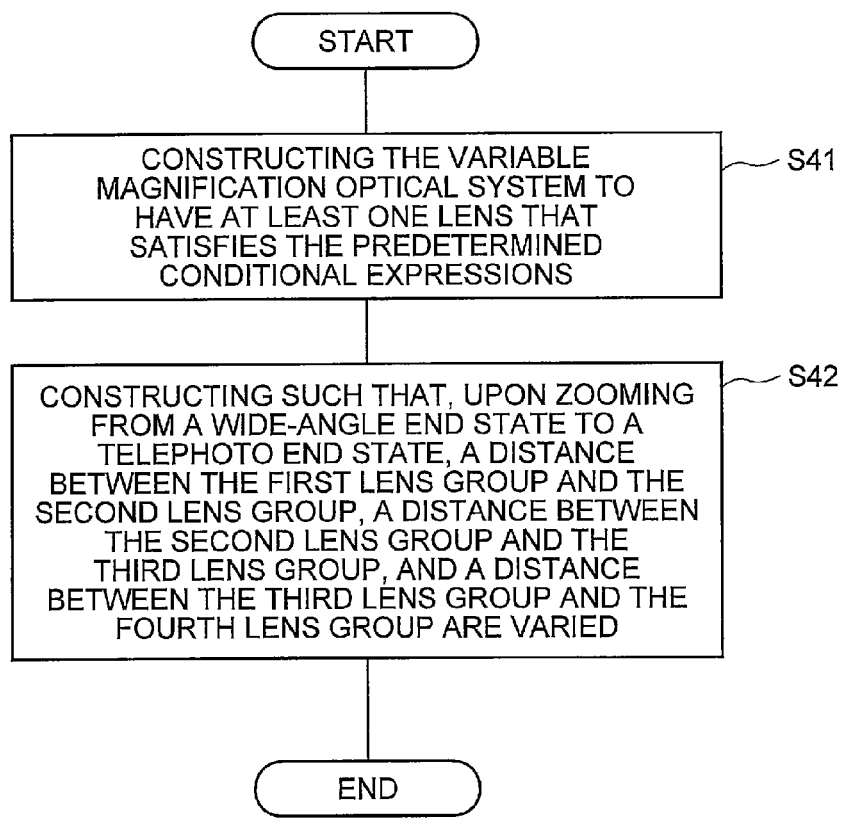
FIG. 24 is a flowchart schematically explaining a method for manufacturing the variable magnification optical system according to the fourth embodiment of the present application.

The method for manufacturing the variable magnification optical system according to the fourth embodiment of the present application shown in FIG. 24, is a method for manufacturing a variable magnification optical system, comprising, in order from an object side: a first lens group having positive refractive power; a second lens group having negative refractive power; a third lens group having positive refractive power; and a fourth lens group having positive refractive power; and the method comprises the following steps of S41 to S42:

Step S41: disposing each lens group in a lens barrel in order from the object side such that the variable magnification optical system has at least one lens that satisfies the following conditional expressions (7) and (8):

$$1.928 < ndh \quad (7)$$

$$28.60 < vdh \quad (8)$$

where ndh denotes refractive index at d-line (wavelength λ=587.6 nm) of the said lens, and vdh denotes Abbe number at d-line (wavelength λ=587.6 nm) of the said lens.

Step S42: providing a known movement mechanism in the lens barrel and constructing such that, upon focusing from an infinitely distant object to a closely distant object, a distance between the first lens group and the second lens group, a distance between the second lens group and the third lens group, and a distance between the third lens group and the fourth lens group are varied.

Thus, the method for manufacturing a variable magnification optical system according to the fourth embodiment of the present application makes it possible to manufacture a variable magnification optical system that is downsized and has excellent optical performance.

What is claimed is:

1. A variable magnification optical system comprising, in order from an object side: a first lens group having positive refractive power; a second lens group having negative refractive power; an aperture stop; a third lens group having positive refractive power; and a rear lens group;
   upon zooming from a wide-angle end state to a telephoto end state, at least the rear lens group being moved toward the object side, and a distance between the first lens group and the second lens group, a distance between the second lens group and the third lens group, and a distance between the third lens group and the rear lens group being varied;
   upon focusing from an infinitely distant object to a closely distant object, the third lens group as a whole being moved along an optical axis;
   at least a portion of the rear lens group being moved as a vibration reduction lens group to have a movement component in a direction perpendicular to the optical axis;
   the vibration reduction lens group having negative refractive power; and
   at least one lens satisfying the following conditional expressions:

$$1.928 < ndh$$

$$28.60 < vdh$$

where ndh denotes refractive index at d-line (wavelength λ=587.6 nm) of the lens, and vdh denotes Abbe number at d-line (wavelength λ=587.6 nm) of the lens.

2. The variable magnification optical system according to claim 1, wherein the following conditional expression is satisfied:

$$0.60 < f1/f3 < 2.60$$

where f1 denotes a focal length of the first lens group, and f3 denotes a focal length of the third lens group.

3. The variable magnification optical system according to claim 1, wherein the following conditional expression is satisfied:

$$5.00 < f1/(-f2) < 10.00$$

where f1 denotes a focal length of the first lens group, and f2 denotes a focal length of the second lens group.

4. The variable magnification optical system according to claim 1, wherein the following conditional expression is satisfied:

$$0.20 < (-fVR)/f3 < 1.20$$

where fVR denotes a focal length of the vibration reduction lens group, and f3 denotes a focal length of the third lens group.

5. The variable magnification optical system according to claim 1, wherein the following conditional expression is satisfied:

$$0.10 < (-f2)/f3 < 0.38$$

where f2 denotes a focal length of the second lens group, and f3 denotes a focal length of the third lens group.

6. The variable magnification optical system according to claim 1, wherein the following conditional expression is satisfied:

$$0.42 < f3/fR < 0.80$$

where f3 denotes a focal length of the third lens group, and fR denotes a focal length of the rear lens group in the wide-angle end state.

7. The variable magnification optical system according to claim 1, wherein the vibration reduction lens group comprises a cemented lens constructed by a positive lens cemented with a negative lens.

8. The variable magnification optical system according to claim 1, wherein the third lens group comprises a cemented lens constructed by a positive lens cemented with a negative lens.

9. The variable magnification optical system according to claim 1, wherein the first lens group has a negative lens that satisfies the following conditional expression:

$$1.90 < nd1$$

where nd1 denotes refractive index at d-line (wavelength λ=587.6 nm) of the negative lens in the first lens group.

10. The variable magnification optical system according to claim 1, wherein the first lens group moves toward the object side upon zooming from the wide-angle end state to the telephoto end state.

11. The variable magnification optical system according to claim 1, wherein the second lens group moves along the optical axis upon zooming from the wide-angle end state to the telephoto end state.

12. The variable magnification optical system according to claim 1, wherein the third lens group moves along the optical axis upon zooming from the wide-angle end state to the telephoto end state.

13. An optical apparatus equipped with the variable magnification optical system according to claim 1.

14. A variable magnification optical system comprising, in order from an object side: a first lens group having positive refractive power; a second lens group having negative refractive power; a third lens group having positive refractive power; and a rear lens group;
   upon zooming from a wide-angle end state to a telephoto end state, at least the first lens group and the rear lens group being moved toward the object side, and a distance between the first lens group and the second lens group, a distance between the second lens group and the third lens group, and a distance between the third lens group and the rear lens group being varied;
   upon focusing from an infinitely distant object to a closely distant object, the third lens group as a whole being moved along an optical axis;
   at least a portion of the rear lens group being moved as a vibration reduction lens group to have a movement component in a direction perpendicular to the optical axis;
   the vibration reduction lens group having negative refractive power;
   the following conditional expression being satisfied:

$$0.20 < (-fVR)/f3 < 1.20$$

where fVR denotes a focal length of the vibration reduction lens group, and f3 denotes a focal length of the third lens group; and
   the following conditional expression being satisfied:

$$42 < f3/fR < 0.80$$

where f3 denotes the focal length of the third lens group, and fR denotes a focal length of the rear lens group in the wide-angle end state.

15. The variable magnification optical system according to claim 14, wherein the following conditional expression is satisfied:

$$0.10 < (-f2)/f3 < 0.38$$

where f2 denotes a focal length of the second lens group, and f3 denotes the focal length of the third lens group.

16. The variable magnification optical system according to claim 14, wherein the following conditional expression is satisfied:

$$5.00 < f1/(-f2) < 10.00$$

where f1 denotes a focal length of the first lens group, and f2 denotes a focal length of the second lens group.

17. The variable magnification optical system according to claim 14, wherein the first lens group has a negative lens that satisfies the following conditional expression:

$$1.90 < nd1$$

where nd1 denotes refractive index at d-line (wavelength λ=587.6 nm) of the negative lens in the first lens group.

18. An optical apparatus equipped with the variable magnification optical system according to claim 14.

19. A variable magnification optical system comprising, in order from an object side: a first lens group having positive refractive power; a second lens group having negative refractive power; an aperture stop; a third lens group having positive refractive power; and a rear lens group;
   the third lens group comprising a cemented lens constructed by a positive lens cemented with a negative lens;
   upon zooming from a wide-angle end state to a telephoto end state, at least the rear lens group being moved toward the object side, and a distance between the first lens group and the second lens group, a distance between the second lens group and the third lens group, and a distance between the third lens group and the rear lens group being varied;
   upon focusing on from an infinitely distant object to a closely distant object, the third lens group as a whole being moved along an optical axis; and
   the following conditional expression being satisfied:

$$5.00 < f1/(-f2) < 10.00$$

where f1 denotes a focal length of the first lens group, and f2 denotes a focal length of the second lens group.

20. The variable magnification optical system according to claim 19, wherein the following conditional expression is satisfied:

$$0.42 < f3/fR < 0.80$$

where f3 denotes a focal length of the third lens group, and fR denotes a focal length of the rear lens group in the wide-angle end state.

21. The variable magnification optical system according to claim 19, wherein the following conditional expression is satisfied:

$$0.10<(-f2)/f3<0.38$$

where f2 denotes the focal length of the second lens group, and f3 denotes a focal length of the third lens group.

22. The variable magnification optical system according to claim 19, wherein the first lens group has a negative lens that satisfies the following conditional expression:

$$1.90<nd1$$

where nd1 denotes refractive index at d-line (wavelength λ=587.6 nm) of the negative lens in the first lens group.

23. An optical apparatus equipped with the variable magnification optical system according to claim 19.

24. A variable magnification optical system comprising, in order from an object side: a first lens group having positive refractive power; a second lens group having negative refractive power; a third lens group having positive refractive power; and a fourth lens group having positive refractive power;
  upon zooming from a wide-angle end state to a telephoto end state, a distance between the first lens group and the second lens group, a distance between the second lens group and the third lens group, and a distance between the third lens group and the fourth lens group being varied; and
  at least one lens satisfies the following conditional expressions:

$$1.928<ndh$$

$$28.60<vdh$$

where ndh denotes refractive index at d-line (wavelength λ=587.6 nm) of the lens, and vdh denotes Abbe number at d-line (wavelength λ=587.6 nm) of the lens.

25. The variable magnification optical system according to claim 24, wherein the first lens group has at least one said lens.

26. The variable magnification optical system according to claim 24, wherein the following conditional expression is satisfied:

$$5.50<f1/(-f2)<15.00$$

where f1 denotes a focal length of the first lens group, and f2 denotes a focal length of the second lens group.

27. The variable magnification optical system according to claim 24, wherein the following conditional expression is satisfied:

$$0.220<(-f2)/f3<0.530$$

where f2 denotes a focal length of the second lens group, and f3 denotes a focal length of the third lens group.

28. The variable magnification optical system according to claim 24, wherein the first lens group has at least one lens that satisfies the following conditional expression:

$$0.450<|fh/f1|<1.400$$

where fh denotes a focal length of the lens in the first lens group, and f1 denotes a focal length of the first lens group.

29. The variable magnification optical system according to claim 24, the fourth lens group has at least one said lens.

30. The variable magnification optical system according to claim 24, the second lens group has at least one said lens.

31. The variable magnification optical system according to claim 24, the third lens group has at least one said lens.

32. The variable magnification optical system according to claim 24, the first lens group has at least one said lens having negative refractive power.

33. The variable magnification optical system according to claim 24, the fourth lens group has at least one said lens having negative refractive power.

34. The variable magnification optical system according to claim 24, the fourth lens group has at least one said lens that satisfies the following conditional expression:

$$31.60<vdh4$$

where vdh4 denotes Abbe number at d-line (wavelength λ=587.6 nm) of the said lens in the fourth lens group.

35. The variable magnification optical system according to claim 24, the second lens group has at least one said lens having negative refractive power.

36. The variable magnification optical system according to claim 24, the third lens group has at least one said lens having negative refractive power.

37. The variable magnification optical system according to claim 24, the first lens group has a positive lens that satisfies the following conditional expression:

$$75.00<vdp1$$

where vdp1 denotes Abbe number at d-line (wavelength λ=587.6 nm) of the said positive lens in the first lens group.

38. The variable magnification optical system according to claim 24, the fourth lens group has a positive lens that satisfies the following conditional expression:

$$75.00<vdp4$$

where vdp4 denotes Abbe number at d-line (wavelength λ=587.6 nm) of the said positive lens in the fourth lens group.

39. The variable magnification optical system according to claim 24, the distance between the first lens group and the second lens group increases upon zooming from the wide-angle end state to the telephoto end state.

40. The variable magnification optical system according to claim 24, the distance between the second lens group and the third lens group decreases upon zooming from the wide-angle end state to the telephoto end state.

41. The variable magnification optical system according to claim 24, the distance between the third lens group and the fourth lens group increases upon zooming from the wide-angle end state to the telephoto end state.

42. An optical apparatus equipped with the variable magnification optical system according to claim 24.

43. A method for manufacturing a variable magnification optical system comprising, in order from an object side: a first lens group having positive refractive power; a second lens group having negative refractive power; an aperture stop; a third lens group having positive refractive power; and a rear lens group;
  the method comprising the steps of:
    constructing such that, upon zooming from a wide-angle end state to a telephoto end state, at least the rear lens group is moved toward the object side, and a distance between the first lens group and the second lens group, a distance between the second lens group and the third lens group, and a distance between the third lens group and the rear lens group are varied;
    constructing such that, upon focusing from an infinitely distant object to a closely distant object, the third lens group as a whole is moved along an optical axis;
    constructing such that at least a portion of the rear lens group is moved as a vibration reduction lens group to have a movement component in a direction perpendicular to the optical axis; and
constructing the vibration reduction lens group to have negative refractive power; and
constructing such that at least one lens satisfies the conditional expressions:

1.928<ndh 28.60vdh where ndh denotes refractive index at d-line (wavelength λ=587.6 nm) of the lens, and νdh denotes Abbe number at d-line (wavelength λ=587.6 nm) of the lens.

44. A method for manufacturing a variable magnification optical system comprising, in order from an object side: a first lens group having positive refractive power; a second lens group having negative refractive power; a third lens group having positive refractive power and a rear lens group;
the method comprising the steps of:
constructing such that, upon zooming from a wide-angle end state to a telephoto end state, at least the first lens group and the rear lens group are moved toward the object side, and a distance between the first lens group and the second lens group, a distance between the second lens group and the third lens group and a distance between the third lens group and the rear lens group are varied;
constructing such that, upon focusing from an infinitely distant object to a closely distant object, the third lens group as a whole is moved along an optical axis;
constructing such that at least a portion of the rear lens group is moved as a vibration reduction lens group to have a movement component in a direction perpendicular to the optical axis;
constructing the vibration reduction lens group to have negative refractive power;
constructing the third lens group and the vibration reduction lens group to satisfy the following conditional expression:

0.20<(−fVR)/f3 <1.20 where fVR denotes a focal length of the vibration reduction lens group, and f3 denotes a focal length of the third lens group; and
constructing the variable magnification optical system to satisfy the following conditional expression:

0.42<f3/fR<b 0.80 where f3 denotes the focal length of the third lens group, and fR denotes a focal length of the rear lens group in the wide-angle end state.

45. A method for manufacturing a variable magnification optical system comprising, in order from an object side: a first lens group having positive refractive power; a second lens group having negative refractive power; an aperture stop; a third lens group having positive refractive power; and a rear lens group;
the method comprising the steps of:
constructing such that the third lens group comprises a cemented lens constructed by a positive lens cemented with a negative lens;
constructing such that, upon zooming from a wide-angle end state to a telephoto end state, at least the rear lens group is moved toward the object side, and a distance between the first lens group and the second lens group, a distance between the second lens group and the third lens group, and a distance between the third lens group and the rear lens group are varied;
constructing such that, upon focusing from an infinitely distant object to a closely distant object, the third lens group as a whole is moved along an optical axis; and
constructing the variable magnificent optical system to satisfy the following conditional expression:

5.00<f1/(−f2)<10.00 where f1 denotes a focal length of the first lens group, and f2 denotes a focal length of the second lens group.

46. A method for manufacturing a variable magnification optical system comprising, in order from an object side: a first lens group having positive refractive power; a second lens group having negative refractive power; a third lens group having positive refractive power; and a fourth lens group having positive refractive power;
the method comprising the steps of:
constructing the variable magnification optical system to have at least one lens that satisfies the following conditional expressions:

1.928<ndh 28.60<vdh where ndh denotes refractive index at d-line (wavelength λ=587.6 nm) of the lens, and νdh denotes Abbe number at d-line (wavelength λ=587.6 nm) of the lens; and
constructing such that, upon zooming from a wide-angle end state to a telephoto end state, a distance between the first lens group and the second lens group, a distance between the second lens group and the third lens group, and a distance between the third lens group and the fourth lens group are varied.

47. A variable magnification optical system comprising, in order from an object side: a first lens group having positive refractive power; a second lens group having negative refractive power; an aperture stop; a third lens group having positive refractive power; and a rear lens group;
upon zooming from a wide-angle end state to a telephoto end state, at least the rear lens group being moved toward the object side, and a distance between the first lens group and the second lens group, a distance between the second lens group and the third lens group, and a distance between the third lens group and the rear lens group being varied;
upon focusing from an infinitely distant object to a closely distant object, the third lens group as a whole being moved along an optical axis;
at least a portion of the rear lens group being moved as a vibration reduction lens group to have a movement component in a direction perpendicular to the optical axis; and
the vibration reduction lens group having negative refractive power; and
the following conditional expression being satisfied:

0.10<(−f2)/f3<0.38 where f2 denotes a focal length of the second lens group, and f3 denotes a focal length of the third lens group.

48. A variable magnification optical system comprising, in order from an object side: a first lens group having positive refractive power; a second lens group having negative refractive power; an aperture stop; a third lens group having positive refractive power; and a rear lens group;
upon zooming from a wide-angle end state to a telephoto end state, at least the rear lens group being moved toward the object side, and a distance between the first lens group and the second lens group, a distance between the second lens group and the third lens group, and a distance between the third lens group and the rear lens group being varied;

upon focusing from an infinitely distant object to a closely distant object, the third lens group as a whole being moved along an optical axis;

at least a portion of the rear lens group being moved as a vibration reduction lens group to have a movement component in a direction perpendicular to the optical axis;

the vibration reduction lens group having negative refractive power; and the first lens group having a negative lens that satisfies the following conditional expression:

$$1.90 < nd1$$

where nd1 denotes refractive index at d-line (wavelength λ=587.6 nm) of the negative lens in the first lens group.

49. A variable magnification optical system comprising, in order from an object side: a first lens group having positive refractive power; a second lens group having negative refractive power; a third lens group having positive refractive power; and a rear lens group;

upon zooming from a wide-angle end state to a telephoto end state, at least the first lens group and the rear lens group being moved toward the object side, and a distance between the first lens group and the second lens group, a distance between the second lens group and the third lens group, and a distance between the third lens group and the rear lens group being varied;

upon focusing from an infinitely distant object to a closely distant object, the third lens group as a whole being moved along an optical axis;

at least a portion of the rear lens group being moved as a vibration reduction lens group to have a movement component in a direction perpendicular to the optical axis;

the vibration reduction lens group having negative refractive power;

the following conditional expression being satisfied:

$$0.20 < (-fVR)/f3 < 1.20$$

where fVR denotes a focal length of the vibration reduction lens group, and f3 denotes a focal length of the third lens group; and the following conditional expression being satisfied:

$$0.10 < (-f2)/f3 < 0.38$$

where f2 denotes a focal length of the second lens group, and f3 denotes the focal length of the third lens group.

50. A variable magnification optical system comprising, in order from an object side: a first lens group having positive refractive power; a second lens group having negative refractive power; an aperture stop; a third lens group having positive refractive power; and a rear lens group;

the third lens group comprising a cemented lens constructed by a positive lens cemented with a negative lens;

upon zooming from a wide-angle end state to a telephoto end state, at least the rear lens group being moved toward the object side, and a distance between the first lens group and the second lens group, a distance between the second lens group and the third lens group, and a distance between the third lens group and the rear lens group being varied;

upon focusing from an infinitely distant object to a closely distant object, the third lens group as a whole being moved along an optical axis; and the following conditional expression being satisfied:

$$0.42 < f3/fR < 0.80$$

where f3 denotes a focal length of the third lens group, and fR denotes a focal length of the rear lens group in the wide-angle end state.

51. A method for manufacturing a variable magnification optical system comprising, in order from an object side: a first lens group having positive refractive power; a second lens group having negative refractive power; an aperture stop; a third lens group having positive refractive power; and a rear lens group;

the method comprising the steps of:

constructing such that, upon zooming from a wide-angle end state to a telephoto end state, at least the rear lens group is moved toward the object side, and a distance between the first lens group and the second lens group, a distance between the second lens group and the third lens group, and a distance between the third lens group and the rear lens group are varied;

constructing such that, upon focusing from an infinitely distant object to a closely distant object, the third lens group as a whole is moved along an optical axis;

constructing such that at least a portion of the rear lens group is moved as a vibration reduction lens group to have a movement component in a direction perpendicular to the optical axis;

constructing the vibration reduction lens group to have negative refractive power; and constructing the variable magnification optical system to satisfy the following conditional expression:

$$0.10 < (-f2)/f3 < 0.38$$

where f2 denotes a focal length of the second lens group, and f3 denotes a focal length of the third lens group.

52. A method for manufacturing a variable magnification optical system comprising, in order from an object side: a first lens group having positive refractive power; a second lens group having negative refractive power; an aperture stop; a third lens group having positive refractive power; and a rear lens group;

the method comprising the steps of:

constructing such that, upon zooming from a wide-angle end state to a telephoto end state, at least the rear lens group is moved toward the object side, and a distance between the first lens group and the second lens group, a distance between the second lens group and the third lens group, and a distance between the third lens group and the rear lens group are varied;

constructing such that, upon focusing from an infinitely distant object to a closely distant object, the third lens group as a whole is moved along an optical axis;

constructing such that at least a portion of the rear lens group is moved as a vibration reduction lens group to have a movement component in a direction perpendicular to the optical axis;

constructing the vibration reduction lens group to have negative refractive power; and constructing such that the first lens group has a negative lens that satisfies the following conditional expression:

$$1.90 < nd1$$

where nd1 denotes refractive index at d-line (wavelength λ=587.6 nm) of the negative lens in the first lens group.

53. A method for manufacturing a variable magnification optical system comprising, in order from an object side: a first lens group having positive refractive power; a second lens group having negative refractive power; a third lens group having positive refractive power and a rear lens group;

the method comprising the steps of:

constructing such that, upon zooming from a wide-angle end state to a telephoto end state, at least the first lens group and the rear lens group are moved toward the object side, and a distance between the first lens group and the second lens group, a distance between the second lens group and the third lens group and a distance between the third lens group and the rear lens group are varied;

constructing such that, upon focusing from an infinitely distant object to a closely distant object, the third lens group as a whole is moved along an optical axis;

constructing such that at least a portion of the rear lens group is moved as a vibration reduction lens group to have a movement component in a direction perpendicular to the optical axis;

constructing the vibration reduction lens group to have negative refractive power;

constructing the third lens group and the vibration reduction lens group to satisfy the following conditional expression:

$0.20 < (-fVR)/f3 < 1.20$ where fVR denotes a focal length of the vibration reduction lens group, and f3 denotes a focal length of the third lens group; and constructing the variable magnification optical system to satisfy the following conditional expression:

$0.10 < (-f2)/f3 < 0.38$ where f2 denotes a focal length of the second lens group, and f3 denotes the focal length of the third lens group.

54. A method for manufacturing a variable magnification optical system comprising, in order from an object side: a first lens group having positive refractive power; a second lens group having negative refractive power; an aperture stop; a third lens group having positive refractive power; and a rear lens group;

the method comprising the steps of:

constructing such that the third lens group comprises a cemented lens constructed by a positive lens cemented with a negative lens;

constructing such that, upon zooming from a wide-angle end state to a telephoto end state, at least the rear lens group is moved toward the object side, and a distance between the first lens group and the second lens group, a distance between the second lens group and the third lens group, and a distance between the third lens group and the rear lens group are varied;

constructing such that, upon focusing from an infinitely distant object to a closely distant object, the third lens group as a whole is moved along an optical axis; and constructing the variable magnification optical system to satisfy the following conditional expression:

$0.42 < f3/fR < 0.80$ where f3 denotes a focal length of the third lens group, and fR denotes a focal length of the rear lens group in the wide-angle end state.

\* \* \* \* \*